(12) United States Patent
Kawaguchi et al.

(10) Patent No.: US 6,944,875 B2
(45) Date of Patent: Sep. 13, 2005

(54) DISC CARTRIDGE WITH SHUTTER OVERLAPPING GAP HAVING LABYRINTH SHAPED PORTION SPACED TO HAVE A RECESSED DUST DEPOSITION PORTION

(75) Inventors: Mitsuyoshi Kawaguchi, Kanagawa (JP); Manabu Obata, Kanagawa (JP); Yuji Iwaki, Miyagi (JP)

(73) Assignee: Sony Corporation, Tokyo (JP)

( * ) Notice: Subject to any disclaimer, the term of this patent is extended or adjusted under 35 U.S.C. 154(b) by 23 days.

(21) Appl. No.: 10/367,256

(22) Filed: Feb. 14, 2003

(65) Prior Publication Data

US 2004/0163100 A1 Aug. 19, 2004

(51) Int. Cl.⁷ ............................................. G11B 23/03
(52) U.S. Cl. ....................................................... 720/741
(58) Field of Search ................................. 720/741, 739, 720/738, 735, 736, 728, 725, 718; 369/291.1; 360/133, 132

(56) References Cited

U.S. PATENT DOCUMENTS 5,636,095 A * 6/1997 McGrath et al. ............ 360/133
2004/0052204 A1 * 3/2004 Okazawa et al. ......... 369/291.1

* cited by examiner

*Primary Examiner*—Julie Anne Watko
(74) *Attorney, Agent, or Firm*—Frommer Lawrence & Haug LLP; William S. Frommer

(57) ABSTRACT

Disclosed is a disk cartridge capable of preventing the permeation of dust in the disk cartridge. A labyrinth shape portion having a recessed dust deposition portion formed in a gap at a portion between tilt planes for overlap of shutters are vertically overlapped to each other.

4 Claims, 63 Drawing Sheets

F I G. 2
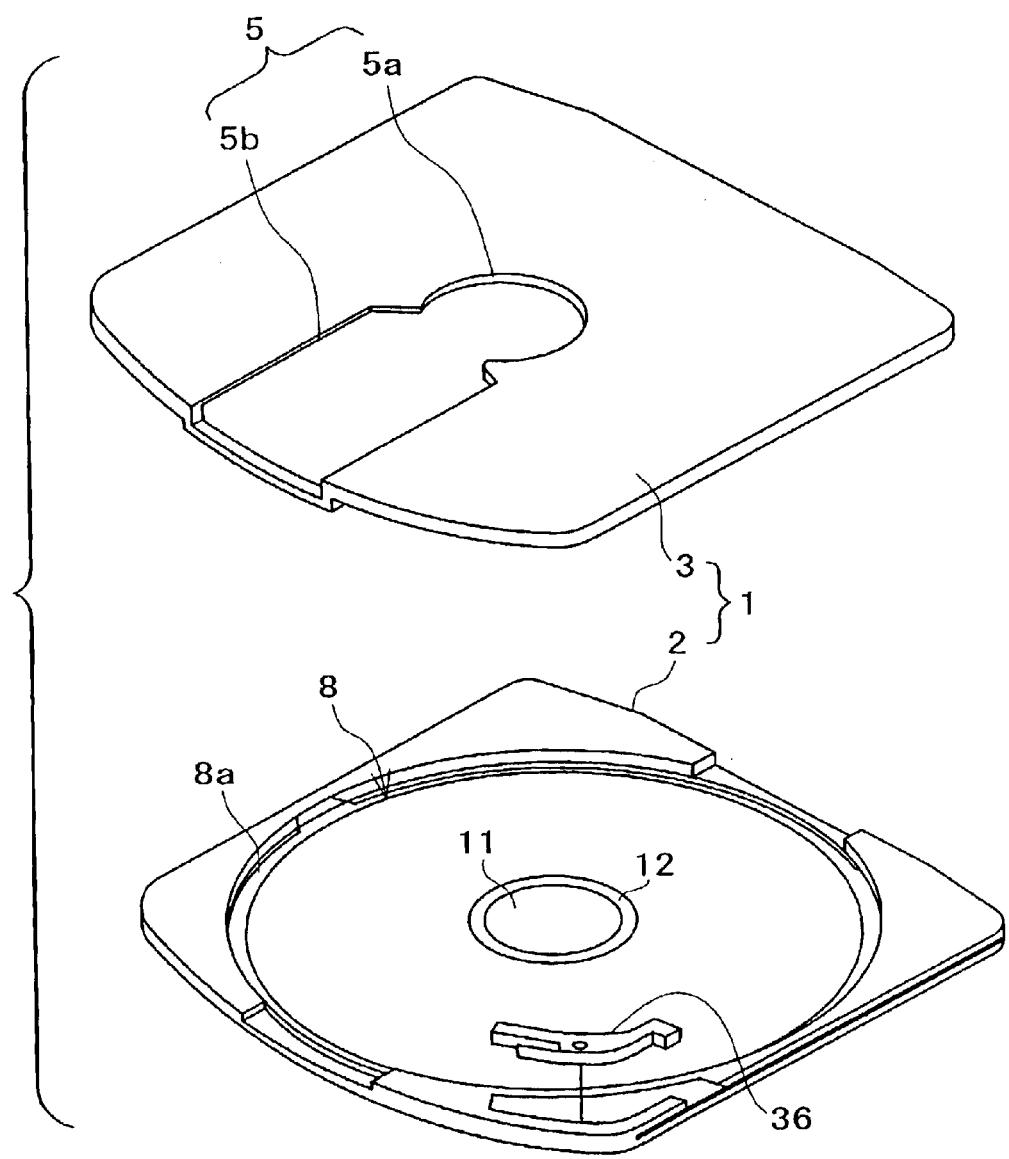

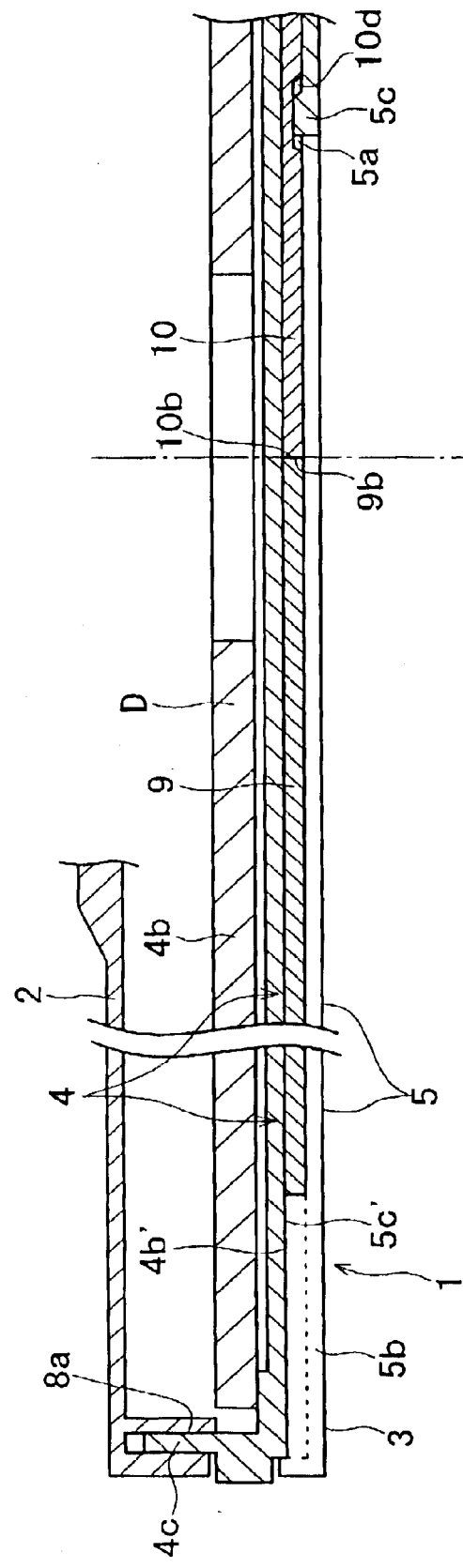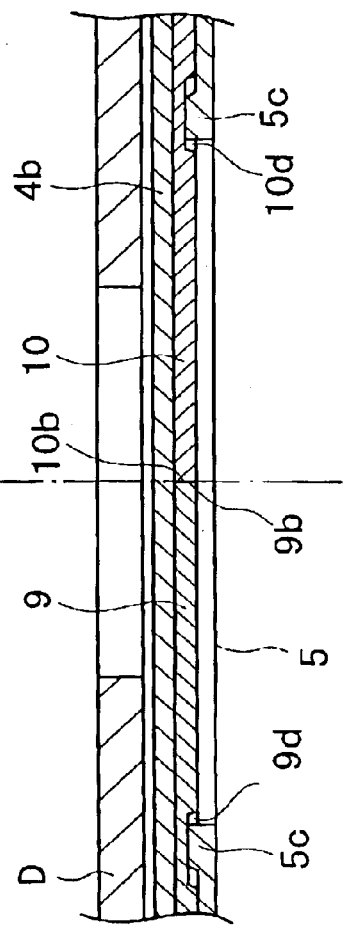
FIG. 13A
FIG. 13B

F I G. 1 4
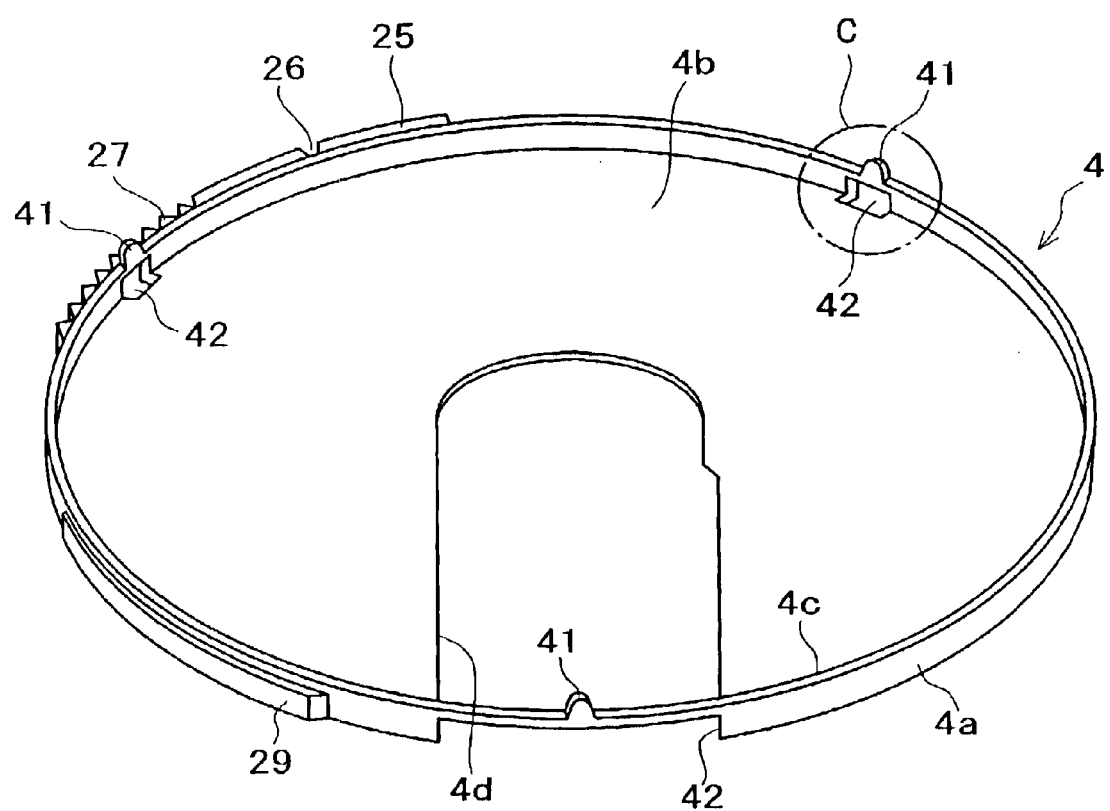

E-E

D-D

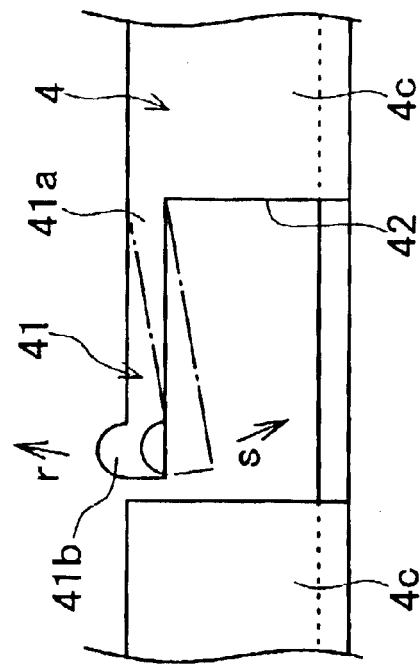
F I G. 1 8 A
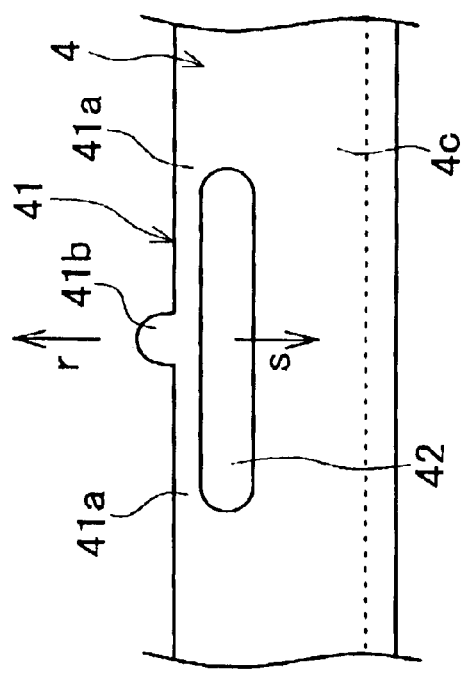
F I G. 1 8 B

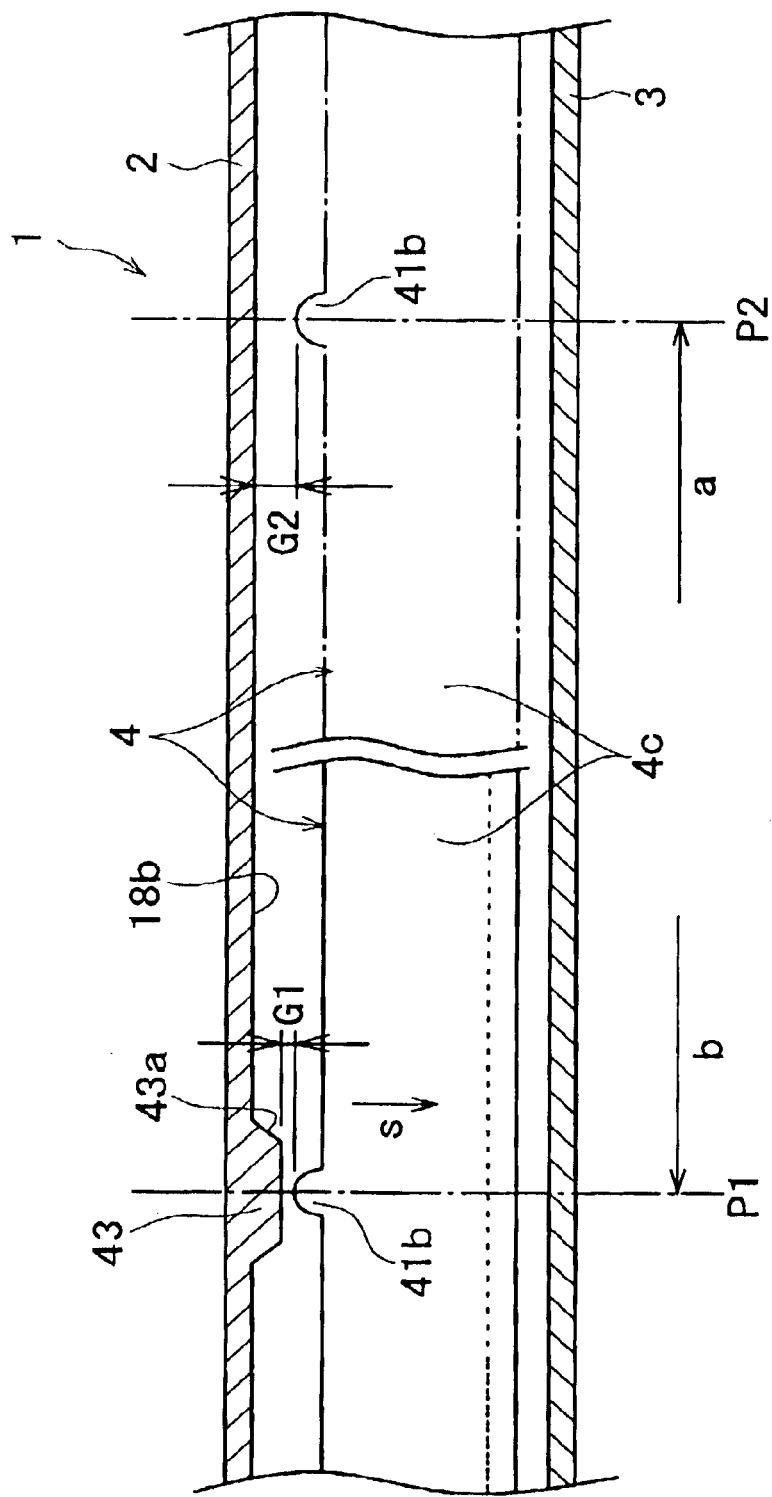

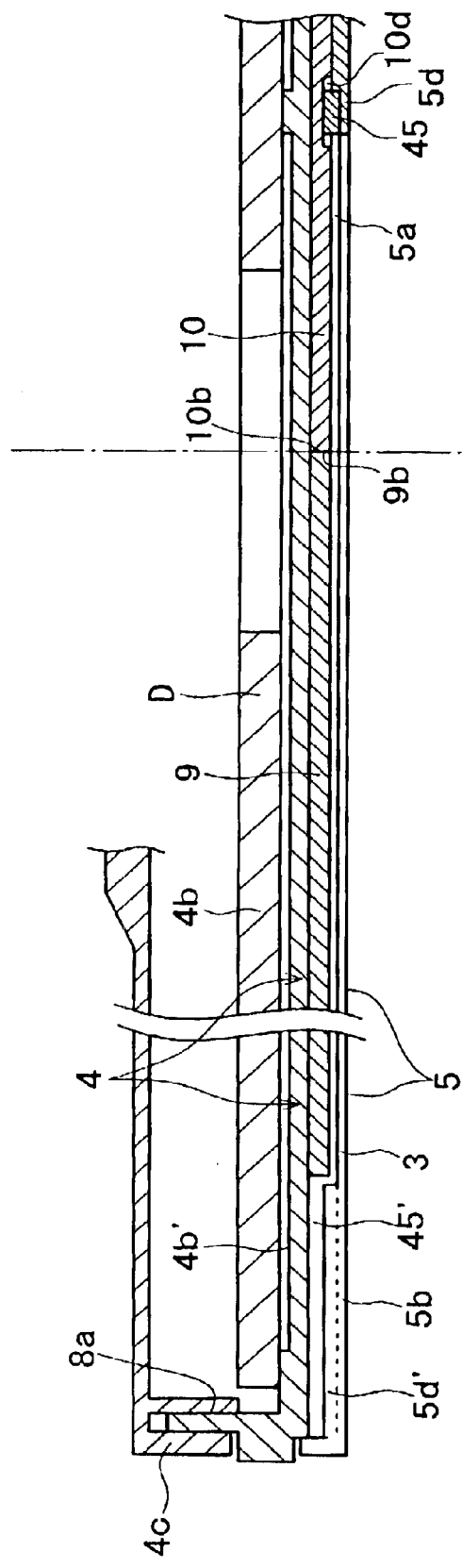
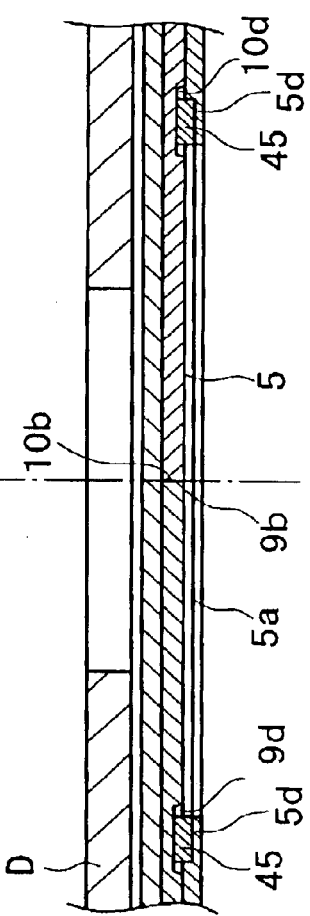
FIG. 21A
FIG. 21B

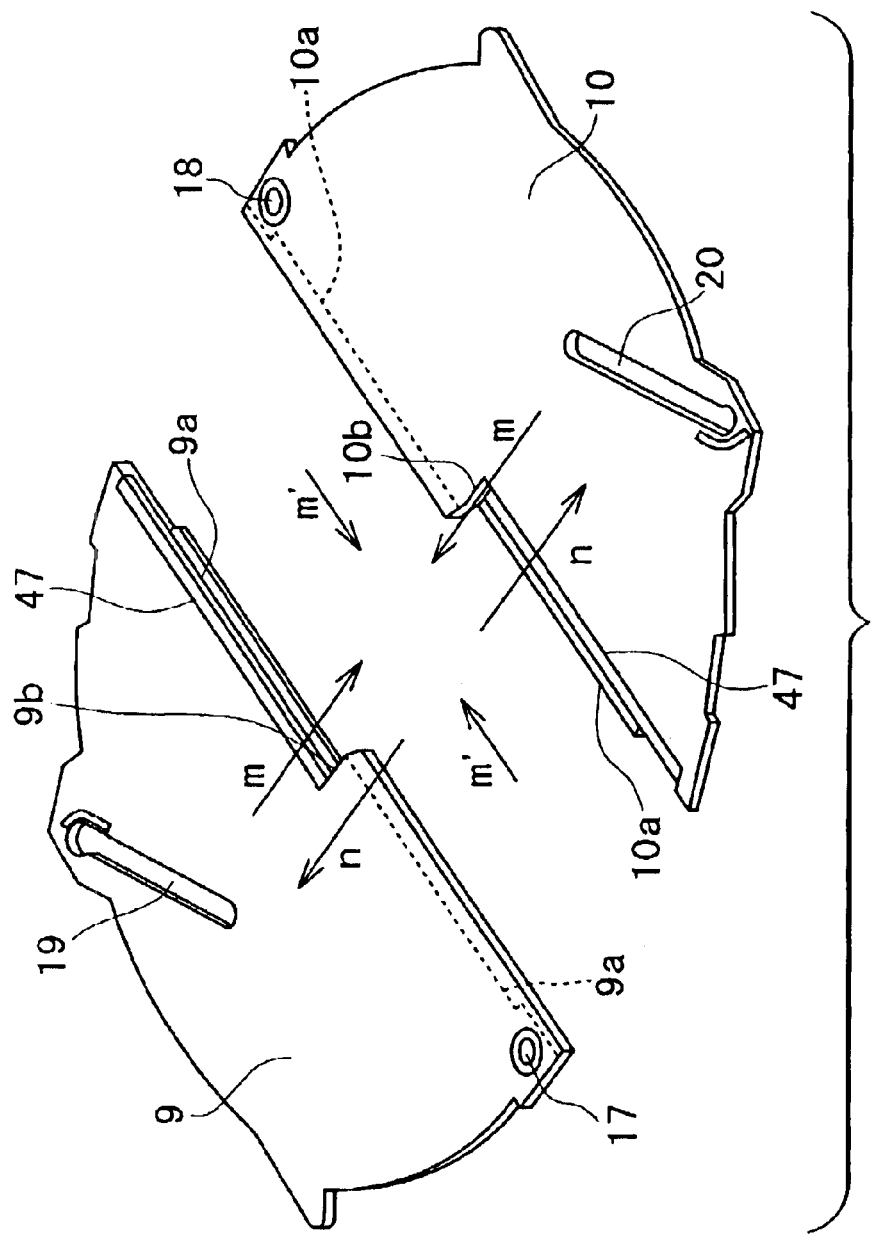

F I G. 2 4
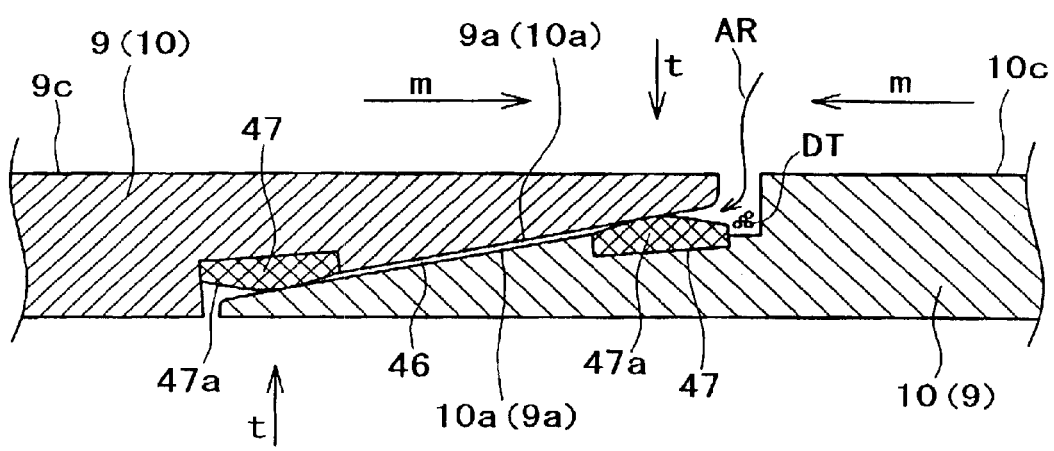

FIG. 29A
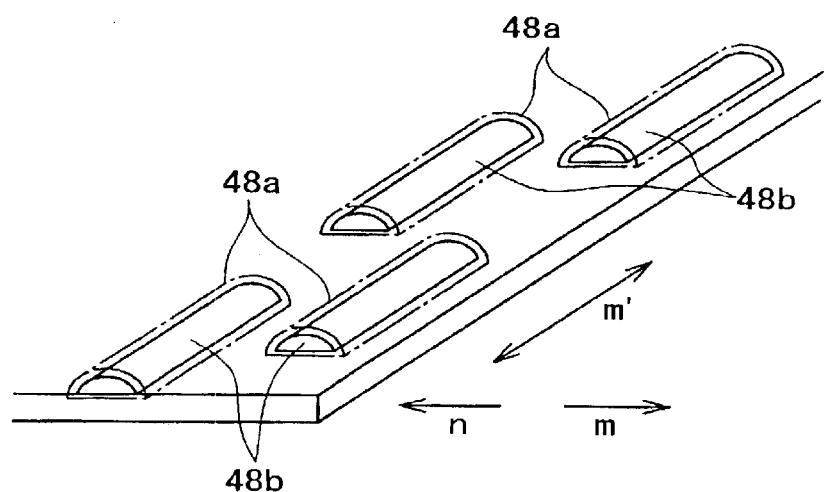
FIG. 29B
(1) 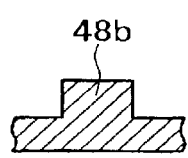
(2) 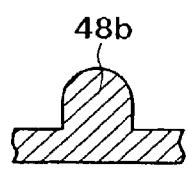
(3) 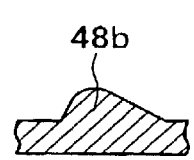
(4) 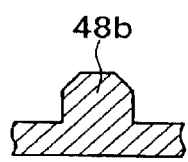
(5) 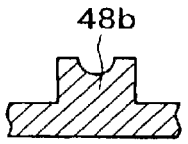
(6) 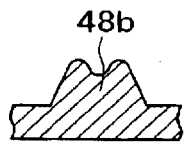
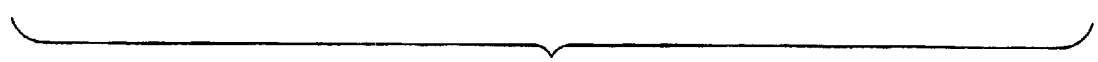

F I G. 4 9
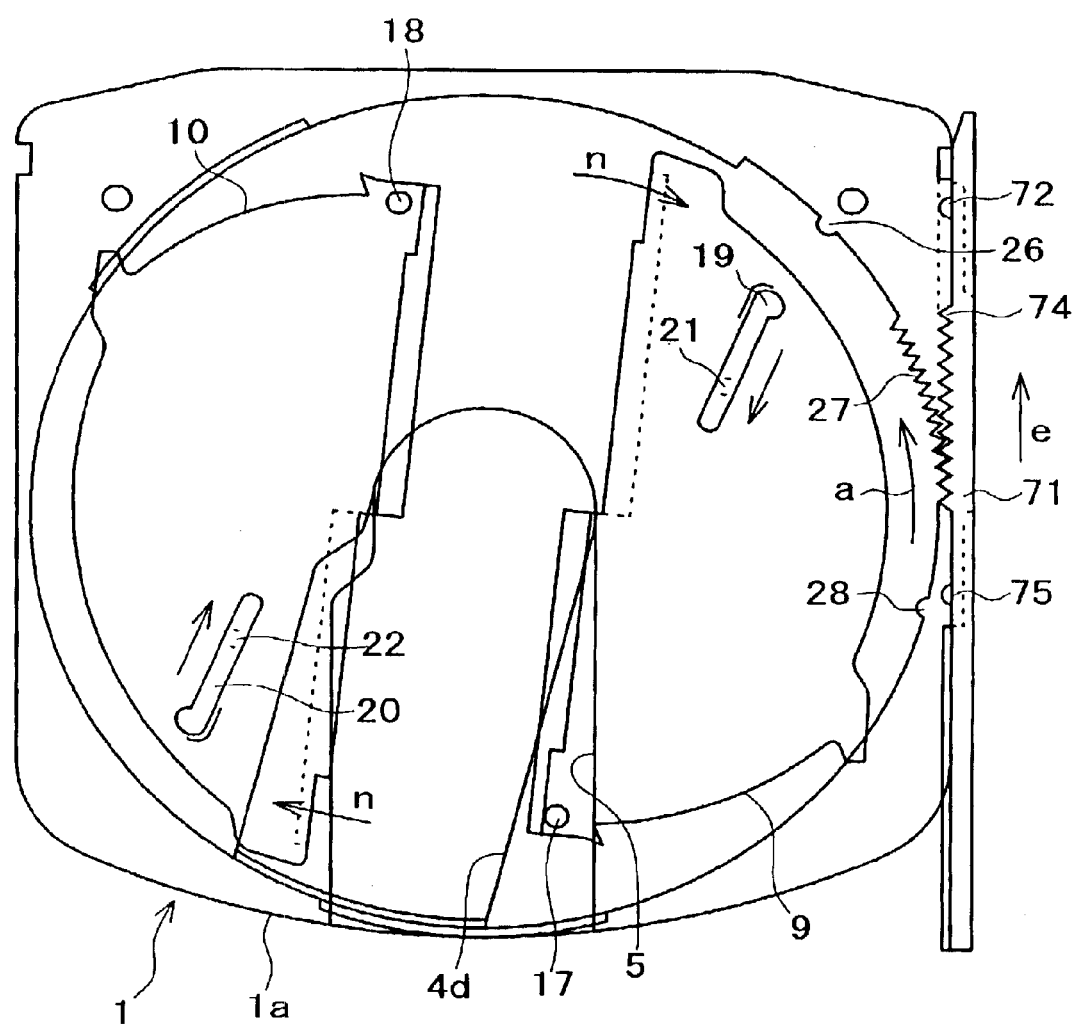

F I G. 5 0
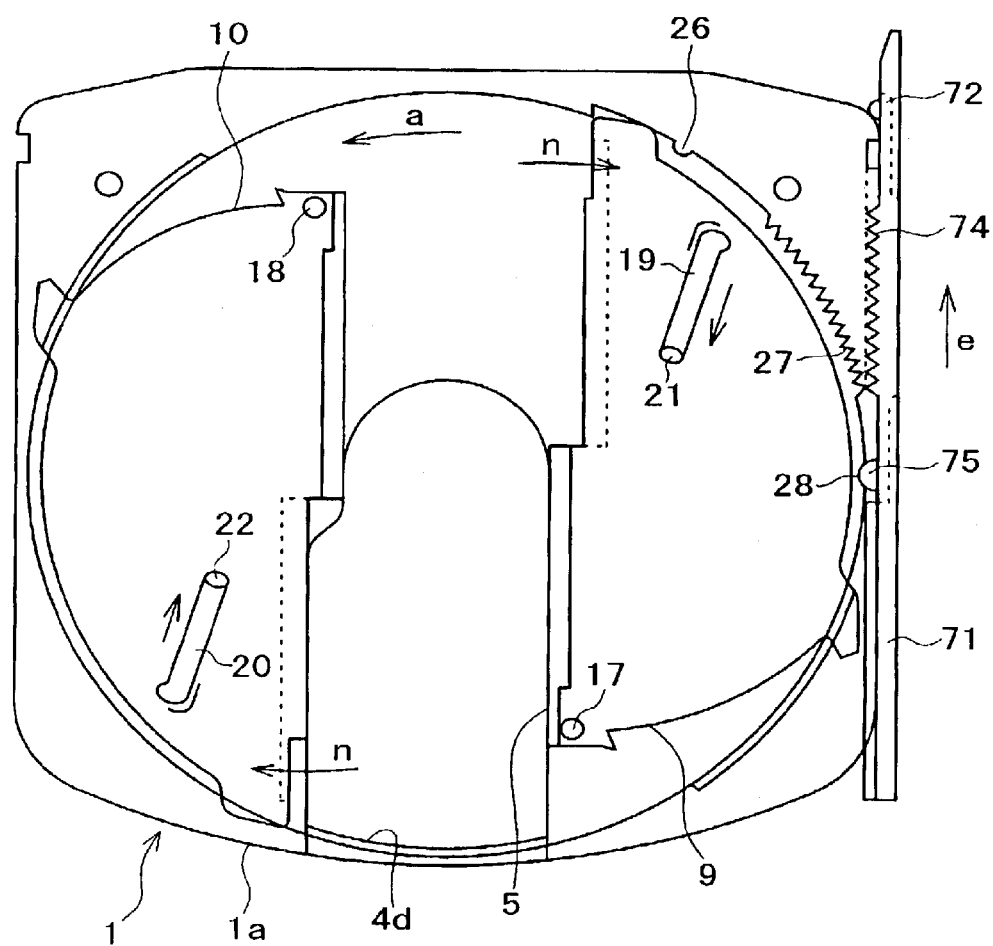

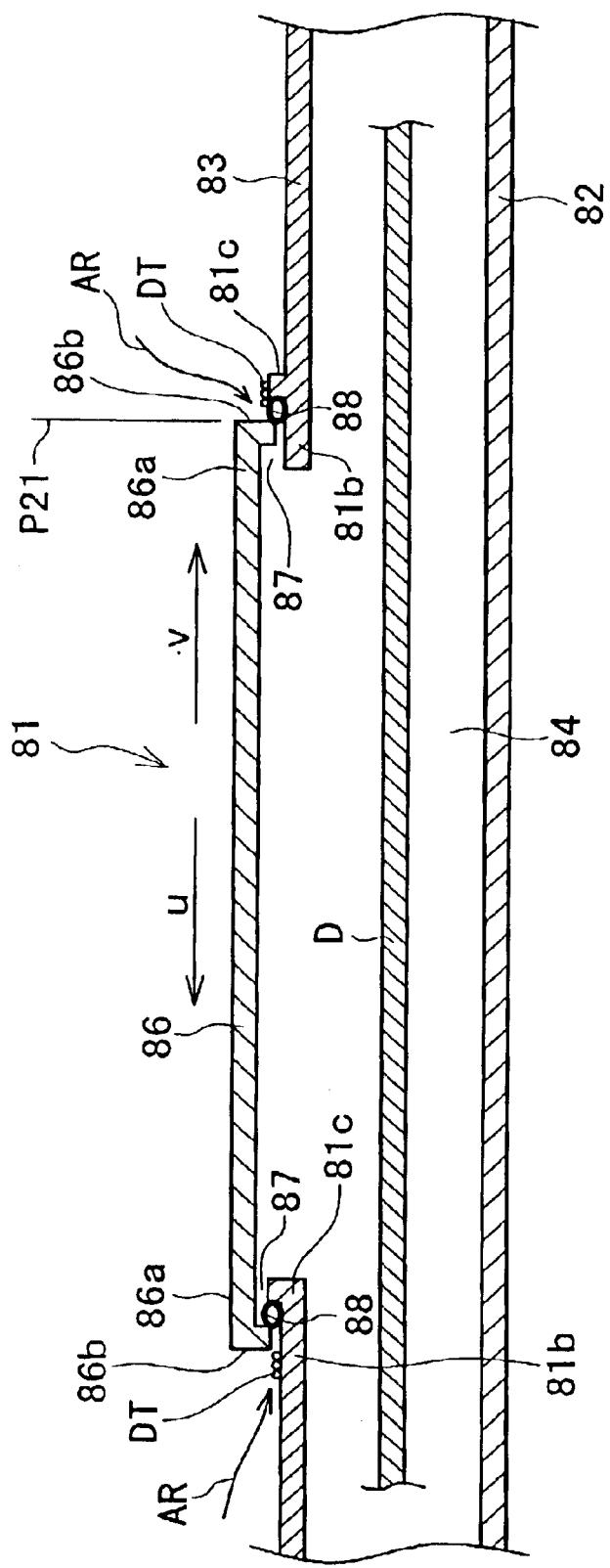

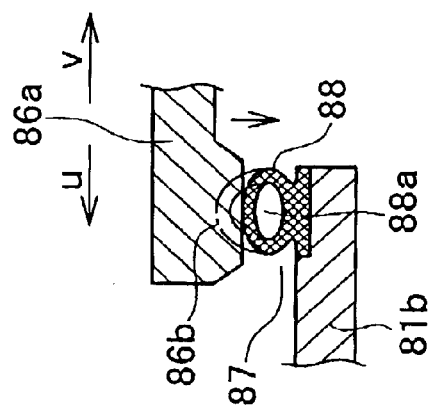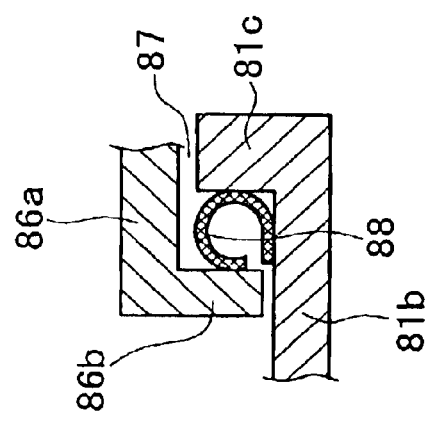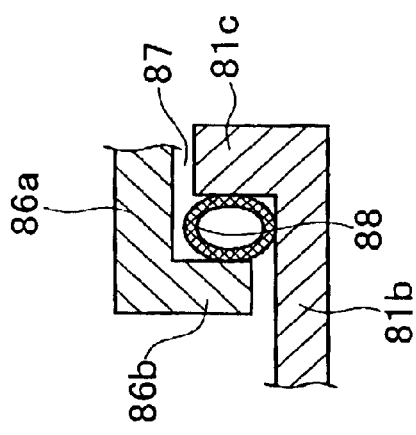

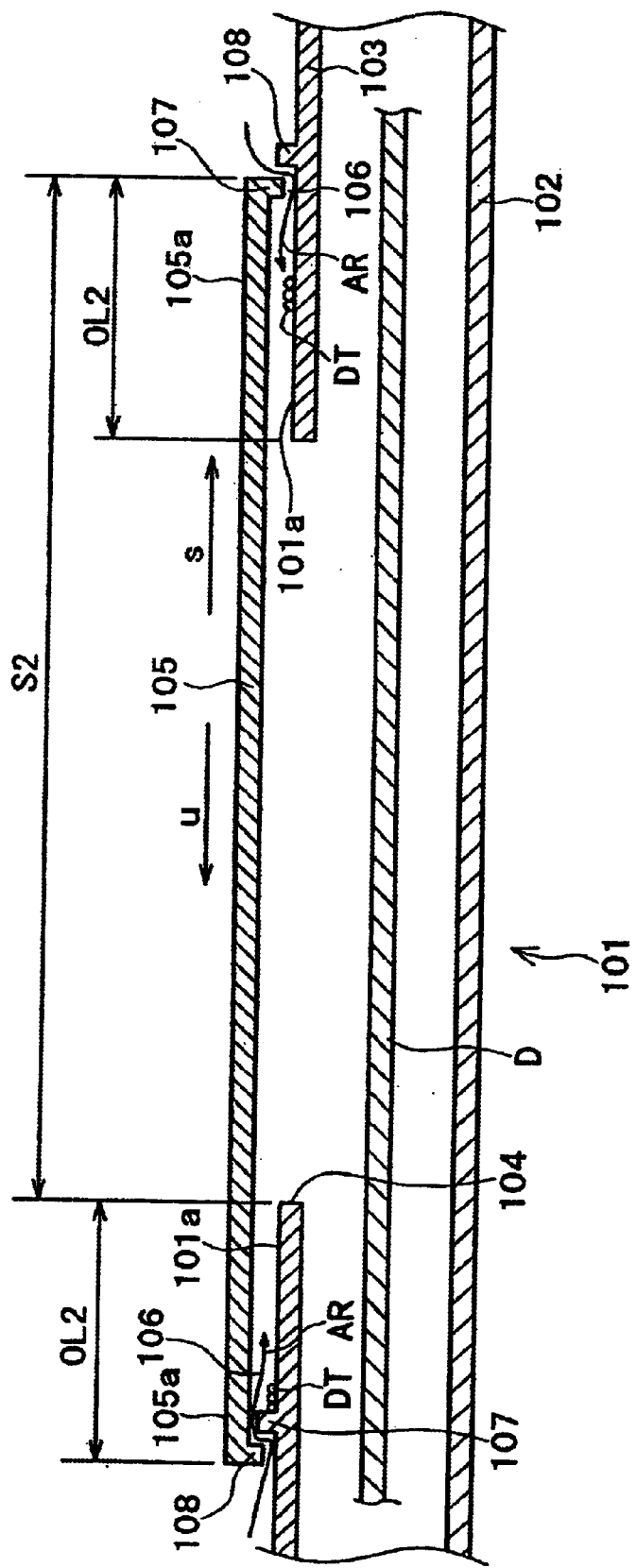

DISC CARTRIDGE WITH SHUTTER OVERLAPPING GAP HAVING LABYRINTH SHAPED PORTION SPACED TO HAVE A RECESSED DUST DEPOSITION PORTION

BACKGROUND OF THE INVENTION

The present invention relates to a cartridge suitable as a disk cartridge for housing or exchangeably housing a recording medium such as an optical disk or a magneto-optical disk, for example, an MO or DVD-RAM. In particular, the present invention pertains to the technical field of a dustproof structure for preventing permeation of dust in a cartridge of a type including a shutter for opening/closing an opening portion through which an insertion member such as a pickup or a disk table is to be inserted in the cartridge.

FIG. 60 shows a related art disk cartridge 101 such as an MO, DVD, or DV-ROM. The disk cartridge 101 includes an upper shell 102 and a lower shell 103 between which a disk D such as an optical disk or a magneto-optical disk is to be rotatably housed. A slot-shaped opening portion 104 for insertion of a pickup and a disk table therethrough is formed along the lower shell 103 or along a central portion between the upper and lower shells 102 and 103. A shutter 105 formed into a nearly L-shape or U-shape for opening/closing the opening portion 104 is mounted to the outside of the lower shell 103 or the outside of the upper and lower shells 102 and 103. In operation, the shutter 105 is slid in the directions "u" and "v" along one side surface 101a of the disk cartridge 101, to open/close the opening portion 104.

With respect to a dustproof mechanism, however, the above-described related art disk cartridge 101 is only configured as follows: namely, as shown in FIG. 61, in a shutter closed state that the shutter 105 closes the opening portion 104 in the direction "v", both ends 105a of the shutter 105 in the directions "u" and "v" are overlapped to both side edges of the opening portion 104 of the disk cartridge 101 by distances OL1. It is to be noted that in the figure, character S1 denotes a movement stroke (or opening/closing stroke) of the shutter 105.

Accordingly, in such a shutter closed state, air AR containing dust DT is easy to permeate in the disk cartridge 101 through the opening portion 104 via small gaps 106 between both the ends 105a of the shutter 105 and both the side edges of the opening portion 104 of the disk cartridge 101, with a result that the dust DT is liable to adhere on the surface of the disk D. The adhesion of the dust DT on the surface of the disk D tends to cause errors at the time of recording and/or reproducing operation of data, and such errors are difficult to be corrected. In this way, the permeation of the dust DT causes a problem in the high density recording disk cartridge.

To solve the above problem, it may be considered to provide a dustproof structure shown in FIG. 62. As shown in the figure, a pair of parallel inner ribs 107 are formed on both the ends 105a of the shutter 105 in the directions "u" and "v" as the slide directions in such a manner as to project downwardly therefrom, and a pair of parallel outer ribs 108 are formed on portions, outside of both the side edges, of the opening portion 104 of the disk cartridge 101 in such a manner as to project upwardly therefrom, to thereby form gaps 106 bent into nearly L-shapes at both the side edges of the opening portion 104. Such a dustproof structure is effective to reduce the permeation of the air AR containing the dust DT in the disk cartridge 101 to some extent.

The above-described dustproof structure, however, has a disadvantage. The gaps 106 between both the ends of the shutter 105 and both the side edges of the opening portion 104 of the disk cartridge 101 cannot be made zero because the shutter 105 must be slid in the directions "u" and "v" relative to the disk cartridge 101. As a result, the dust DT composed of particles in the order of $\mu m$ is liable to permeate in the disk cartridge 101 through the gaps 106.

Alternatively, it may be considered to provide a dustproof structure shown in FIG. 63, which structure is modified from that shown in FIG. 62. As shown in the figure, overlapped amounts OL2 between both the ends 105a of the shutter 105 and both the side edges of the opening portion 104 of the disk cartridge 101 are made sufficiently longer, to increase the flow resistance of the air AR containing the dust DT permeating from the pair of gaps 106, thereby suppressing the permeation of the air AR.

The above-described dustproof structure, however, has problems that since the movement stroke (or opening/closing stroke) S2 of the shutter 105 becomes large, such a structure is unstable for the small-sized disk cartridge 101, and that it is difficult to prevent permeation of the dust DT composed of particles in the order of $\mu m$ for the same reason as that described with reference to FIG. 62.

SUMMARY OF THE INVENTION

An object of the present invention is to provide a cartridge capable of effectively preventing permeation of air containing dust in the cartridge through a gap formed at a portion where a shutter and the cartridge are overlapped to each other in a state that an opening portion is closed with the shutter.

To achieve the above object, according to a first aspect of the present invention, there is provided a cartridge including an opening portion and a shutter for opening/closing the opening portion, including a labyrinth shape portion having a recessed dust deposition portion, the labyrinth shape portion being disposed in a gap formed at a portion at which the shutter and the cartridge are overlapped to each other in a closed state that the shutter closes the opening portion.

According to a second aspect of the present invention, there is provided a cartridge including an opening portion and a plurality of shutters for opening/closing the opening portion, including a labyrinth shape portion having a recessed dust deposition portion, the labyrinth shape portion being disposed in a gap formed at a portion where the plurality of shutters are overlapped to each other in a closed state that the plurality of shutters are overlapped to each other to close the opening portion.

According to a third aspect of the present invention, there is provided a cartridge including an opening portion, a rotatable inner rotor, and a shutter for opening/closing the opening portion from inside by rotation of the inner rotor, including a labyrinth shape portion having a recessed dust deposition portion, the labyrinth shape portion being disposed in a gap formed at a portion where the shutter and the opening portion are overlapped to each other in a closed state that the shutter closes the opening portion from inside.

According to a fourth aspect of the present invention, there is provided a cartridge including an opening portion, a rotatable inner rotor, and a plurality of shutters for opening/closing the opening portion by rotation of the inner rotor, including a labyrinth shape portion having a recessed dust deposition portion in a gap formed at a portion where the plurality of shutters are overlapped to each other in a closed state that the plurality of shutters are overlapped to each other to close the opening portion from inside.

With these configurations, since a gap formed at a portion where a cartridge and a shutter for opening/closing an opening portion are overlapped to each other or a portion where a plurality of shutters for opening/closing the opening portion are overlapped to each other in a state that an opening portion is closed with the shutter or the plurality of shutters is configured as a labyrinth shape portion having a recessed dust deposition portion, it is possible to separate dust from the air and deposit the dust in the recessed dust deposition portion at the time when the air containing dust passes through the labyrinth shape portion.

BRIEF DESCRIPTION OF THE DRAWINGS

These and other objects, features, and advantages of the present invention will be more apparent from the following description in conjunction with the accompanying drawings, wherein:

FIG. 2 is an exposed perspective view of an upper shell and a lower shell of the disk cartridge using the inner rotor, wherein the upper shell and the lower shell are each depicted as turned in the vertical direction;

FIG. 12 is a top view showing the open state of pair of the shutters shown in. FIG. 11;

FIGS. 13A and 13B are enlarged sectional views taken on line A—A and line B—B, respectively;

FIG. 14 is a perspective view of the inner rotor of the disk cartridge using the inner rotor;

FIGS. 15A, 15B, 15C and 15D are views for explaining a spring action portion of the inner rotor, wherein FIG. 15A is an enlarged top view of a C portion shown in FIG. 14, FIG. 15B is a sectional view taken on line D—D in FIG. 15A, FIG. 15C is a sectional view taken on line E—E in FIG. 15A, and FIG. 15D is a sectional view taken on line F—F in FIG. 15A;

FIGS. 18A and 18B are side views of two variations of the spring action portion of the inner rotor;

FIG. 19 is a side view for explaining a problem of a related art inner rotor having no spring action portion;

FIGS. 21A and 21B are enlarged sectional views taken on line I—I and line J—J in FIG. 20, respectively, for explaining a second dustproof structure;

FIG. 23 is a perspective view of the pair of shutters of the disk cartridge using the inner rotor for explaining a third dustproof structure including an elastic member for dust-proofing tilt plane portions for overlap of the shutters;

FIG. 24 is an enlarged sectional view of a K portion shown in FIG. 1 for explaining a third dustproof structure for dust-proofing the tilt plane portions for overlap of the pair of shutters in FIG. 23, wherein the shutters are each depicted as turned in the vertical direction;

FIGS. 29A and 29B are a perspective view and a plan view showing a plurality of modifications of a structural portion forming the labyrinth shape portion in the fourth dust proof structure, respectively;

FIG. 49 is a perspective bottom view showing an opening action of the pair of shutters, which action is continued from that shown in FIG. 48;

FIG. 50 is a perspective bottom view showing an opening action of the pair of shutters, which action is continued from that shown in FIG. 49;

FIG. 53 is an enlarged sectional view of an N portion shown in FIG. 52 for explaining a first dustproof structure including an elastic member in the disk cartridge using the slide shutter;

FIGS. 54A, 54B, and 54C are enlarged sectional views of three modifications of the elastic member in the first dustproof structure;

FIG. 63 is a sectional view, similar to FIG. 62, for examining the prevention of permeation of dust in the related art disk cartridge using the slide shutter through the opening portion.

DETAILED DESCRIPTION OF THE PREFERRED EMBODIMENTS

Hereinafter, preferred embodiments of disk cartridges to which the present invention is applied will be described with reference to the drawings. The description of the embodiments will be made in the following order:

(1) Description of Outline of Disk Cartridge Using Inner Rotor (FIGS. 1 to 13)
(2) Description of First Dustproof Structure of Disk Cartridge Using Inner Rotor (FIGS. 6 to 18)
(3) Description of Second Dustproof Structure of Disk Cartridge Using Inner Rotor (FIGS. 20 to 22)
(4) Description of Third Dustproof Structure of Disk Cartridge Using Inner Rotor (FIGS. 23 to 26)
(5) Description of Fourth Dustproof Structure of Disk Cartridge Using Inner Rotor (FIGS. 27 to 29)
(6) Description of Fifth Dustproof Structure of Disk Cartridge Using Inner Rotor (FIGS. 30 to 34)
(7) Description of Rotating Mechanism of Inner Rotor of Disk Cartridge Using Inner Rotor (FIGS. 35 to 51)
(8) Description of First Dustproof Structure of Disk Cartridge Using Slide Shutter (FIGS. 52 to 54)
(9) Description of Second Dustproof Structure of Disk Cartridge Using Slide Shutter (FIGS. 55 to 57)
(10) Description of Third Dustproof Structure of Disk Cartridge Using Slide Shutter (FIGS. 58 and 59)
(1) Description of Outline of Disk Cartridge Using Inner Rotor The outline of a disk cartridge using an inner rotor will be first described with reference to FIGS. 1 to 13.

Figure 1:
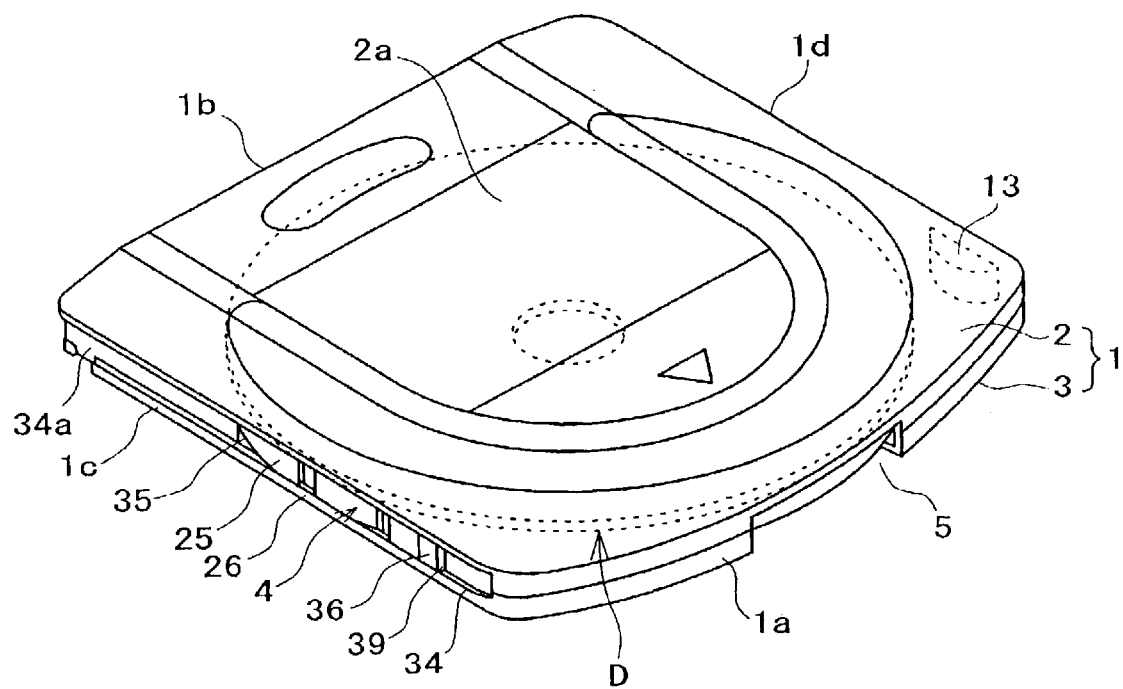
FIG. 1 is a perspective view of a disk cartridge using an inner rotor to which the present invention is applied.
Figure 3:
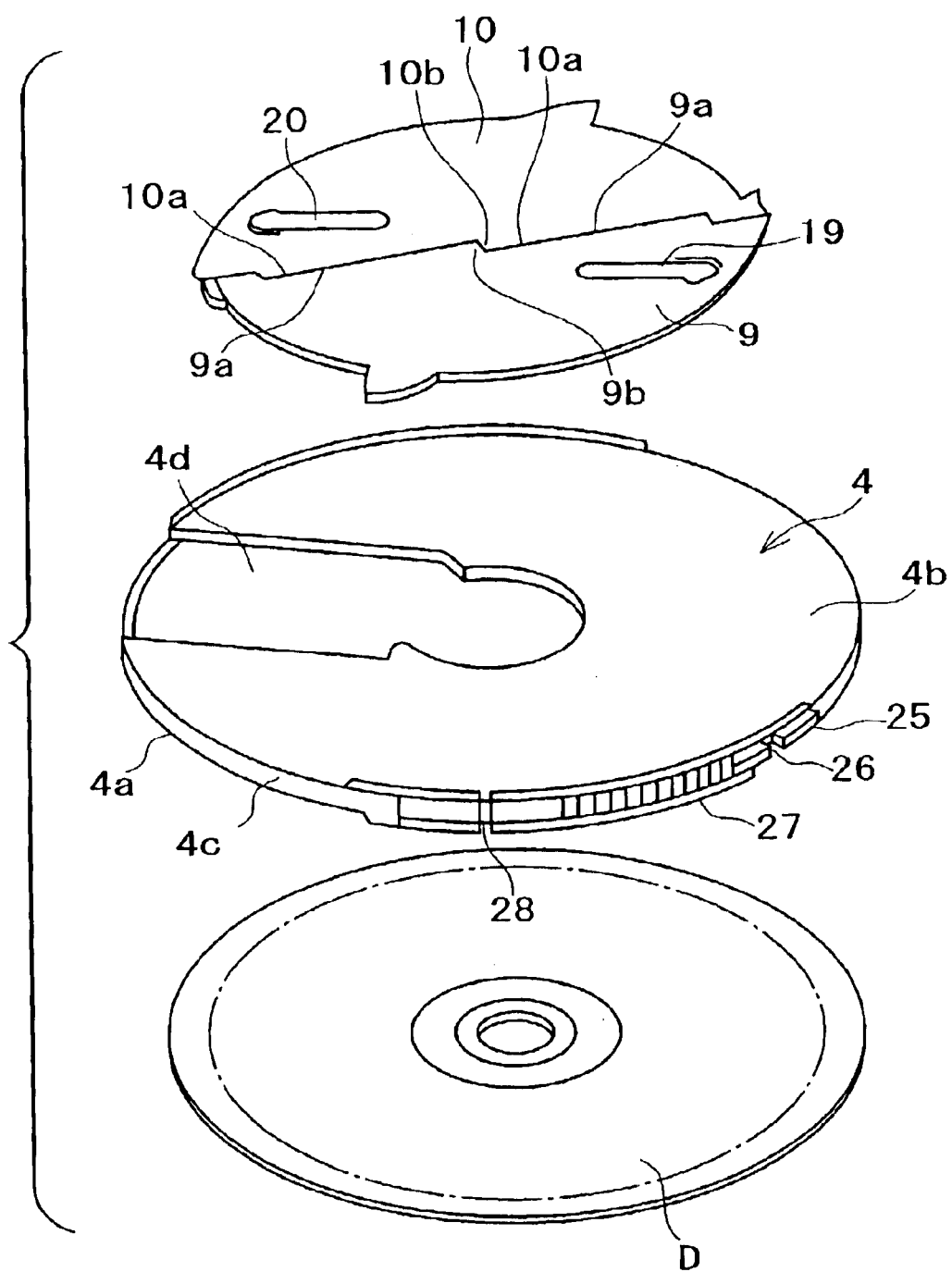
FIG. 3 is an exploded perspective view of a disk, an inner rotor, and a pair of shutters of the disk cartridge using the inner rotor, wherein the disk, the inner rotor, and the shutters are each turned in the vertical direction.
Figure 4:
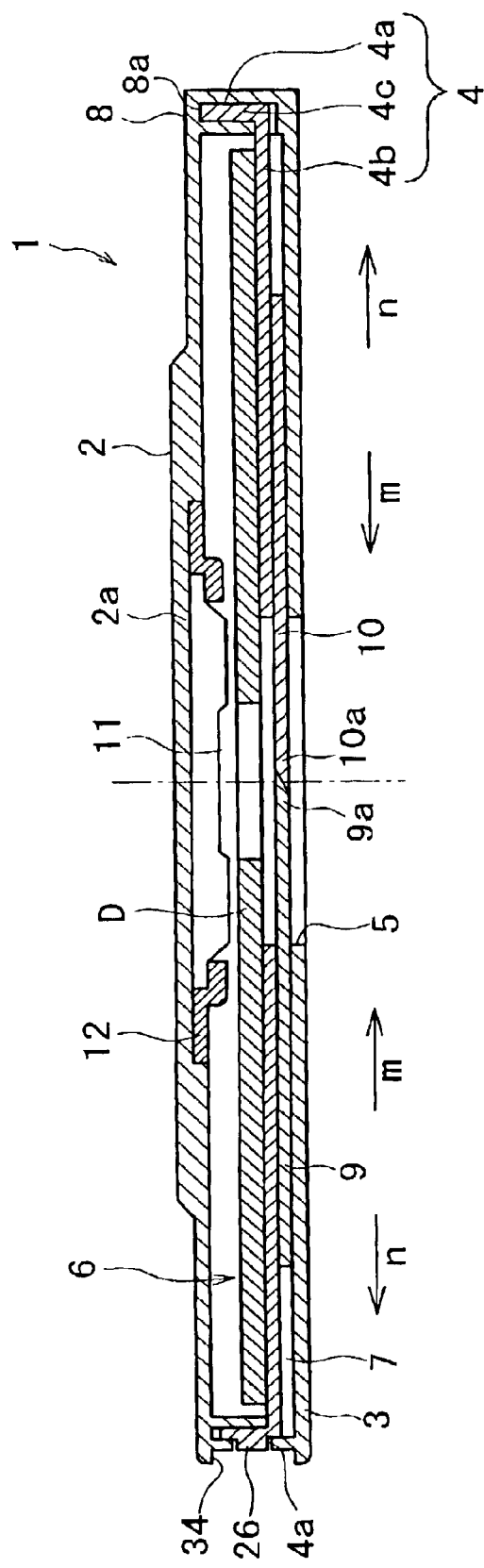
FIG. 4 is a sectional front view taken along a center plan, showing the disk cartridge using the inner rotor.
Figure 5:
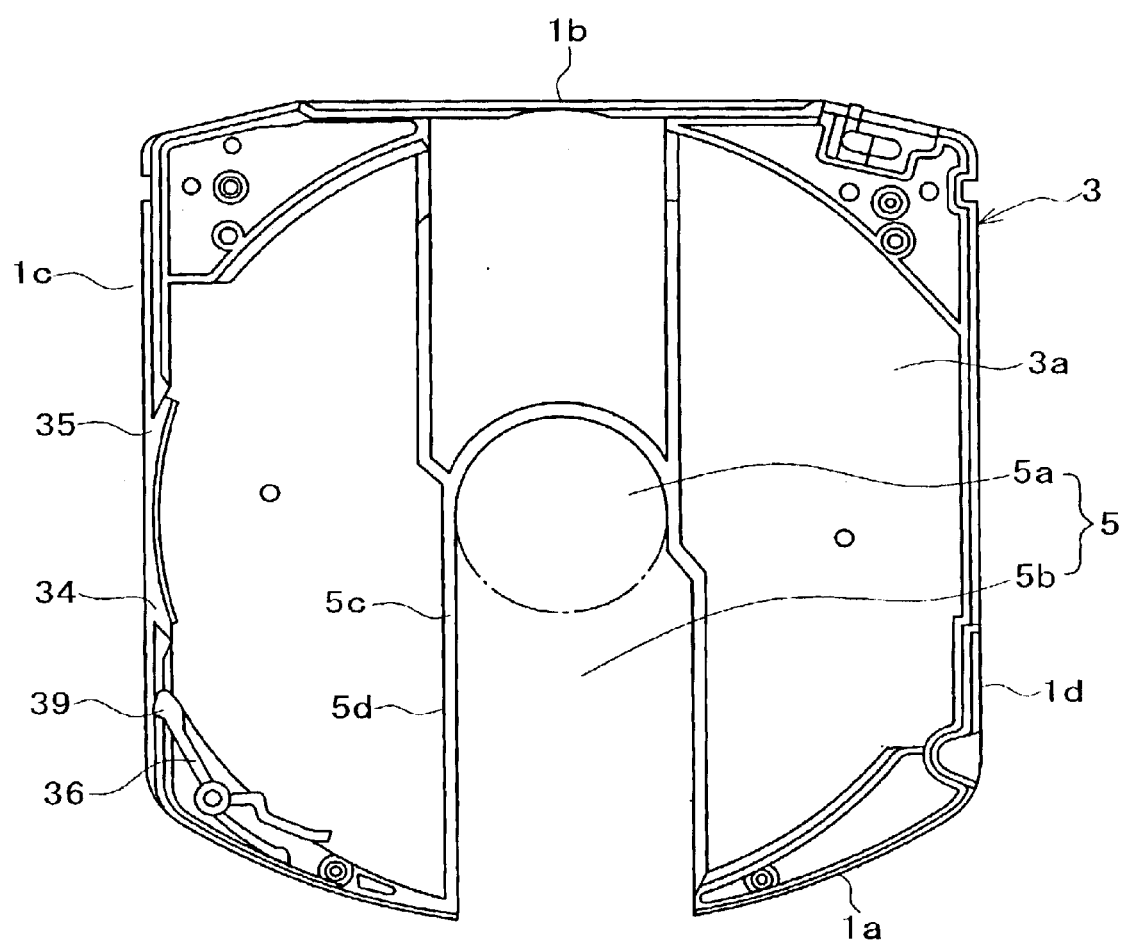
FIG. 5 is a top view of the lower shell of the disk cartridge using the inner rotor.
Figure 6:
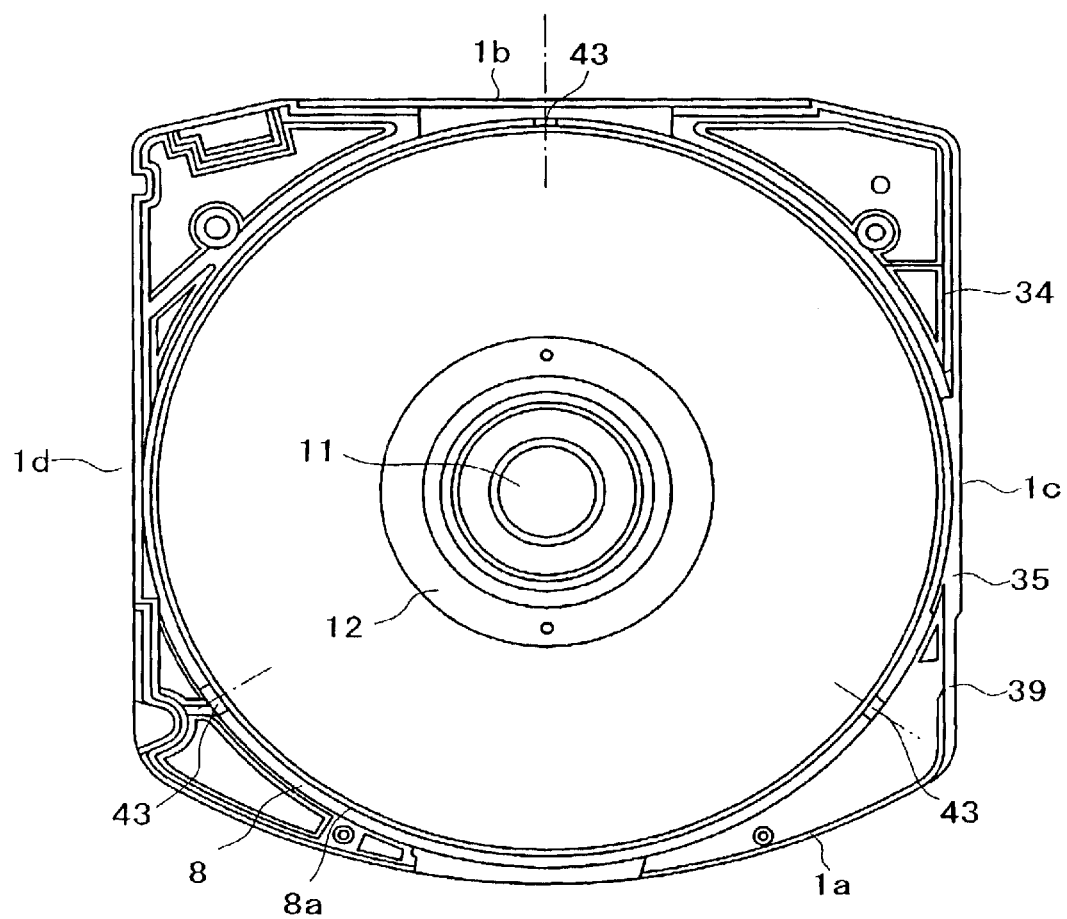
FIG. 6 is a bottom view of the upper shell of the disk cartridge using the inner rotor.

Referring to FIG. 1, there is shown a disk cartridge using an inner rotor 1 (hereinafter, referred to simply as "disk cartridge"), which is one example of recording medium housing cartridges incorporating recording medium housing portions. The disk cartridge 1 includes an upper shell 2 and a lower shell 3, an inner rotor 4, and a pair of shutters 9 and 10, each of which is formed of a molded product of a synthetic resin or the like. The disk cartridge 1 has a flat, nearly square shape as a result of vertically connecting the upper and lower shells 2 and 3 substantially symmetric with each other to each other.

The disk cartridge 1 has a front surface 1a curved into a gentle circular-arc, and a rear surface 1b extending in straight-line. Left and right ends of the rear surface 1b have taper portions symmetrical with each other. The disk cartridge 1 also has left and right side surfaces 1c and 1d extending nearly in parallel to each other. While not shown, the front surface 1a has taper portions each spread at a small angle.

A recessed groove 34 is formed in the side surface 1c in such a manner as to horizontally extend along a central portion of the side surface 1c in the thickness direction. A window hole 35 and a hole 39 are opened in a bottom surface 34a of the recessed groove 34.

An opening portion 5 having a slot shape is formed so as to extend from a nearly central portion of the lower shell 3 to a central portion of the front surface 1a. A circular hole portion, positioned at a nearly central portion of the lower shell 3, of the opening portion 5 is taken as a disk table insertion hole 5a. A slot portion, positioned in front of the disk table insertion hole 5a, of the opening portion 5 is taken as a pickup insertion hole 5b. The opening portion 5 is thus adapted to allow insertion of insertion members such as a disk table and a pickup therethrough.

The inner rotor 4 is formed into a circular dish shape. An outer peripheral wall 4c having a circular, upright shape is integrally formed on the outer periphery of a bottom portion 4b of the inner rotor 4. An opening portion 4d analogous to the opening portion 5 of the lower shell 3 is formed so as to extend from a central portion of the bottom portion 4b to the outer periphery thereof. The inner rotor 4 is horizontally assembled in and rotatably mounted to a circular inner rotor housing portion 8 formed between the upper and lower shells 2 and 3.

A disk housing portion 6 as a recording medium housing portion is formed, on the bottom portion 4b of the inner rotor 4, as a space surrounded by the outer peripheral wall 4c. A disk D such as a DVD as a disk-like recording medium is horizontally housed in the disk housing portion 6 in such a manner as to be rotatable and vertically movable for a specific distance.

A clamper supporting ring 12 is fixed on the back surface of the upper shell 2 by welding or the like. A disk clamper 11, which is formed into a nearly disk-shape from a ferromagnetic material, is mounted on a central portion of the back surface of the upper shell 2 by the damper supporting ring 12. The disk clamper 11 is supported in a state being rotatable relative to the upper shell 2 and vertically movable for a distance in a specific range. A swelled portion 2a having a nearly U-shape is formed on a central portion of the upper surface of the upper shell 2. In addition, a semi-circular recess 13 for lock is formed in the side surface 1d of the disk cartridge 1 at a position offset to the front surface 1a side.

A shutter housing space 7 is horizontally formed between the bottom portion 4b of the inner rotor 4 and the lower shell 3. A pair of shutters 9 and 10, each of which is formed of a thin plate having a nearly semi-circular shape, is housed in the shutter housing space 7 at the same level.

A shutter opening/closing mechanism 16 for opening/closing the pair of shutters 9 and 10 by rotating the inner rotor 4 is assembled between the bottom portion 4b of the inner rotor 4 and the lower shell 3. The shutter opening/closing mechanism 16 has a pair of mechanism portions integrally formed on the back surface of the bottom portion 4b of the inner rotor 4 at positions opposed to each other by 180°.

The shutter opening/closing mechanism 16 is configured as a so-called cam mechanism including a pair of turning fulcrum pins 17 and 18, a pair of cam grooves 19 and 20, and a pair of cam pins 21 and 22. The turning fulcrum pins 17 and 18 are turnable integrally with the inner rotor 4 while rotatably supporting opposed ends of the pair of shutters 9 and 10. The cam grooves 19 and 20 are formed in opposed end portions of the pair of shutters 9 and 10 in such a manner as to extend nearly in parallel to each other. The cam pins 21 and 22 as fixed pins are integrally formed on a bottom portion 3a of the lower shell 3 at positions opposed to each other by 180°.

The opening/closing motion of the shutter opening/closing mechanism 16 opened/closed by rotation of the inner rotor 4 will be described below.

The closing motion of the shutter opening/closing mechanism 16 will be first described with reference to FIGS. 4, 7, 9 and 11.

When the inner rotor 4 is rotated and returned in the direction "b" to a shutter opening/closing starting position (opening portion closing position) P1 (which will be described later), the opening portion 4d of the bottom portion 4b of the inner rotor 4 is rotated in the direction "b" around the disk table insertion hole 5a of the opening portion 5 of the lower shell 3 to a close position. At such a close position of the opening portion 4d of the bottom portion 4b of the inner rotor 4, an outer peripheral end portion of the pickup insertion hole 5b of the opening portion 5 is closed from inside with an outer peripheral portion 4b' of the bottom portion 4b of the inner rotor 4.

At the same time, the pair of shutters 9 and 10 are moved nearly in parallel to each other in the opposed directions "m" by the shutter opening/closing mechanism 16, to be closed.

By the way, a pair of tilt planes 9a and 10a for overlap are formed along edges of the pair of shutters 9 and 10. The tilt planes 9a and 10a for overlap have Z-shapes in a plan view and symmetric to each other in the vertical direction.

Along with the movement of the pair of shutters 9 and 10, the pair of tilt planes 9a and 10a for overlap are moved in the opposed directions "m" and then overlapped to each other in the vertical direction at positions where they cross a portion near the center of the disk table insertion hole 5a of the opening portion 5.

As a result, an opening region, overlapped to inner peripheral portions of the disk table insertion hole 5a and the pickup insertion hole 5b, of the opening portion 4d of the inner rotor 4 are closed from inside to each other with the pair of shutters 9 and 10.

Accordingly, in the opening portion closed state, the entire opening portion 5 of the lower shell 3 is completely closed with the outer peripheral portion 4b' of the bottom portion 4b of the inner rotor 4 and the pair of shutters 9 and 10 located on the inner peripheral side from the outer peripheral portion 4b'.

The pair of tilt planes 9a and 10a for overlap are vertically inverted from each other with respect to orthogonal planes 9b and 10b which are formed at central portions of the tilt planes 9a and 10a in the length direction in such a manner as to be orthogonal to the directions "m". When the tilt planes 9a and 10a for overlap are moved in the opposed directions "m" and overlapped to each other by the shutter opening/closing mechanism 16, the orthogonal planes 9b and 10b are brought into tight-contact with each other by a movement force given to the pair of the shutters 9 and 10 in the directions "m" orthogonal to the directions "m" by the shutter opening/closing mechanism 16, to completely close the opening portion 5.

The opening motion of the shutter opening/closing mechanism 16 will be described with reference to FIGS. 8, 10 and 12.

When the inner rotor 4 is rotated in the direction "a" to a shutter opening/closing ending position (opening portion opening position) P2 (which will be described later), the pair of shutters 9 and 10 are turned nearly in parallel to each other in the directions "n" where they become apart from each other, by a so-called cam action of the pair of cam grooves 19 and 20 and the pair of cam pins 21 and 22 moved in synchronization with the turning motion of the pair of turning fulcrum pins 17 and 18 in the direction "a", to be opened in parallel to each other up to both side edges of the opening portion 5.

At this time, the opening portion 4d of the inner rotor 4 is completely overlapped to the opening portion 5, to completely open the entire opening portion 5.

(2) Description of First Dustproof Structure of Disk Cartridge Using Inner Rotor A first dustproof structure of the disk cartridge 1 will be described with reference to FIGS. 6 to 19.

Figure 11:
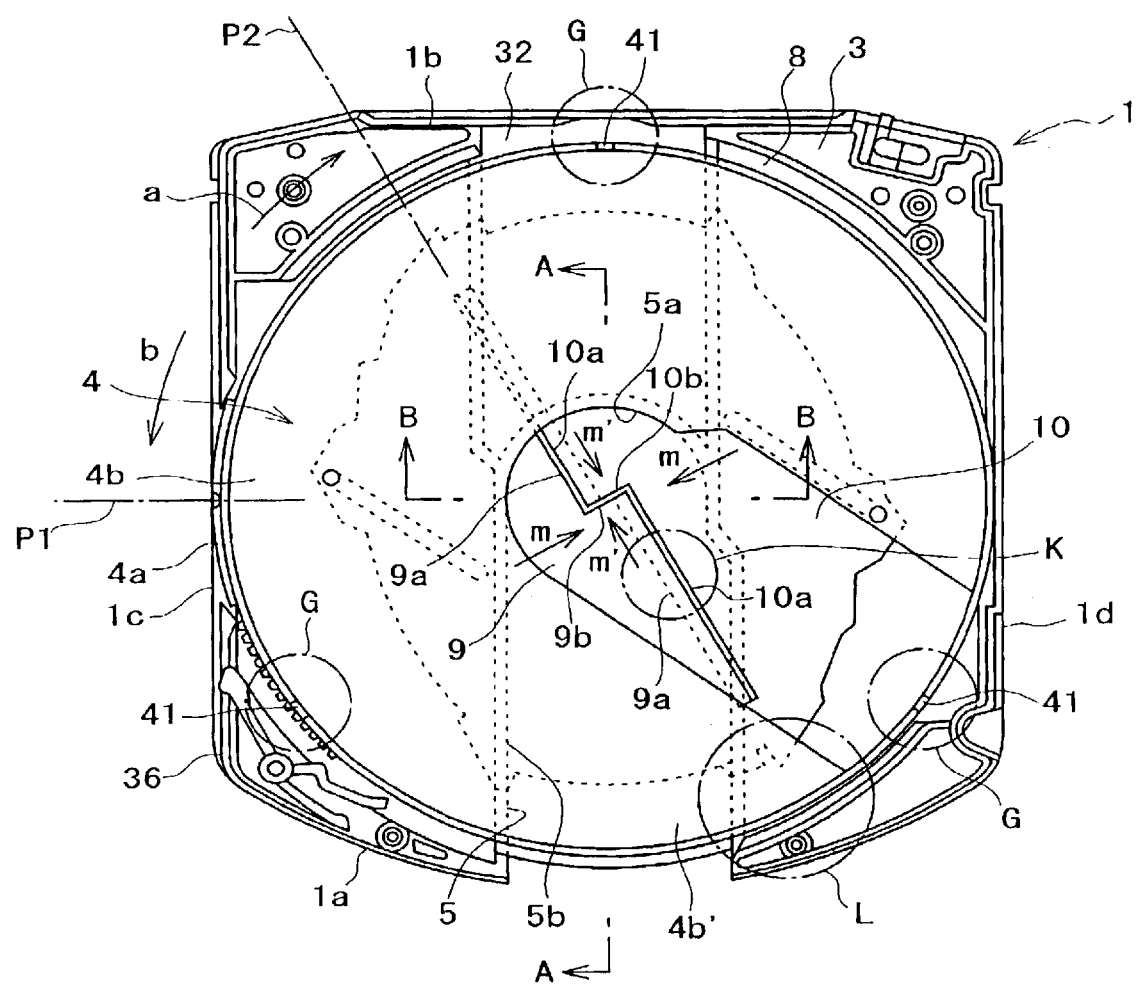
FIG. 11 is a top view of the lower shell, the inner rotor, and the pair of shutters of the disk cartridge using the inner rotor, showing the closed state of the pair of shutters.

The first dustproof structure includes a plurality (for example, three) of spring action portions 41 located, for example, at three G portions on the circular, upright outer peripheral wall 4c of the inner rotor 4 (see FIG. 11).

When the inner rotor 4 is returned, by rotation in the direction "b", from the opening portion opening position P2 shown in FIG. 12 to the opening portion closing position P1 shown in FIG. 11, spring forces are generated at the three spring action portions 41 as will be described in detail later, to press downwardly the three G portions of the outer peripheral wall 4c. As a result of such downward pressing forces, the bottom portion 4b of the inner rotor 4 is brought, from above, into elastic-contact with a peripheral portion, around the opening portion 5, of the bottom portion 3a of the lower shell 3 via the pair of shutters 9 and 10. This makes it possible to prevent the permeation of dust from the opening portion 5 into the disk cartridge 1.

The first dustproof structure will be more fully described below. As shown in FIGS. 14 to 17, the spring action portions 41 are integrally molded on the top of the outer peripheral wall 4c of the inner rotor 4 formed of a molded product of a synthetic resin or the like in such a manner as to horizontally extend at a plurality (for example, three) of positions. Each of the spring action portions 41 has both end portions 41a which are integrated with the outer peripheral wall 4c and thereby have a both end supporting beam structure, and also has a nearly semi-circular small projection 41b integrated with a central portion of the upper surface of the spring action portion 41.

As shown in FIGS. 14 to 17, three cutouts 42 for mold insertion are formed by cutout from the bottom portion 4b of the inner rotor 4 to the lower side of the outer peripheral wall 4c, and the spring action portion 41 is integrally molded on a portion over each of the cutouts 42 in such a manner as to horizontally extend across each of the cutouts 42.

The three cutouts 42 for mold insertion are generally called "cutouts for undercut". As described above, the three cutouts 42 extend from the bottom portion 4b of the inner rotor 4 to the undersides of the horizontal three spring action portions 41 formed on the top of the outer peripheral wall 4c. The structure having such three cutouts 42 is advantageous in eliminating the need of using a slide core of a complicated structure at the time of forming the inner rotor 4 by injection molding a molding material such as a synthetic resin in a mold. In other words, the three spring action portions 41 can be simply, integrally molded on the inner rotor 4 only by forming projections, which are to be inserted from below in the cutouts 42 for mold insertion, on a lower part of a vertical two-split type mold having the simplest structure. The use of such a two-split type mold significantly reduces the production cost as compared with a mold using a slide core, and hence significantly reduces the production cost of the inner rotor 4.

A shutter opening/closing starting projection 25 (to be described in detail later) is integrally molded on the outer periphery of the outer peripheral wall 4c of the inner rotor 4 at a position outside one spring action portion 41. FIGS. 14 and 15 show a state that the shutter opening/closing starting projection 25 crosses the upper side of the cutout 42 for mold insertion in the circumferential direction. Such a shutter opening/closing starting projection 25 can be injection-molded together with the cutouts 42 for mold insertion by using the above-described vertical two-split mold.

The three spring action portions 41 integrally molded on the top of the outer peripheral wall 4c of the inner rotor 4 are preferably arranged in the circumferential direction such that when the inner rotor 4 is returned, by rotation in the direction "b", to the opening portion closing position P1 as shown in FIG. 11, two of the spring action portions 41 are located at nearly symmetric positions opposed to the pickup insertion hole 5b of the opening portion 5 and the remaining spring action portion 41 is disposed at a central portion at the back of the disk table insertion hole 5a of the opening portion 5.

The upper edge portion of the circular inner rotor housing portion 8 formed between the upper and lower shells 2 and 3 has a circular groove 8a formed in the inner surface (back surface) of the edge portion of the upper shell 2. Three cam projections 43 are integrally formed at three positions of a downward bottom portion 8b of the circular groove 8a in such a manner as to project downwardly therefrom.

When the inner rotor 4 is returned, by rotation in the direction "b", to the opening portion closing position P1 as shown in FIG. 11, the three cam projections 43 are located directly on the three spring action portions 41. A tilt plane 43a is formed at least on a side surface on the direction "a" side of each of the three spring action portions 43.

Figure 7:
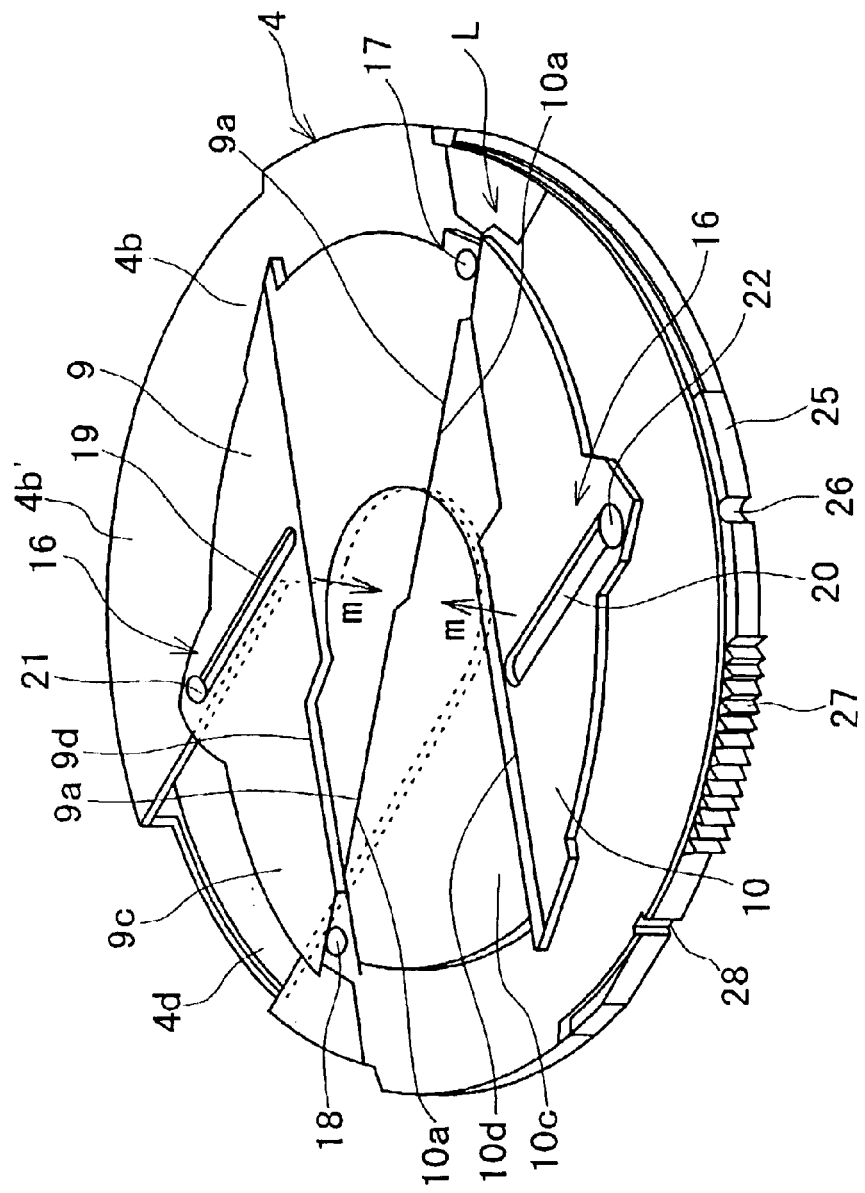
FIG. 7 is a perspective bottom view of the inner rotor and the pair of shutters of the disk cartridge using the inner rotor.

As shown in FIG. 13, a nearly U-shaped opening portion surrounding rib 5c having a low height is integrally formed on the inner surface (upper surface) of the bottom portion 3a of the lower shell 3 at a position surrounding the opening portion 5. On the other hand, as shown in FIGS. 7 and 11, shallow groove-like portions 9d and 10d are formed in back surfaces 9c and 10c of the pair of shutters 9 and 10.

When the pair of shutters 9 and 10 are closed by movement in the directions "m" and the tilt planes 9a and 10a for overlap are vertically overlapped by movement in the directions "m" to be thus assembled into a nearly U-shape, the shallow groove-like portions 9d and 10d formed in the back surfaces 9c and 10c of the shutters 9 and 10 are fitted in the opening portion peripheral rib 5c of the bottom portion 3a of the lower shell 3.

In addition, a stepped portion 5c' projecting upwardly by an amount equivalent to the thickness of the shutters 9 and 10 is formed on an outer peripheral portion, around the pickup insertion hole 5b (opposed to the disk table insertion hole 5a), of the opening peripheral rib 5c. The outer peripheral portion 4b' of the bottom portion 4b of the inner rotor 4 is to be brought into contact with the upper surface of the stepped portion 5c'.

The function of the first dustproof structure will be described below.

Figure 8:
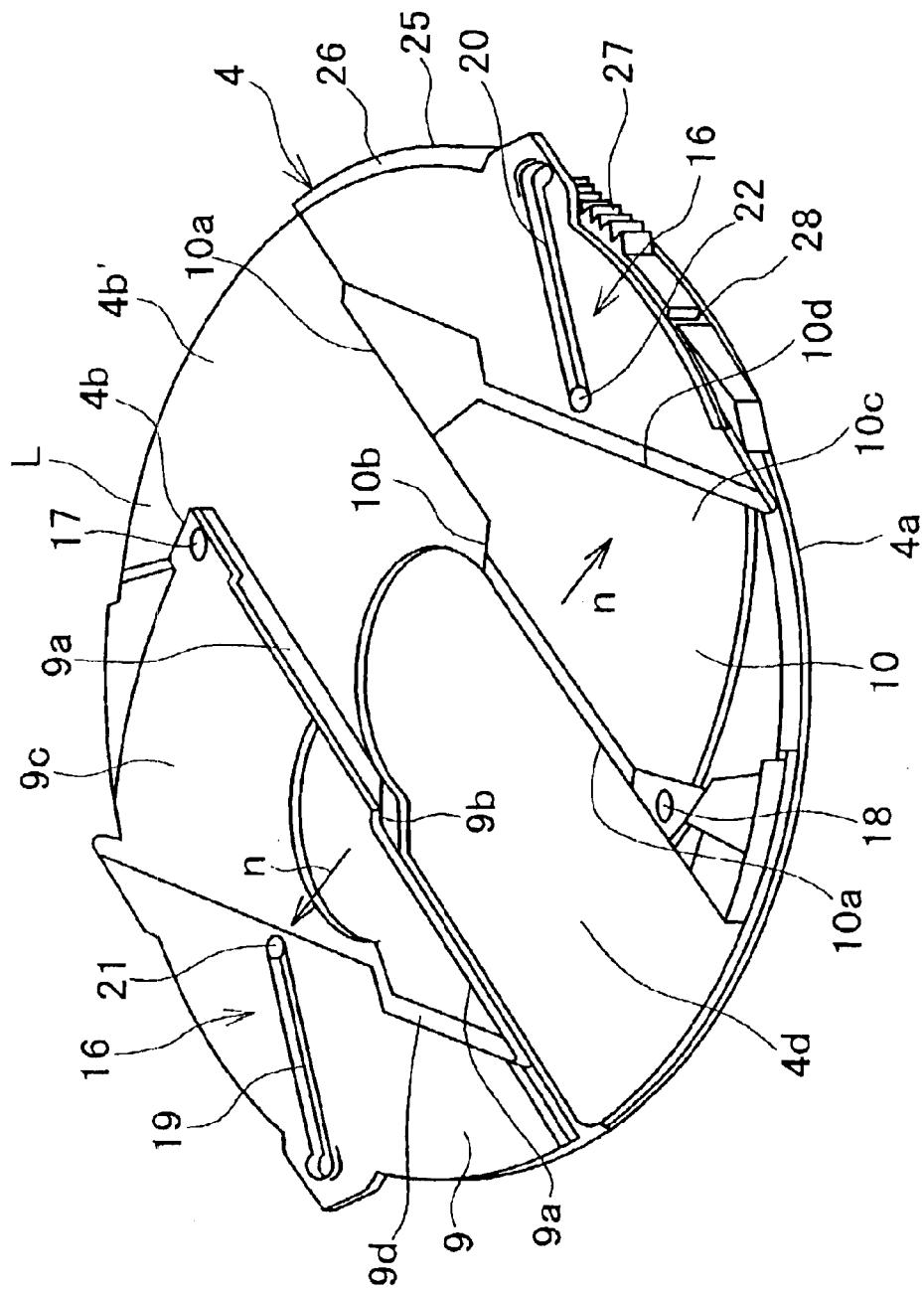
FIG. 8 is a perspective view showing an open state of the pair of shutters shown in FIG. 7.
Figure 10:
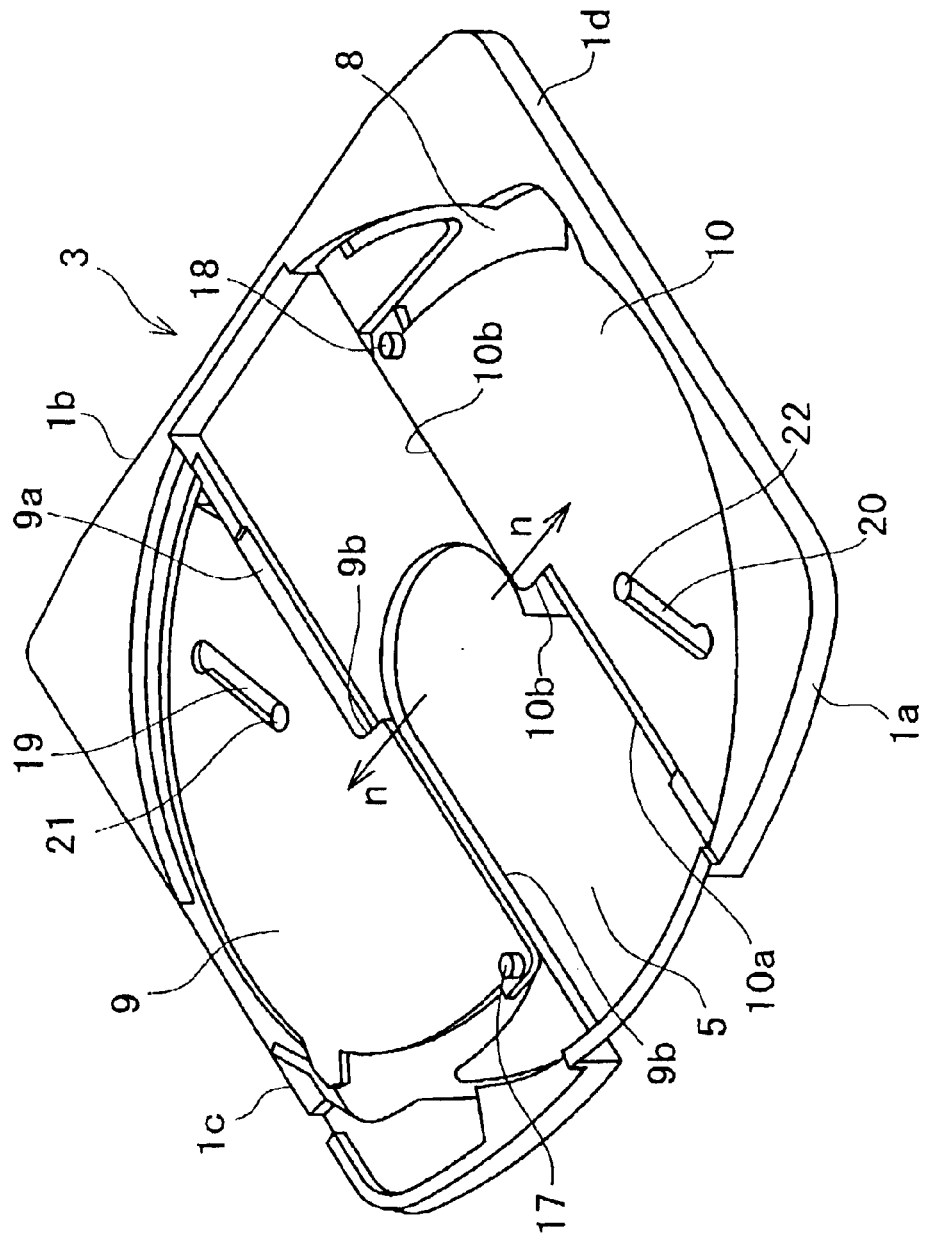
FIG. 10 is a perspective view showing an open state of the pair of shutters shown in FIG. 9.
Figure 12:
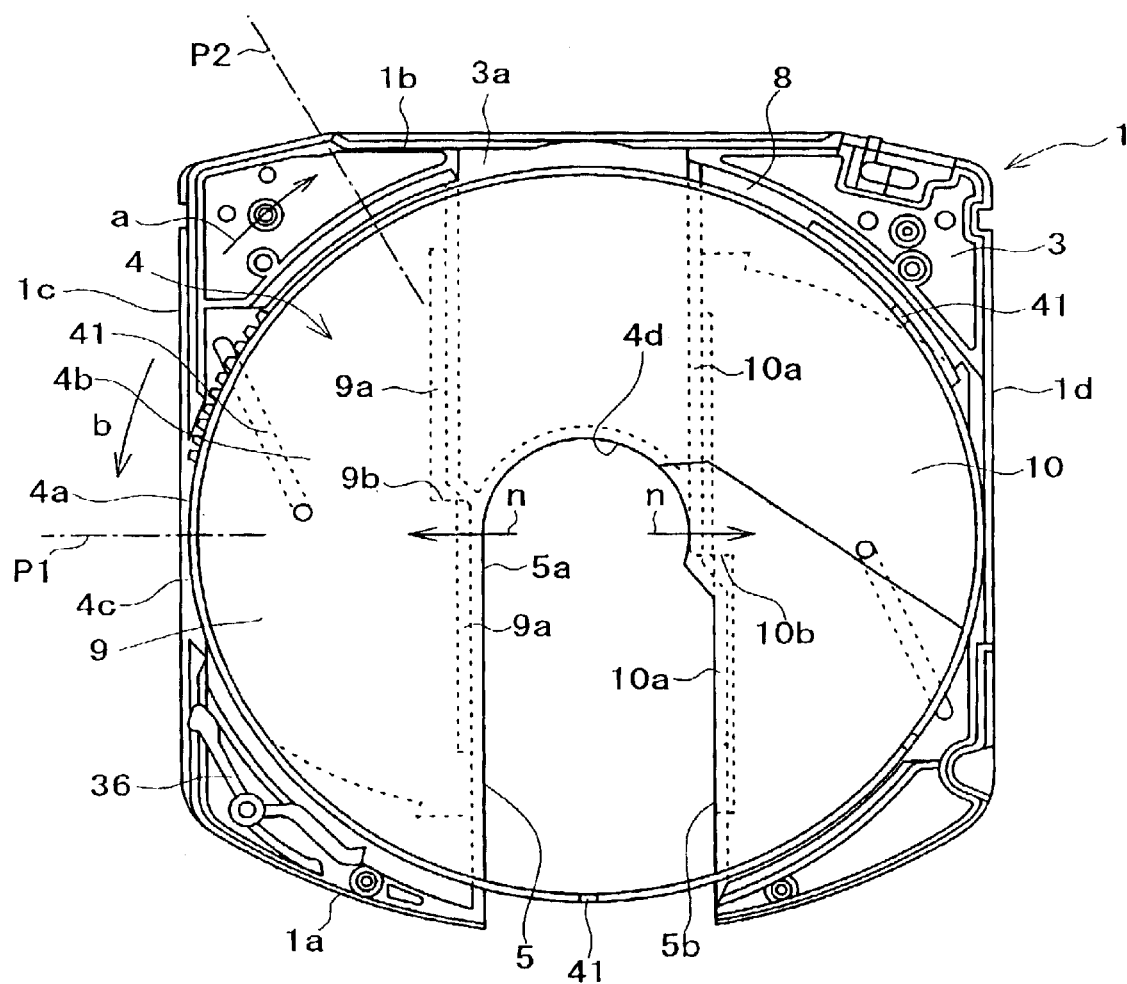
Figure 15C:
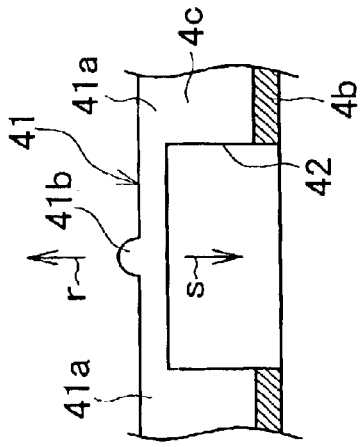
Figure 15A:
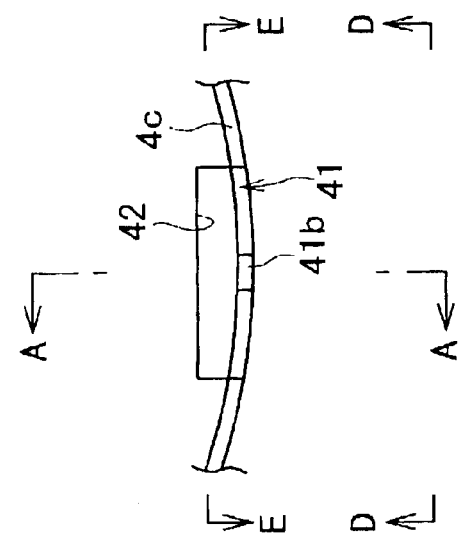
Figure 15B:
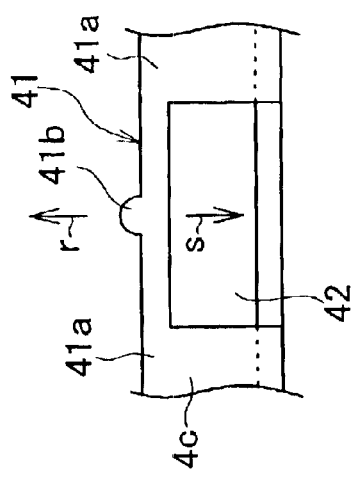
Figure 15D:
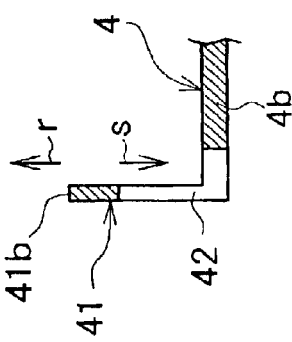

When the inner rotor 4 is returned, by rotation in the direction "a", to the opening portion opening position P2, the pair of shutters 9 and 10 are moved in the opposed directions "n" to open the opening portion 5 of the lower shell 3 as shown in FIGS. 8, 10 and 12. In this state, as shown by a chain line in FIG. 17, the three spring action portions 41 integrally formed on the top of the outer peripheral wall 4c of the inner rotor 4 are separated a specific distance in the direction "a" from the three cam projections 43, and the spring action portions 41 remain in the horizontal direction as a result of elastic return in the upward direction "r" by the spring forces thereof.

At this time, the small projection 41b disposed at the central portion of the spring action portion 41 is located at a position where the small projection 41b is brought, from below, into contact with the bottom portion 8b of the circular groove 8a of the upper shell 2, or at a position slightly lower than the height of the bottom portion 8b of the circular groove 8a of the upper shell 2.

Figure 9:
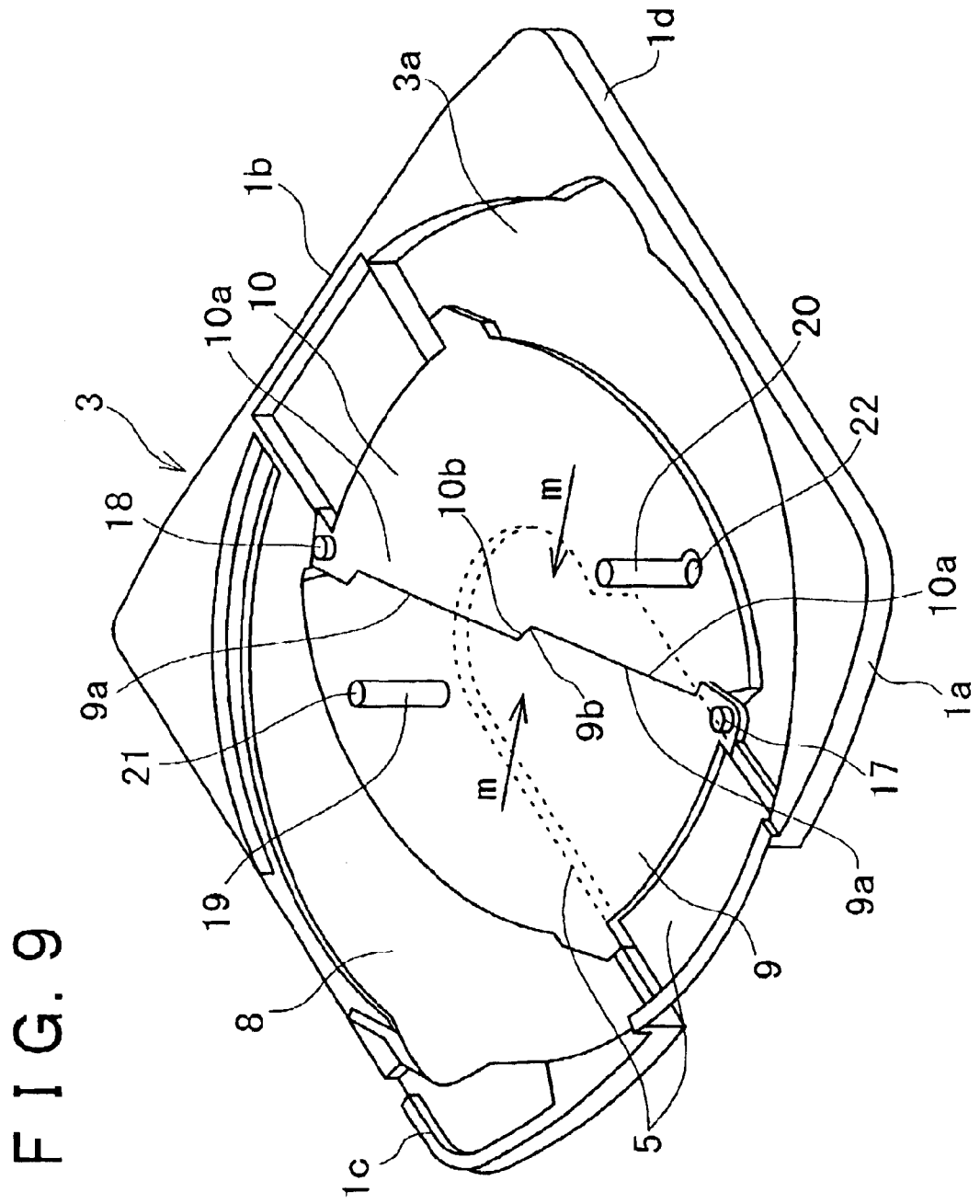
FIG. 9 is a perspective top view of the lower shell and the pair of shutters of the disk cartridge using the inner rotor, showing the closed state of the pair of shutters.

On the other hand, when the inner rotor 4 is returned, by rotation in the direction "b", to the opening portion closing position P1, the pair of shutters 9 and 10 are closed by movement in the directions "m" and the pair of tilt planes 9a and 10a for overlap are vertically overlapped by movement in the directions "m" as shown in FIGS. 7, 9 and 11.

At this time, the pair of groove-like portions 9d and 10d formed into a nearly Z-shape are fitted in the opening portion surrounding rib 5c of the lower shell 3, to close, from inside, the opening portion 5 of the lower shell 3.

Figure 17:
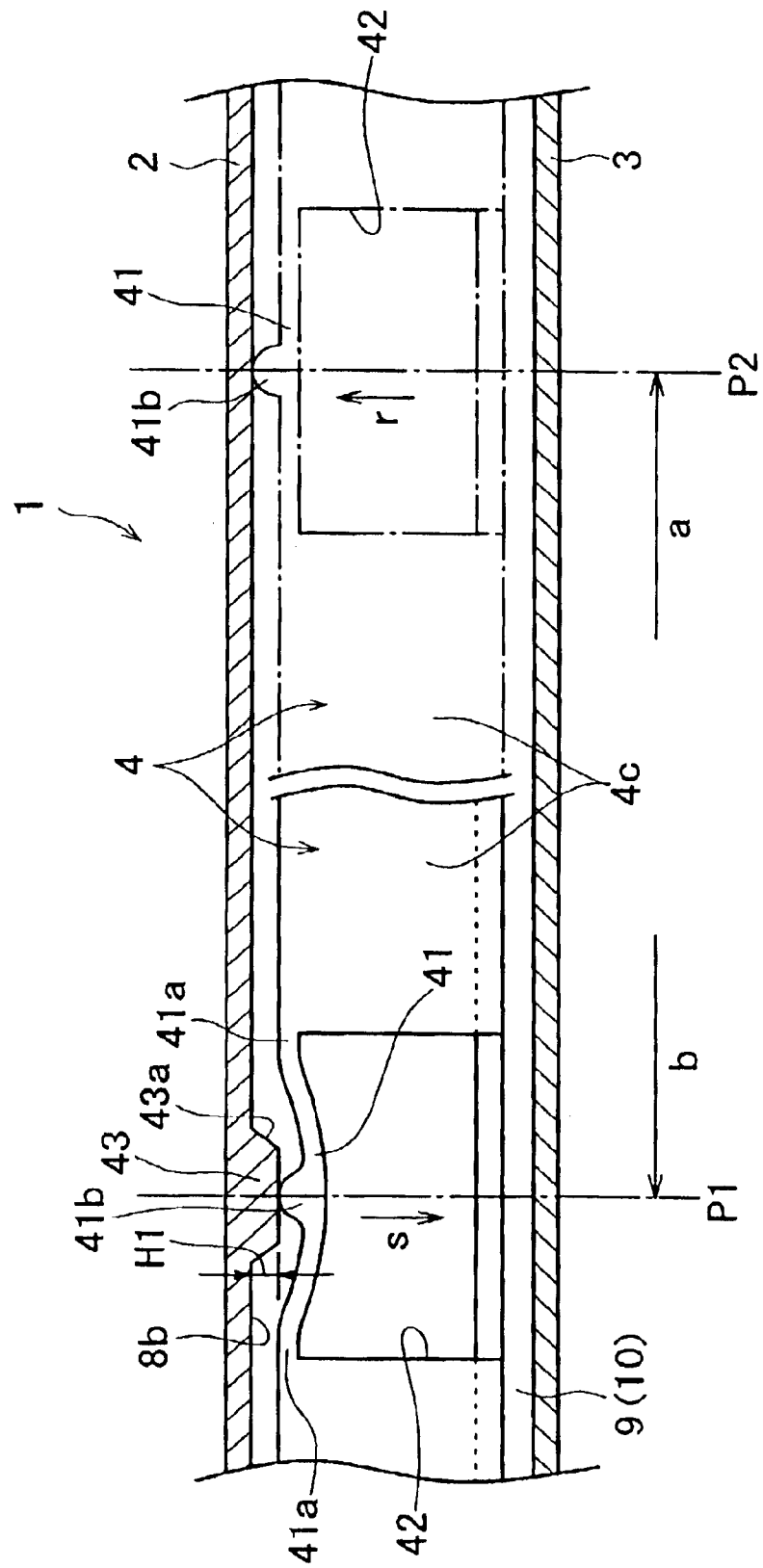
FIG. 17 is a side sectional view taken on line H—H of FIG. 16 for explaining the first dustproof structure having the spring action portion of the inner rotor.

In such a closed state, as shown by a sold line in FIG. 17, the small projections 41b of the three spring action portions 43 integrally molded on the top of the outer peripheral wall 4c of the inner rotor 4 are forced under the three cam projections 43 integrally formed on the bottom portion 8b of the circular groove 8a of the upper shell 2 via the tilt planes 43a of the cam projections 43.

Figure 16:
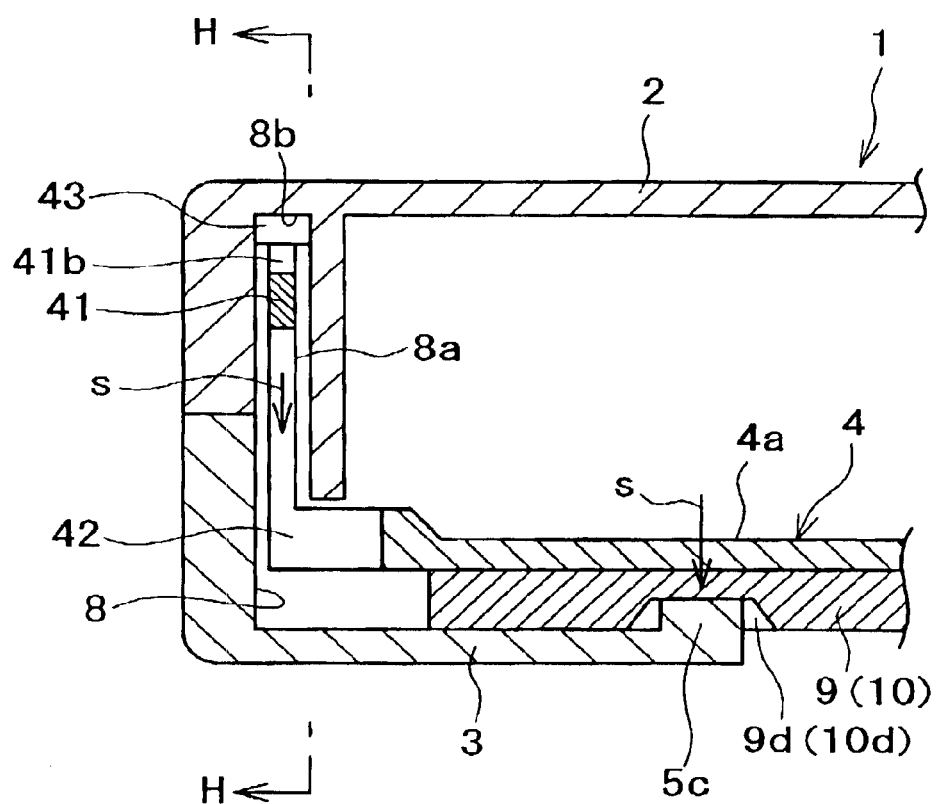
FIG. 16 is an enlarged sectional view of a G portion shown in FIG. 11 for explaining a first dustproof structure having a spring action portion provided on the inner rotor.

The spring action portions 41 are thus deflected in the downward direction "s" against the spring forces by heights H nearly equivalent to the heights of the cam projections 43. With these spring forces in the direction "s" of the spring action portions 41, as shown in FIGS. 16 and 17, the inner rotor 4 is elastically pressed in the direction "s" to the bottom portion 3a of the lower shell 3 via the pair of shutters 9 and 10, so that the outer peripheral portion 4b' of the bottom portion 4b of the inner rotor 4 and the groove-like portions 9d and 10d of the pair of shutters 9 and 10 are brought into elastic-contact with the opening portion surrounding ribs 5c and 5c' of the lower shell 3, to thereby completely seal the opening portion 5 of the lower shell 3.

As a result, it is possible to prevent the permeation of air AR containing dust DT in the disk cartridge 1 through the opening portion 4, and hence to prevent the adhesion of the dust DT on the surface of the disk D housed in the disk housing portion.

FIGS. 18A and 18B show two modifications of the spring action portion 41. A spring action portion 41 as the first modification shown in FIG. 18A is configured such that a horizontal slot 44 is formed under the spring action portion 41. A spring action portion 41 as the second modification shown in FIG. 18B is configured such that only one end 41a is integrated with the outer peripheral wall 4c, and accordingly the spring action portion 41 has a cantilever beam structure.

In a further modification (not shown) of the spring action portion 41, the positional relationship between the spring action portion 41 and the cam projection 43 may be inverted in the vertical direction. To be more specific, the three spring action portions 41 may be integrally molded on the bottom portion of the circular groove 8a of the upper shell 2 in such a manner as to project downwardly therefrom, and the three projections 43 may be provided on the top of the outer peripheral wall 4c of the inner rotor 4 in such a manner as to project upwardly therefrom. In yet a further embodiment, each of the spring action portion 41 and the cam projection 43 may be formed of a separate member such as a plate spring.

To examine the effect of the first dustproof structure, a problem of a comparative disk cartridge using an inner rotor 4 provided with no three spring action portions 41 will be described with reference to FIG. 19.

The comparative disk cartridge is configured such that only the semi-circular small projections 41b are integrally molded on the top of the outer peripheral wall 4c of the inner rotor 4 and the cam projections 43 are integrally molded on the downward bottom portion of the circular groove 8a of the upper shell 2.

When the inner rotor 4 is returned, by rotation, from the opening portion opening position P2 to the opening portion closing position P1, the small projections 41b are forced under the cam projections 43 via the a tilt plane 43a thereof. As a result, the inner rotor 4 is pressed, by the cam projections 43, in the direction "s" to the bottom portion 3a of the lower shell 3 via the pair of shutters 9 and 10.

The above-described dustproof structure of the comparative disk cartridge, however, has a problem. If a slight gap G1 is formed between the small projection 41b of the inner rotor 4 and the cam projection 43, the cam projection 43 fails to press the inner rotor 4 in the direction "s" to the bottom portion 3a of the lower shell 3 at the opening portion closing position P1, thereby degrading the sealing characteristics of the opening portion 5 of the lower shell 3. As a result, dust is liable to permeate in the disk cartridge from the opening portion 5 and adhere on the surface of the disk. That is to say, the dustproof performance of this dustproof structure is significantly low.

The above-described dustproof structure has another problem. To rotate the inner rotor 4 in the directions "a" and "b" between the opening portion opening position P1 and the opening portion closing position P2, it is required to form a large gap G2 equivalent to the height of the cam projection 43 between the small projection 41a of the inner rotor 4 and the bottom portion 8b of the circular groove 8a of the upper shell 2. As a result, during rotation between the positions P2 and P1, the inner rotor 4 may encounter with looseness in the vertical direction. This makes it difficult to smoothly open/close the pair of shutters 9 and 10.

The above-described problems of the dustproof structure of the comparative disk cartridge 1 can be all solved by the first dustproof structure of the disk cartridge according to the present invention.

Figure 20:
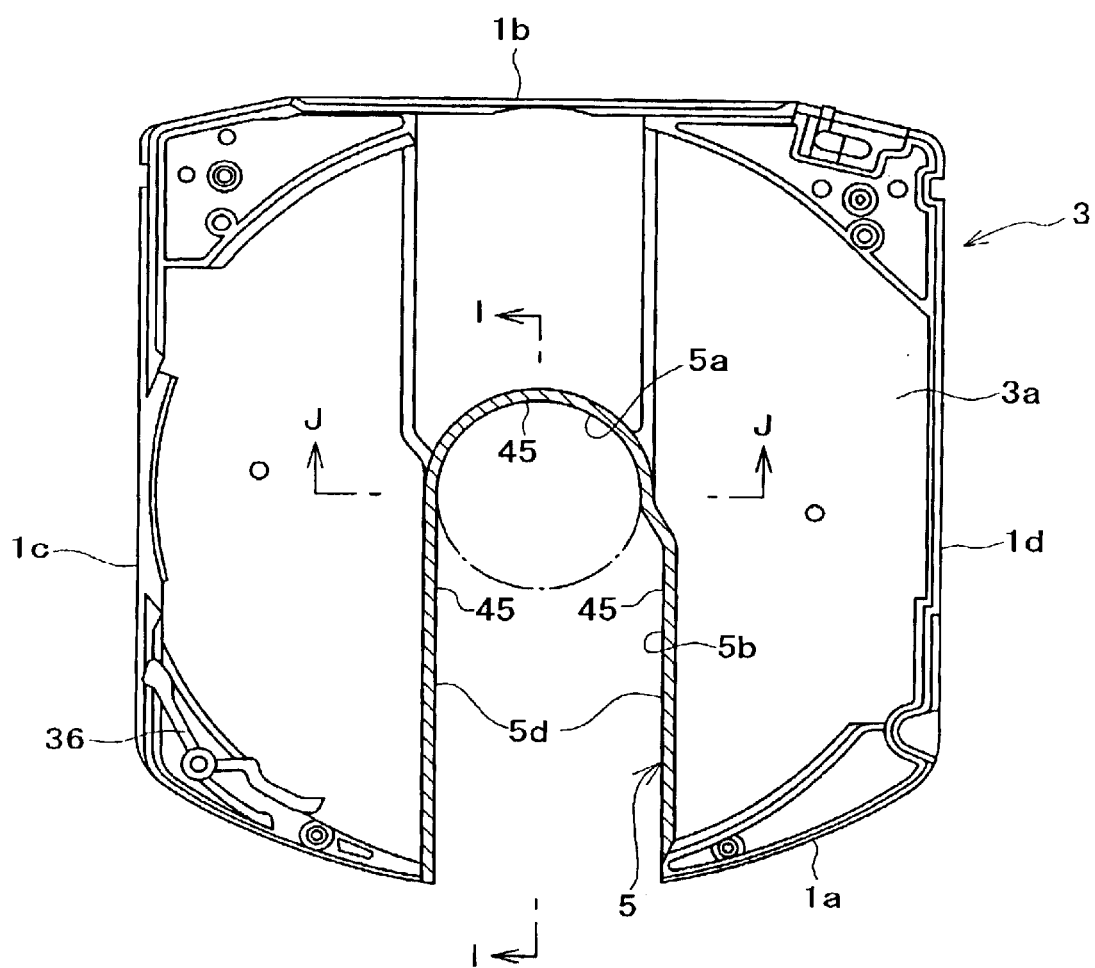
FIG. 20 is a top view of the lower shell of the disk cartridge using the inner rotor for explaining a second dustproof structure including an elastic material for dust-proofing a peripheral portion of the opening portion of the lower shell.
Figure 22:
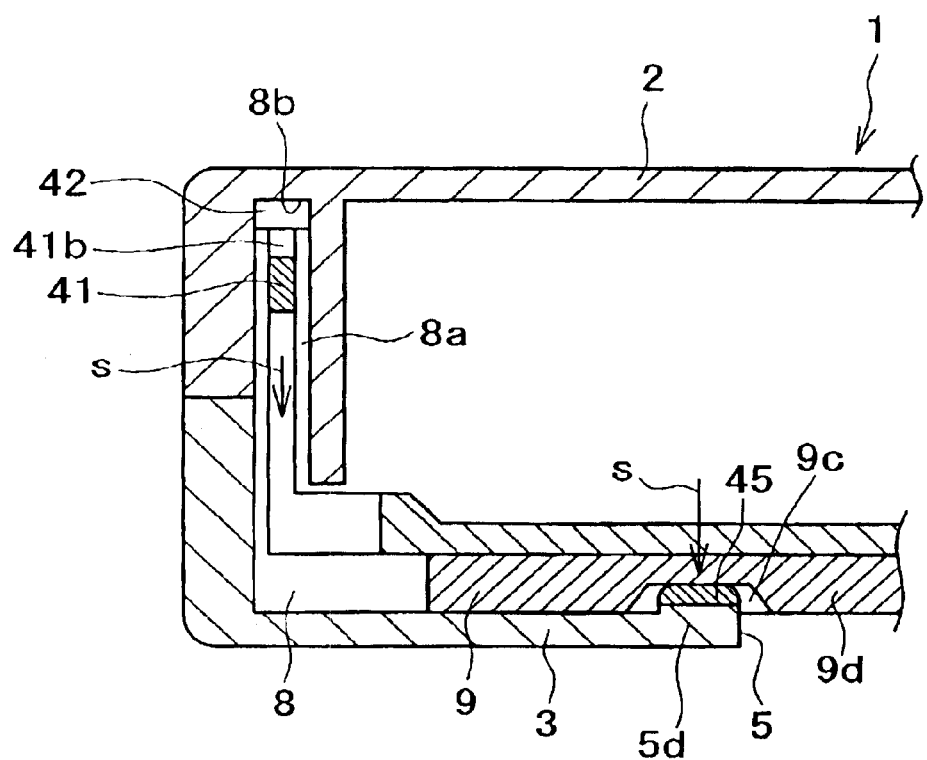
FIG. 22 is an enlarged sectional view, similar to FIG. 16, for explaining the second dustproof structure.

(3) Description of Second Dustproof Structure of Disk Cartridge Using Inner Rotor A second dustproof structure of the disk cartridge 1 will be described with reference to FIGS. 20 to 22.

The second dustproof structure is composed of an elastic member 45 made from a rubber or a soft synthetic resin.

As described above, when the inner rotor 4 is returned, by rotation in the direction "b", from the opening portion opening position P2 shown in FIG. 12 to the opening portion closing position P1 shown in FIG. 11, the opening portion 5 of the lower shell 3 is closed, from inside, by the outer peripheral portion 4b' of the bottom portion 4b of the inner rotor 4 and the pair of shutters 9 and 10.

At this time, the air AR containing the dust DT is liable to permeate in the disk cartridge 1 through the opening portion 5.

To cope with such an inconvenience, the elastic member 45 is provided on the nearly U-shaped peripheral portion 5d of the opening portion 5 in order to completely seal the nearly U-shaped peripheral portion 5d. This is effective to more certainly prevent the permeation of the air AR containing the dust DT in the disk cartridge 1 through the opening portion 5.

The attachment of the elastic member 45 will be more fully described below. The elastic member 45 having a nearly U-shape is attached to the upper surface of the nearly U-shaped peripheral portion 5d of the opening portion 5 of the lower shell 3 by adhesive bonding, fitting, or fusion. In this case, a stepped portion 5d' is formed on an outer peripheral portion, around the pickup insertion hole 5b (opposed to the disk table insertion hole 5a), of the peripheral portion 5d of the opening portion 5 in such a manner as to project upwardly therefrom by a distance equivalent to the thickness of the shutters 9 and 10, and an outer peripheral portion 45' of the elastic member 45 extends onto the stepped portion 5d' while being bent in a nearly Z-shape.

When the inner rotor 4 is returned, by rotation in the direction "b", from the opening portion opening position P2 to the opening portion closing position P1 and the entire opening portion 5 of the lower shell 2 is closed with the outer peripheral portion 4b' of the bottom portion 4b of the inner rotor 4 and the pair of shutters 9 and 10, the outer peripheral portion 4b' of the bottom portion 4b of the inner rotor 4 and the pair of shutters 9 and 10 are brought into close-contact with the nearly U-shaped elastic member 45 (containing the outer peripheral portion 45') attached on the peripheral portion 5d of the opening portion 5 against the elastic force of the elastic member 45.

As a result, it is possible to realize a high dustproof characteristic obtained by completely sealing the entire opening portion 5 with the elastic member 45.

It is to be noted that the second dustproof structure may be combined with the first dustproof structure composed of a plurality of the spring action portions 41 and the cam projections 43. In this case, at the opening portion closing position P1, the outer peripheral portion 4b' of the bottom portion 4b of the inner rotor 4 and the pair of shutters 9 and 10 can be elastically brought into close-contact with each other by combination of the elastic force of the elastic member 45 and the spring forces of a plurality of the spring action portions 41. As a result, the dustproof characteristic can be more improved.

(4) Description of Third Dustproof Structure of Disk Cartridge Using Inner Rotor A third dustproof structure of the disk cartridge 1 will be described with reference to FIGS. 23 to 26. It is to be noted that in these figures, the pair of shutters 9 and 10 are each depicted as turned in the vertical direction.

The third dustproof structure is composed of a pair of elastic members 47 made from a rubber or a soft synthetic resin.

As described above, when the inner rotor 4 is returned, by rotation in the direction "b", from the opening portion opening position P2 shown in FIG. 12 to the opening portion closing position P1 shown in FIG. 11, the tilt planes 9a and 10a for overlap (which have the Z-shape in a plan view and are vertically symmetric with each other) of the pair of shutters 9 and 10 are closed by movement in the directions "m" to be vertically overlapped to each other.

At this time, the air AR containing the dust DT is liable to permeate in the disk cartridge 1 through a gap portion 46 (K portion in FIG. 11) between the tilt planes 9a and 10a for overlap of the pair of shutters 9 and 10.

To cope with such an inconvenience, the pair of elastic members 47 are provided to completely seal the gap portion 46. This is effective to more certainly prevent the permeation of the air AR containing the dust DT in the disk cartridge 1 through the gap portion 46.

The attachment of the pair of elastic members 47 will be more fully described below. As shown in FIGS. 23 and 24, one of the pair of elastic members 47 formed into nearly strip shapes is attached to the tilt plane 9a for overlap and the remaining elastic member 47 is attached to the tilt plane 10a for overlap. In this case, the pair of the elastic members 47 are disposed on the tilt planes 9a and 10a for overlap in such a manner as to be symmetric with each other and parallel to each other, and to extend in the direction perpendicular to the directions "m". The attachment of the elastic members 47 to the tilt planes 9a and 10a for overlap may be performed by adhesive bonding, fitting, or fusion. The surfaces of the pair of elastic members 47, which are symmetric in the vertical direction, are taken as circular-arc surfaces 47a extending in the direction "m".

When the tilt planes 9a and 10a for overlap of the pair of shutters 9 and 10 are closed by movement in the opposed directions "m" to be vertically overlapped to each other, the pair of tilt planes 9a and 10a for overlap are brought into close-contact with the circular-arc surfaces 47a of the pair of elastic members 47 in the upward and downward directions "t" against the elastic forces of the elastic members 47, to completely close the gap portion 46 between the pair of tilt planes 9a and 10a for overlap.

The orthogonal planes 9b and 10b extending in the direction perpendicular to the directions "m", which are formed at the central portions of the tilt planes 9a and 10a for overlap, are brought into close-contact with each other in the directions "m'" perpendicular to the directions "m", to completely close the opening portion 5.

Figure 25:
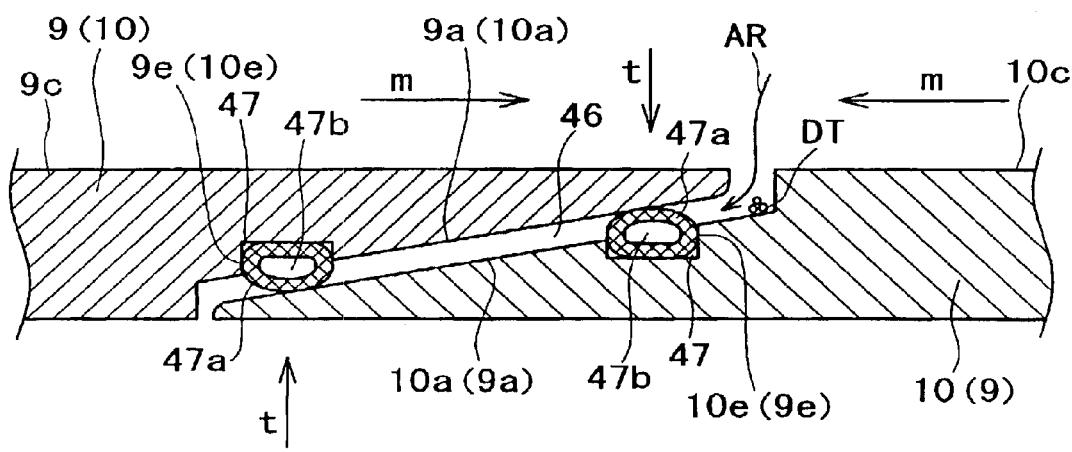
FIG. 25 is a sectional view, similar to FIG. 24, showing a first modification of the elastic member in the third dustproof structure.
Figure 26:
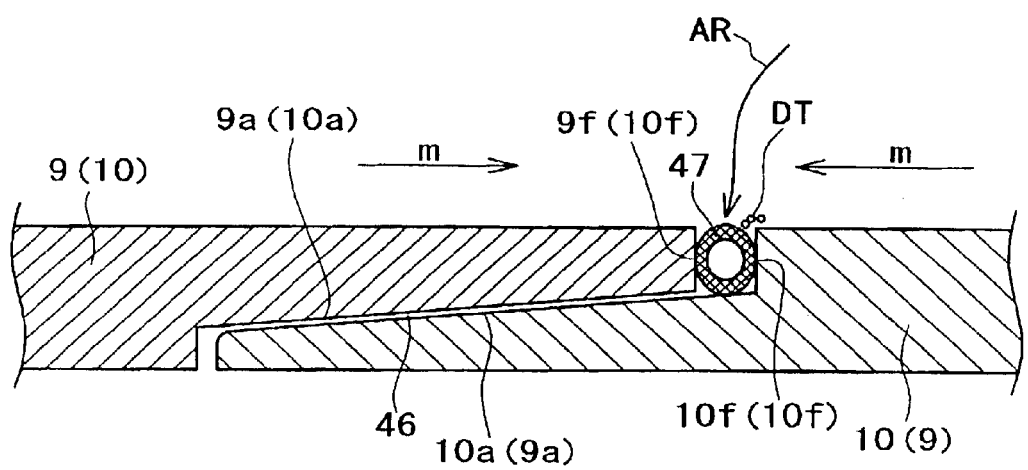
FIG. 26 is a sectional view, similar to FIG. 24, showing a second modification of the elastic member in the third dustproof structure.

FIG. 25 shows a modification of the pair of elastic members 47. Each of the elastic members 47 shown in FIG. 25 is configured as a deformable tube-shaped elastic member having a hollow portion 47b extending in the longitudinal center line. FIG. 26 shows another modification of the pair of elastic members 47. The elastic members (tube-shaped elastic members) 47 shown in FIG. 26 are attached along stepped portions 9e and 10e, extending in the direction perpendicular to the directions "m", of the pair of tilt planes 9a and 10a for overlap shown in FIG. 23 by adhesive bonding, fitting, or fusion. When the pair of tilt planes 9a and 10a for overlap are closed by movement in the directions "m", leading end surfaces 9f and 10f thereof are brought into close-contact with the pair of elastic members 47, to close the gap portion 46 between the tilt planes 9a and 10a for overlap.

(5) Description of Fourth Dustproof Structure of Disk Cartridge Using Inner Rotor A fourth dustproof structure of the disk cartridge 1 will be described with reference to FIGS. 27 to 29. It is to be noted that in the figures, the pair of shutters 9 and 10 are each depicted as turned in the vertical direction.

The fourth dustproof structure is composed of a labyrinth shape portion 48 having at least one recessed dust deposition portion 48a.

As described above, when the inner rotor 4 is returned, by rotation in the direction "b", from the opening portion opening position P2 shown in FIG. 12 to the opening portion closing position P1 shown in FIG. 11, the tilt planes 9a and 10a for overlap (which have the Z-shape in a plan view and are vertically symmetric with each other) of the pair of shutters 9 and 10 are closed by movement in the directions "m" to be vertically overlapped to each other.

At this time, the air AR containing the dust DT is liable to permeate in the disk cartridge 1 through the above-described gap portion 46 (K portion in FIG. 11) between the tilt planes 9a and 10a for overlap of the pair of shutters 9 and 10.

To cope with such an inconvenience, the labyrinth shape portion 48 having at least one recessed dust deposition portion 48a is provided in the gap portion 46 to completely seal the gap portion 46. This is effective to prevent the permeation of the air AR containing the dust DT in the disk cartridge 1 through the gap portion 46.

Figure 27:
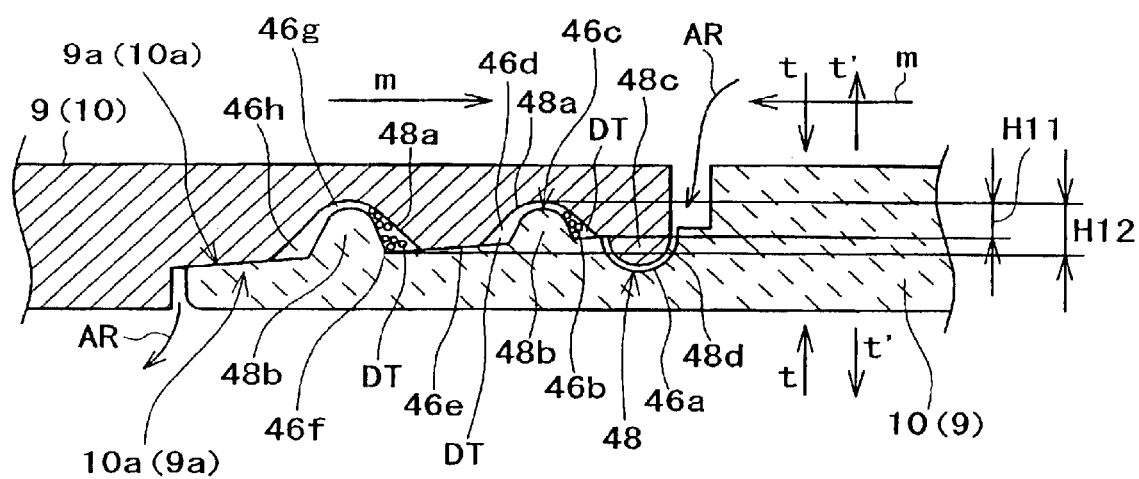
FIG. 27 is an enlarged sectional view of the K portion shown in FIG. 11 for explaining a fourth dustproof structure including a labyrinth shape portion for dust-proofing the tilt plane portions for overlap of the pair of shutters in the cartridge using the inner rotor, wherein the shutters are each depicted as turned in the vertical direction.
Figure 28:
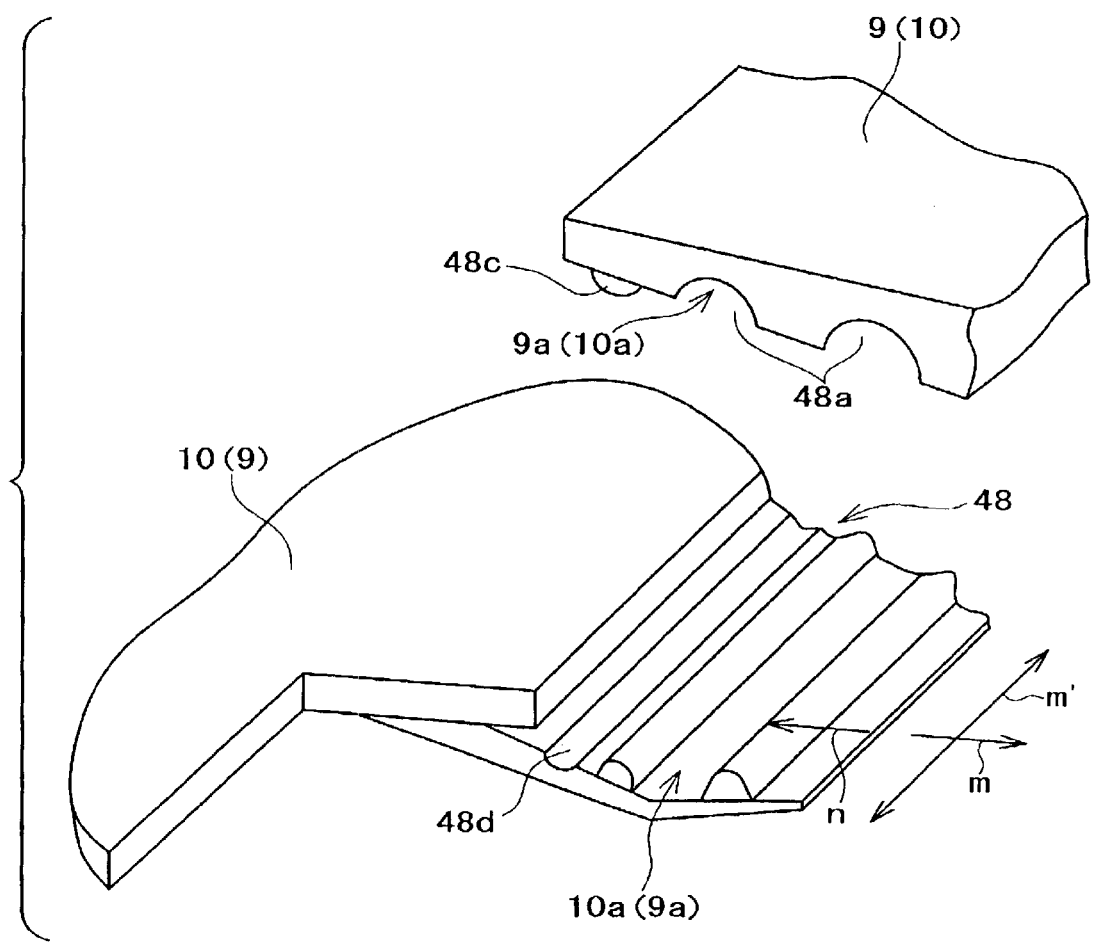
FIG. 28 is an exploded perspective view of the pair of tilt plane portions shown in FIG. 27.

As shown in FIGS. 27 and 28, the labyrinth shape portion 48 has, for example, two pieces of the recessed dust deposition portions 48a and two pieces of projections 48b corresponding to the recessed dust deposition portions 48a.

The recessed dust deposition portions 48a are disposed on the lower side of the gap portion 46 in such a manner as to be opened upwardly, and the projections 48b projecting downwardly are inserted from above in the recessed dust deposition portions 48a. As a result, a narrow gap bent nearly in a meandering shape is formed between the recessed dust deposition portions 48a and the projections 48b.

In addition, at the leading end portions of the pair of tilt planes 9a and 10a for overlap in the directions "m", from which the air AR flows in the labyrinth shape portion 48, a semi-circular downward recess 48d formed on the upper side of the gap portion 46a is inserted from above around a semi-circular upward projection 48c formed on the lower side of the gap portion 46.

As shown in FIG. 28, the recessed dust deposition portions 48a and the projections 48b, and the projection 48c and the recess 48d extend nearly in parallel to each other along the length direction of the tilt planes 9a and 10a for overlap, that is, along the directions "m'" shown in FIGS. 11 and 23.

The recessed dust deposition portion 48a has a cross-section having a nearly semi-circular shape. On the other hand, the projection 48b to be inserted from above in the recessed dust deposition portion 48a has a cross-section having a nearly taper shape with its lower end portion rounded. Each of the projection 48c and the recess 48d has a cross-section having a nearly semi-circular shape.

In the case of forming a plurality of rows, each of which includes the recessed dust deposition portion 48a and the projection 48b to be inserted from above in the recessed dust deposition portion 48a, along the tilt direction (directions "m") of the pair of tilt planes 9a and 10a for overlap, a height (depth) H11 of the recessed dust deposition portion 48a and the projection 48b on the upstream side of the tilt direction of the pair of tilt planes 9a and 10a for overlap is small, and a height (depth) H12 of the recessed dust deposition portion 48a and the projection 48b on the downstream side of the tilt direction of the pair of tilt planes 9a and 10a for overlap is large.

The configuration of the gap portion 46 of the labyrinth shape portion 48 will be described below by way of example in which the labyrinth shape portion 48 has two rows each having the recessed dust deposition portion 48a and the projection 48b as shown in FIG. 27.

In this example, the gap portion 46 is composed of eight narrow and wide gaps: a narrow gap 46a at a first stepped portion between the nearly semi-circular projection 48c and the nearly semi-circular recess 48d located on the leading end side; a wide gap 46b at a second stepped portion between the upstream side of the tapered projection 48b and the upstream side of the nearly semi-circular recess 48a; a narrow gap 46c at a third stepped portion between the leading end of the projection 48b and a central portion of the recess 48a; a wide gap 46d at a fourth stepped portion between the downstream side of the projection 48b and the downstream side of the recess 48a; a narrow gap 46e at a fifth stepped portion located at an intermediate region between the first row of the projection 48b and the recess 48a and the next row of the projection 48b and the recess 48a; a wide gap 46f at a sixth stepped portion between the upstream side of the nearly tapered projection 48b and the upstream side of the nearly semi-circular recess 48a; a narrow gap 46g at a seventh stepped portion between the leading end of the projection 48b and a central portion of the recess 48a; and a wide gap 46h at an eighth stepped portion between the downstream side of the projection 48b and the downstream side of the recess 48a.

In this way, the gap portion 46 in this example shown in FIG. 27 has such a meandering shape that the narrow gap 46a, the wide gap 46b, the narrow gap 46c, the wide gap 46d, the narrow gap 46e, the wide gap 46f, the narrow gap 46g, and the wide gap 46h are alternately arranged along the flow-in direction of the air AR.

The function of the fourth dustproof structure will be described with reference to FIG. 27.

When the pair of tilt planes 9a and 10a for overlap of the pair of shutters 9 and 10 are moved in the opposed directions "m" and vertically overlapped to each other to close the opening portion of the lower shell 3 as described above, the at least one downward projection 48b is inserted from above in the at least one upward recessed dust deposition portion 48a, and further the nearly semi-circular downward recess 48d at the leading end is inserted from above around the nearly semi-circular upward projection 48c, to form the labyrinth shape portion 48 composed of a series of gaps bent in the meandering shape.

The upward projection 48c at the leading end has the cross-section having a nearly semi-circular shape and each of a plurality (for example, two) of the downward projections 48b on the upper side has a nearly tapered shape with its leading end rounded. Accordingly, when the pair of tilt planes 9a and 10a are moved in the directions "m" to be engaged with each other, the pair of tilt planes 9a and 10a of the pair of shutters 9 and 10 are deflected up and down, that is, in the directions "t" and "t'" against the elastic forces, and in this case, the upward projection 48c at the leading end sequentially, smoothly rides over the plurality of downward projections 48b in the directions "m", to be smoothly engaged in the downward recess 48d.

The air AR containing the dust DT permeates in the gap portion 46 of the labyrinth shape portion 48 from the narrow gap 46a at the leading end, and flows to the downstream side of the gap portion 46 in the meandering manner while sequentially passing through the wide gap 46b, the narrow gap 46c, the wide gap 46d, the narrow gap 46e, the wide gap 46f, the narrow gap 46g, and the wide gap 46h. In this case, when the air AR sequentially flows from the narrow gaps 46a, 46c, 46e and 46g to the wide gaps 46b, 46d, 46f and 46h, the air AR is sequentially, rapidly expanded, with a result that the flow rate of the air AR becomes sequentially low.

At the moment the flow rate of the air AR becomes sequentially low, the dust D is sequentially separated from the air AR and is sequentially deposited in the plurality of the recessed dust deposition portions 48a formed on the lower side of the gap portion 46.

As a result, it is possible to effectively prevent the permeation of the dust DT, together with the air AR, in the disk cartridge 1.

In addition, the plurality of upward recessed dust deposition portions 47a and the plurality of downward projections 48b are not necessarily formed so as to be continuous in the directions "m'". For example, as shown in FIG. 29A, the plurality of upward recessed dust deposition portions 47a and the plurality of downward projections 48b may be formed so as to be discontinuous in the directions "m'", preferably, in a staggered pattern in the directions "m". Further, the shape of the downward projection 48b may be selected from various shapes, for example, those shown in FIG. 29B.

(6) Description of Fifth Dustproof Structure of Disk Cartridge Using Inner Rotor A fifth dustproof structure of the disk cartridge 1 will be described with reference to FIGS. 30 to 34.

The fifth dustproof structure is composed of a turbulence generating structure portion 51 having a plurality of turbulence generating recesses-and-projections 51a.

When the inner rotor 4 is returned, by rotation in the direction "b", from the opening portion opening position P2 shown in FIG. 12 to the opening portion closing position P1 shown in FIG. 11, the opening portion 5 of the lower shell 3 is closed by the outer peripheral portion 4b' of the bottom portion 4b of the inner rotor 4 and the pair of shutters 9 and 10.

At this time, the air AR containing the dust DT is liable to flow in the opening portion 5, passing through a gap portion 50, and permeate in the disk cartridge 1 from the opening portion 4d of the inner rotor 4. The gap portion 50 is formed at a portion (L portion in FIG. 11) at which a portion, adjacent to the opening portion 4d, of the outer peripheral portion 4b' of the bottom portion 4b of the inner rotor 4 is overlapped from above to a portion, adjacent to the opening portion 5, of the bottom portion 3a of the lower shell 3.

To cope with such an inconvenience, the turbulence generating structure portion 51 having a plurality of turbulence generating recesses-and-projections 51a is provided in the gap portion 50. This is effective to prevent the permeation of the air AR containing the dust DT in the disk cartridge 1 through the opening portion 5, the gap portion 50, and the opening portion 4d of the inner rotor 4.

Figure 30:
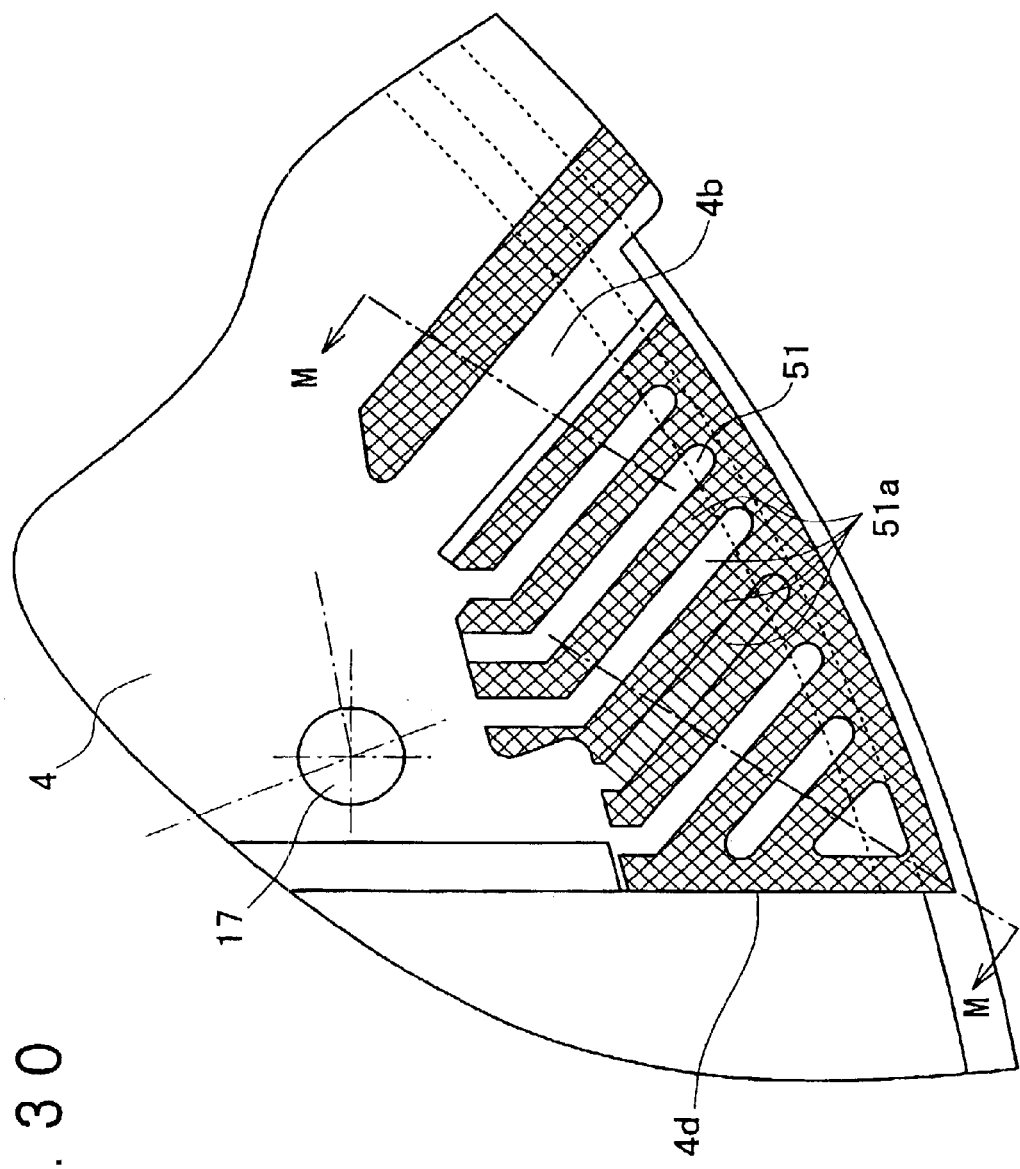
FIG. 30 is a bottom view showing a part of a bottom portion, equivalent to the L portion shown in FIG. 11, of the inner rotor on a large scale for explaining a fifth dustproof structure including a turbulence generating structure portion for dust-proofing a gap between the lower shell and an outer peripheral portion of the inner rotor in the disk cartridge using the inner rotor.
Figure 31:
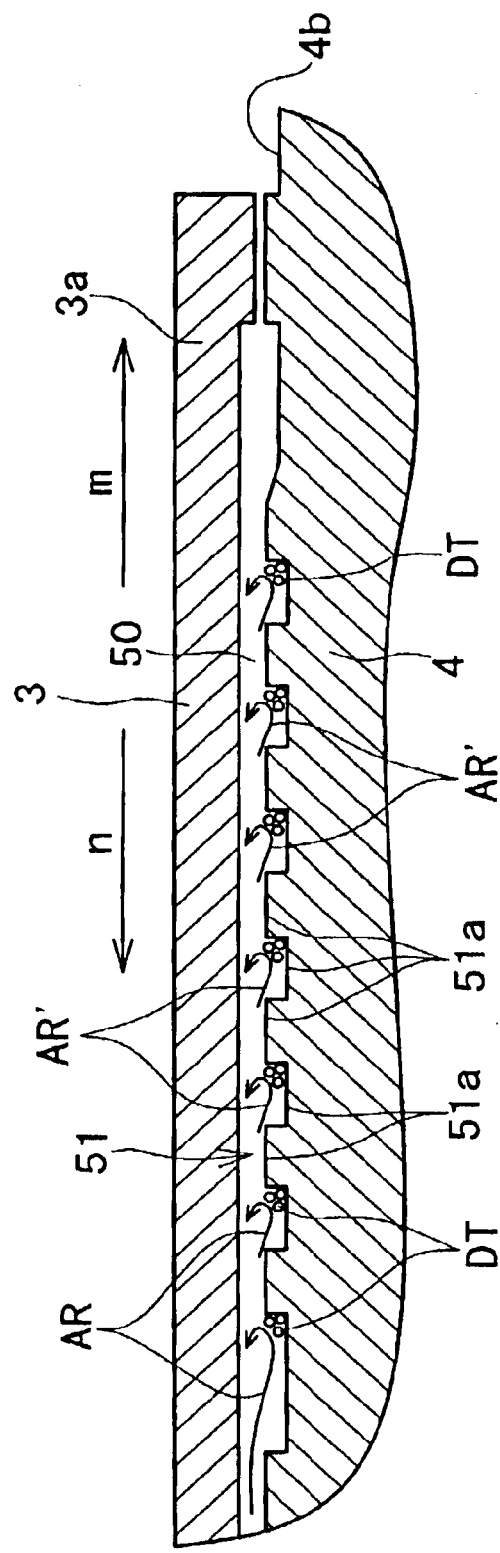
FIG. 31 is an enlarged sectional view taken on line M—M of FIG. 30 for explaining the fifth dustproof structure, wherein the lower shell and the inner rotor are each depicted as turned in the vertical direction.

As shown in FIGS. 30 and 31, the turbulence generating recesses-and-projections 51a extending in the direction perpendicular to the direction "t" along which the air AR containing the dust DT passes through the gap portion 50 may be formed in the back surface of the bottom portion 4b of the inner rotor 4, or may be formed in the top surface of the bottom portion 3a of the lower shell 3. Alternatively, the turbulence generating recesses-and-projections 51a may be formed in both the back surface of the bottom portion 4b of the inner rotor 4 and the top surface of the bottom portion 3a of the lower shell 3.

The function of the fifth dustproof structure will be described below.

If the fifth dustproof structure is not provided, the air AR containing the dust DT flows in the gap portion 50 from the opening portion 5 of the lower shell 3, passing through the gap portion 50 in the direction "t", and permeates in the disk cartridge 1 from the opening portion 4d of the inner rotor 4.

According to the present invention, however, since the fifth dustproof structure is provided, the air AR having flown in the opening portion 50 impinges on the plurality of turbulence generating recesses-and-projections 51a, to generate turbulence of the air AR, so that the dust DT is irregularly swirled by the turbulence action of the air AR. During swirl of the dust DT in the gap portion 50, the dust DT is sequentially caught by the recesses and edges of the turbulence generating recesses-and-projections 51a, to be gradually separated from the air AR. Accordingly, the dust DT is not able to completely pass through the gap portion 50, and is settled in the gap portion 50.

As a result, it is possible to effectively prevent the permeation of the dust DT, together with the air AR, in the disk cartridge 1.

Figure 32:
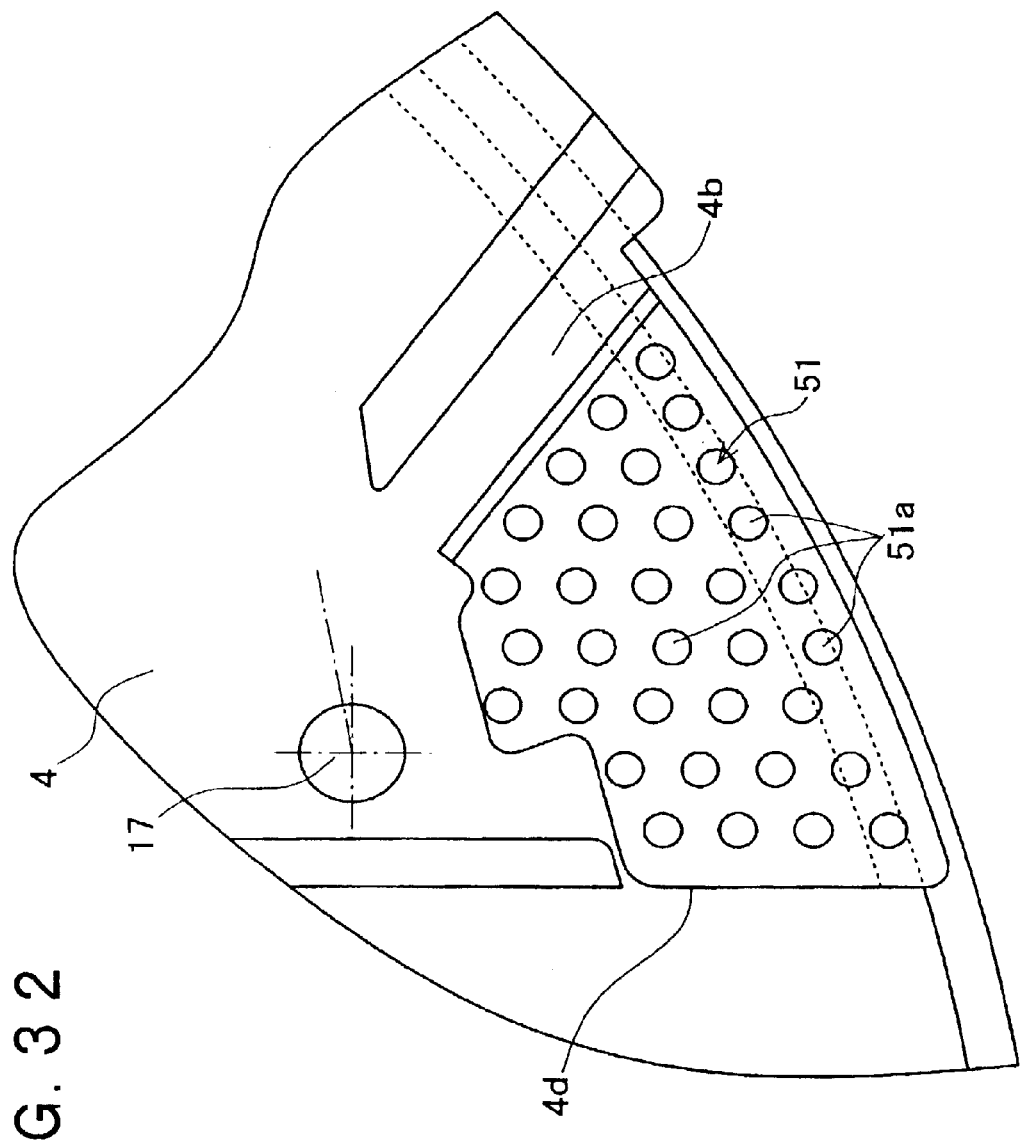
FIG. 32 is a bottom view, similar to FIG. 30, showing a first modification of a structural portion forming the labyrinth shape portion in the fifth dustproof structure.
Figure 33:
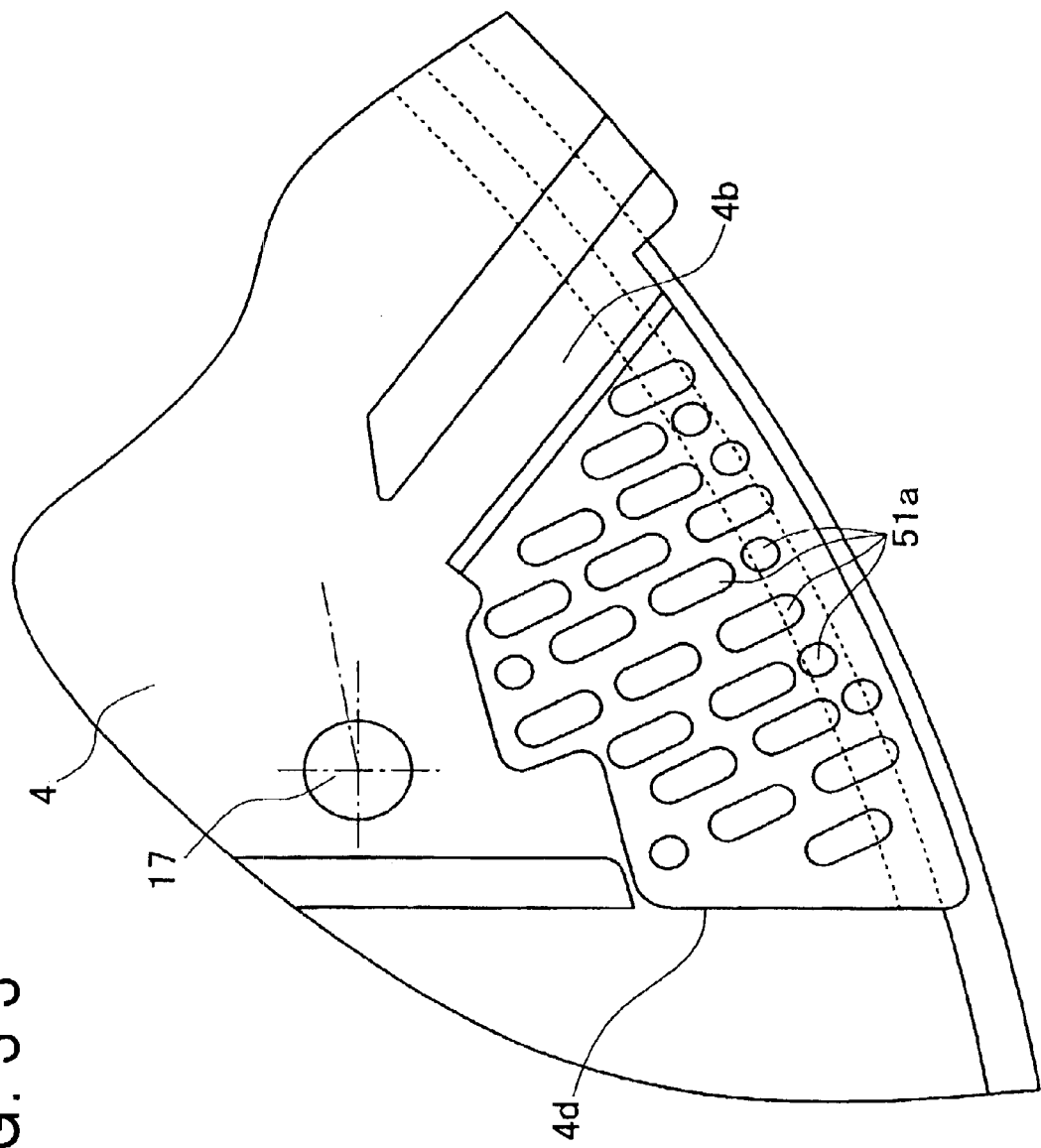
FIG. 33 is a bottom view, similar to FIG. 30, showing a second modification of the structural portion forming the labyrinth shape portion in the fifth dustproof structure.
Figure 34:
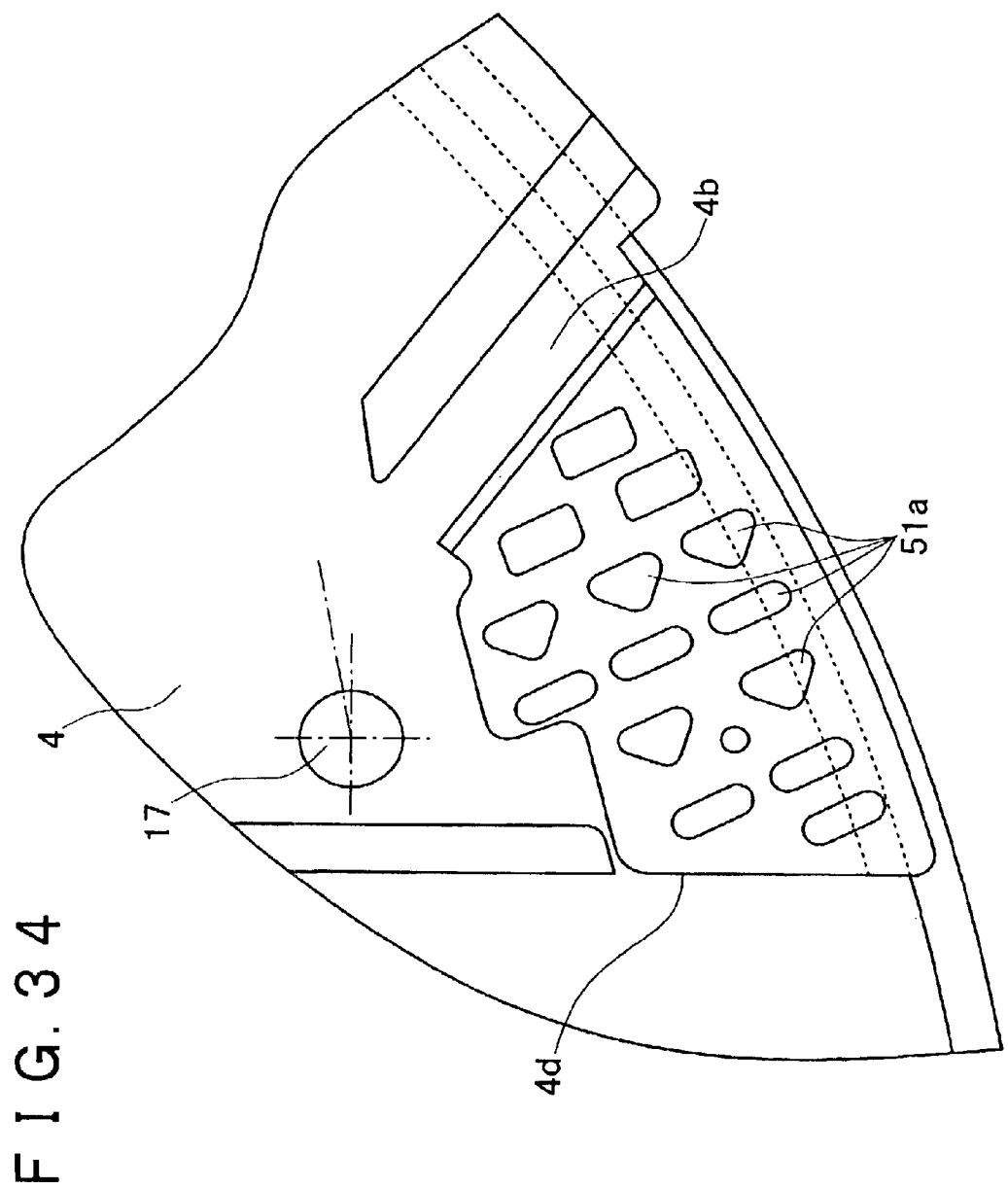
FIG. 34 is a bottom view, similar to FIG. 30, showing a third modification of the structural portion forming the labyrinth shape portion in the fifth dustproof structure.

The turbulence generating recesses-and-projections 51a shown in FIGS. 30 and 31 has a cross-sectional structure that square-shaped recesses and projections are alternately arranged; however, the present invention is not limited thereto. For example, the cross-sectional structure of the turbulence generating recesses-and-projections 51a may be configured as a staggered pattern of circular projections or recesses as shown in FIG. 32, a staggered pattern of slots or round holes as shown in FIG. 33; or an irregular pattern of projections or recesses having square, triangular, circular, and other shapes as shown in FIG. 34.

(7) Description of Rotating Mechanism of Inner Rotor of Disk Cartridge Using Inner Rotor A rotating mechanism of an inner rotor of the disk cartridge 1 will be described with reference to FIGS. 35 to 51.

Figure 35:
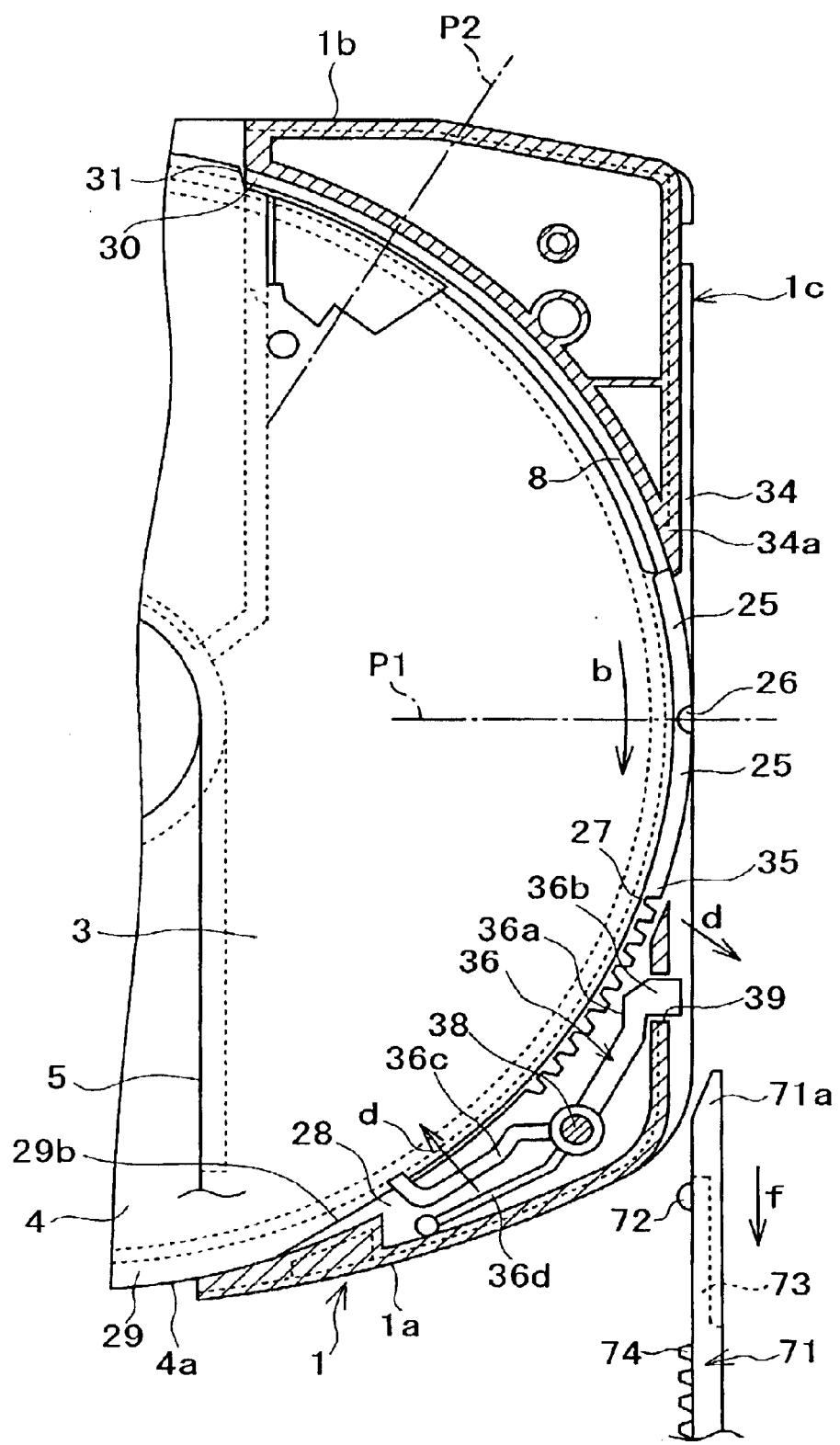
FIG. 35 is a bottom view with parts partially cutaway, showing a rotational initial state of the inner rotor for explaining an inner rotor rotating mechanism using a rack member in the disk cartridge using the inner rotor.

FIG. 35 shows an initial state that the inner rotor 4 is returned in the direction "b" to a shutter opening/closing starting position (opening portion closing position) P1, and is then locked by a rock member 36.

At this time, a shutter opening/closing starting projection 25, which is a circular-arc projection integrally molded on the outer peripheral surface 4a of the inner rotor 4, projects in the recessed groove 34 through the rectangular window hole 35. The window hole 35 is thus closed with the shutter opening/closing starting projection 25.

The recessed groove 34 is formed in one side surface 1c of the disk cartridge 1, and the rectangular window hole 35 is opened at nearly central portion in the length direction of the bottom portion 34a of the recessed groove 34.

A shutter opening/closing starting recess 26, which is a portion for starting the rotation of the inner rotor 4, is formed at a nearly central position in the circumferential direction of the shutter opening/closing starting projection 25. The shutter opening/closing starting recess 26 is positioned at a nearly central position in the length direction of the window hole 35.

A circular-arc partial gear (outer peripheral gear) 27 is integrally molded on the outer peripheral surface 4a of the inner rotor 4 at a position offset in the direction "b" from the shutter opening/closing projection 25. The partial gear 27 is withdrawn from the window hole 35 to a position on the direction "b" side in the disk cartridge 1, and therefore, the partial gear 27 is hidden in the disk cartridge 1.

A shutter opening/closing ending recess 28 serving as a locking recess is formed on the outer peripheral surface 4a of the inner rotor 4 at a position offset on the direction "b" side from the partial gear 27 by a specific distance. The shutter opening/closing ending recess 28 is locked by the lock member 36.

The lock member 36 is formed into a nearly Y-shape by a molded part of a synthetic resin or the like, and is mounted to a fulcrum pin 38 in such a manner as to be rotatable in the directions "c" and "d" around the fulcrum pin 38. The fulcrum pin 38 is integrally molded to a portion, near the outer periphery of the inner rotor 4, of the lower shell 3.

A leading end 36b of a lock releasing arm 36a of the lock member 36 projects in the direction "d" in the recessed groove 34 through a hole 39. The hole 39 is formed in the bottom portion 34a of the recessed groove 34 at a position offset to the front surface 1a side from the window hole 35.

The lock member 36 has a lock arm 36c forked oppositely from the lock releasing arm 36a. The lock arm 36c is engaged in the shutter opening/closing ending recess 28 of the inner rotor 4 by a weak spring force of a mold spring 36d, to lock the inner rotor 4.

Figure 46:
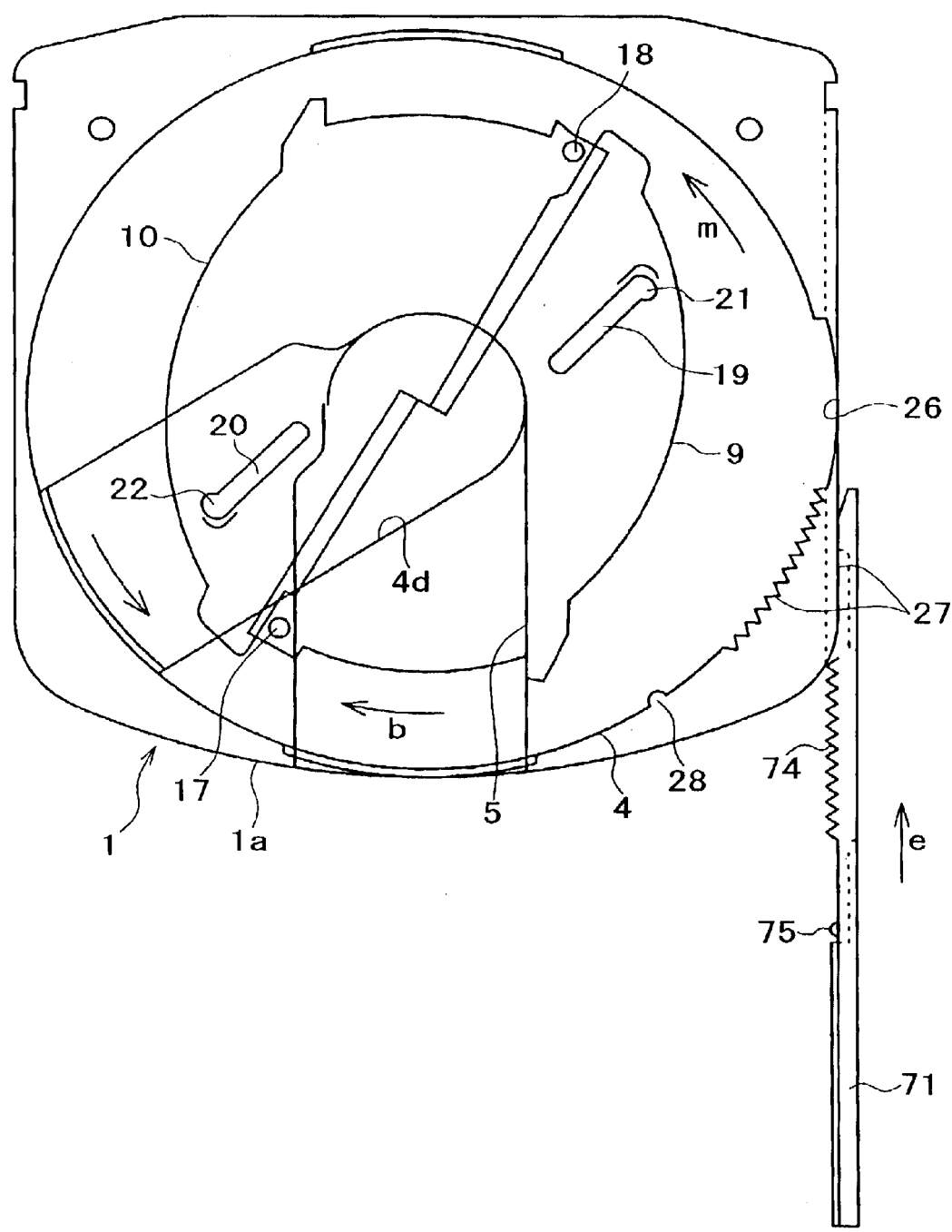
FIG. 46 is a perspective bottom view showing an opening portion closed state for explaining a state that the pair of shutters are opened/closed by rotating the inner rotor by means of the rack member in the disk cartridge using the inner rotor.
Figure 47:
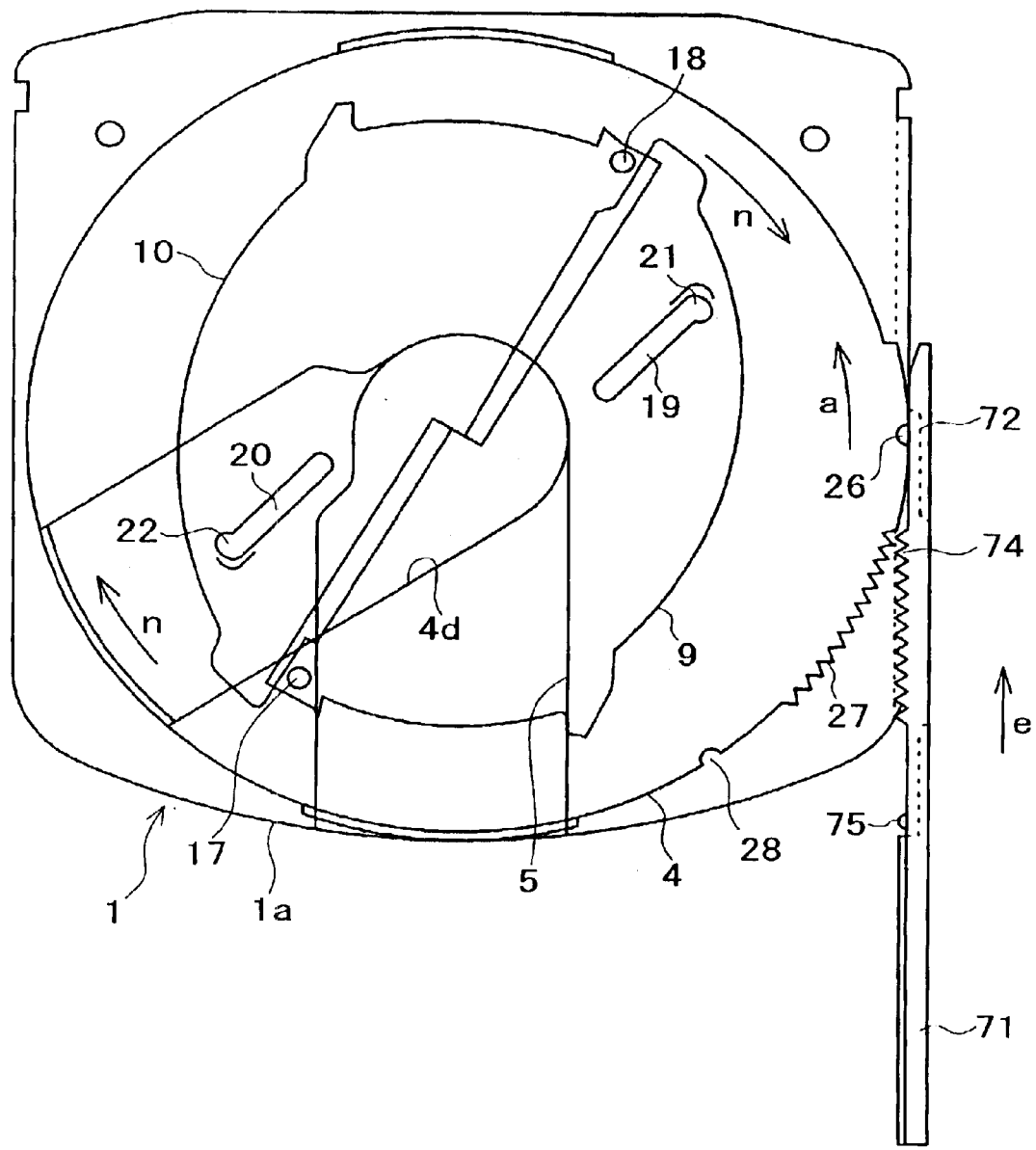
FIG. 47 is a perspective bottom view showing a state of starting the opening action of the pair of shutters in the opening portion closed state shown in FIG. 46.
Figure 48:
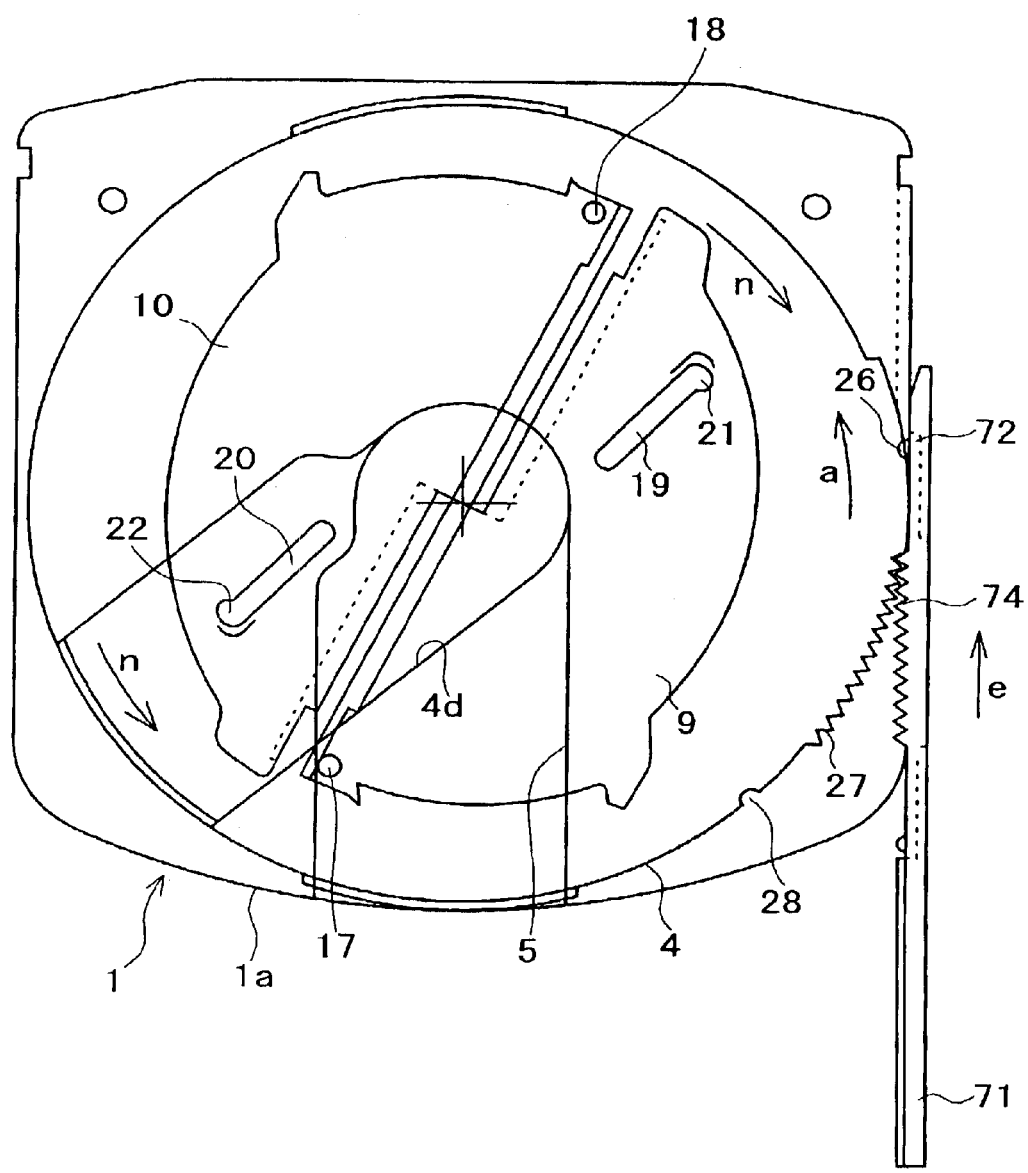
FIG. 48 is a perspective bottom view showing an opening action of the pair of shutters, which action is continued from that shown in FIG. 47.

Accordingly, in this initial state, as shown in FIG. 46, the opening portion 5 of the lower shell 3 of the disk cartridge 1 is closed from inside with the pair of shutters 9 and 10 and the partial gear (outer peripheral gear) 27 of the inner rotor 4 for opening/closing the shutters 9 and 10 is hidden in the disk cartridge 1, and accordingly, even if the locking of the inner rotor 4 is released by depressing the lock releasing arm 36a of the lock member 36 in the direction "d" with a finger, it is impossible to rotate the inner rotor 4 by moving the partial gear 27 from external of the disk cartridge 1 with the finger, and thereby it is impossible to open the shutters 9 and 10.

FIGS. 36 to 43 show states that a rack member 71 provided as an inner rotor rotating means in a disk drive unit (to be described later) is relatively slid in the direction "e" along the side surface 1c of the disk cartridge 1.

Figure 36:
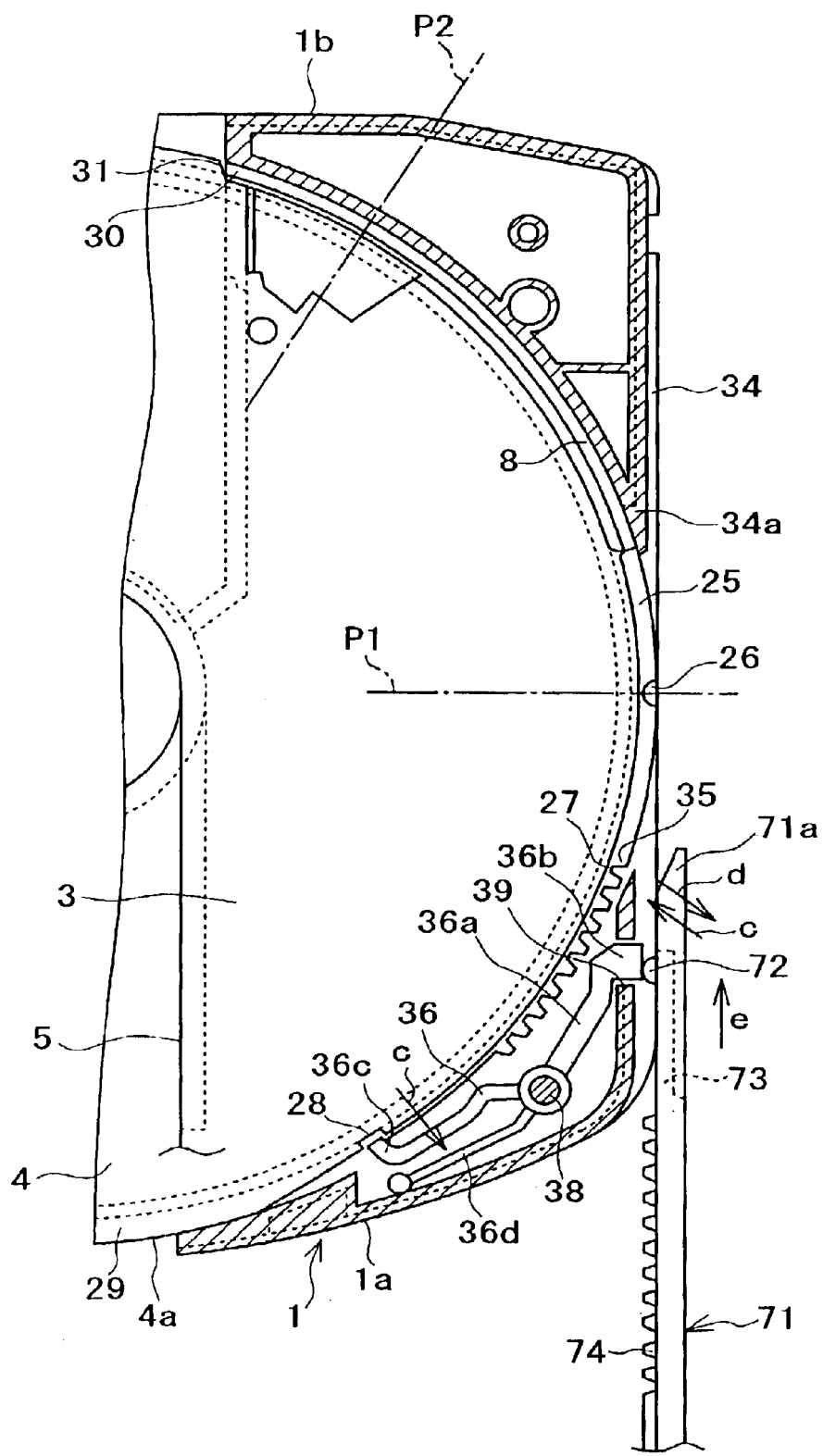
FIG. 36 is a bottom view with parts partially cutaway, showing a state of starting rotation of the inner rotor from the initial state shown in FIG. 35 by the rack member.

As shown in FIG. 36, when the rack member 71 is slid relative to the disk cartridge 1 in the direction "e" to a specific position, a shutter opening/closing starting projection 72, located near the leading end 71a as an inner rotor rotating starting portion, of the rack member 71 pushes a leading end 36b of the lock releasing arm 36a of the lock member 36 in the direction "c". As a result, the lock arm 36c of the lock member 36 is rotated in the direction "c" against the mold spring 36d, to be separated from the shutter opening/closing ending recess 28 of the inner rotor 4, thereby releasing the locking of the inner rotor 4.

When the rack member 71 is further slid in the direction "e", the shutter opening/closing starting projection 72 is separated from the leading end 36b of the lock releasing arm 36a of the lock member 36 in the direction "e", so that the leading end 36b of the lock releasing arm 36a of the lock member 36 again projects in the direction "d" from the hole 39 into the recessed groove 34.

Figure 37:
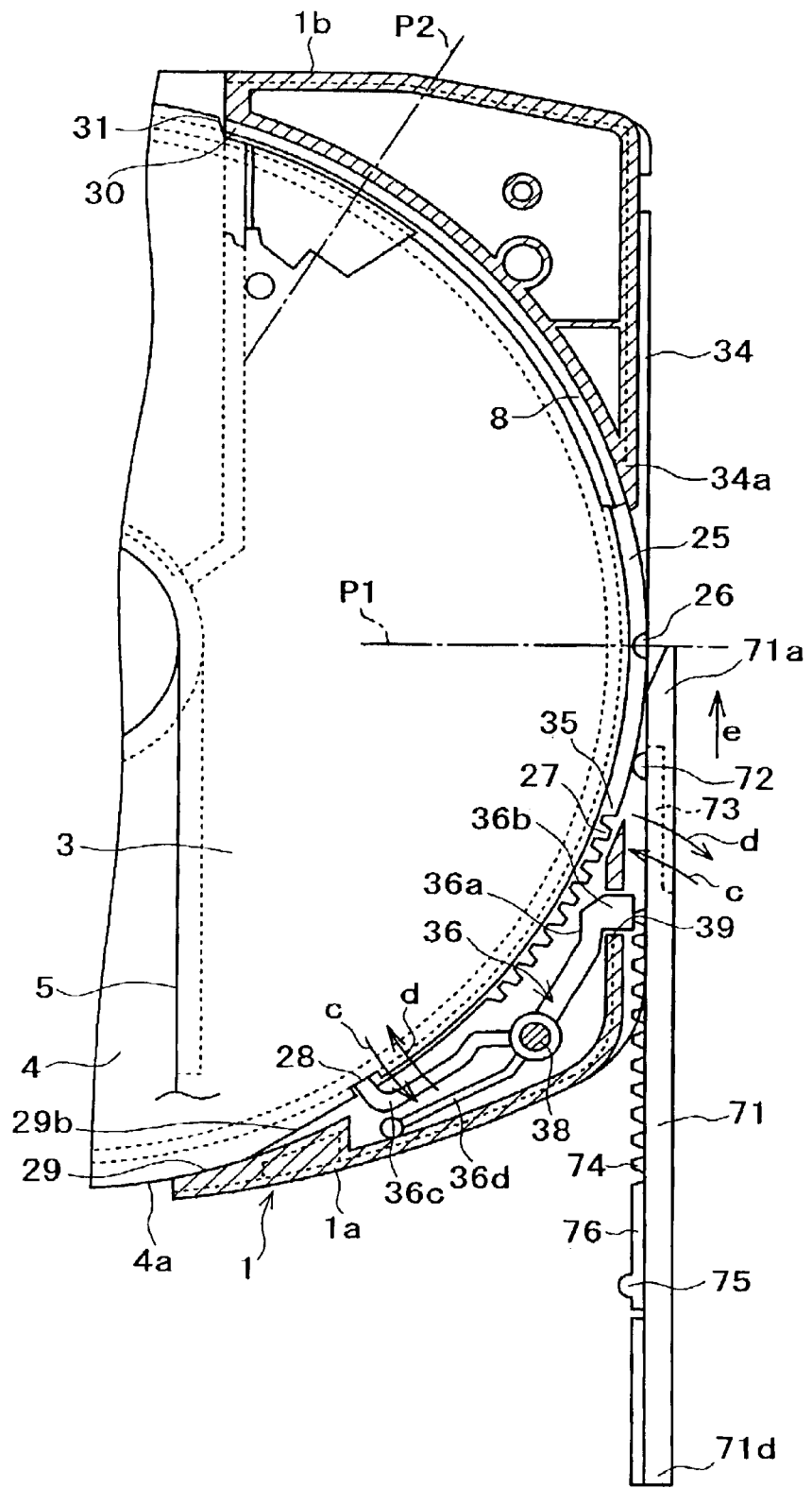
FIG. 37 is a bottom view with parts partially cutaway, showing a rotational state of the inner rotor by the rack member, which state is continued from the state shown in FIG. 36.

However, as shown in FIG. 37, at the same time when the shutter opening/closing starting projection 72 of the rack member 71 comes in the direction "e" into contact with the shutter opening/closing starting projection 25 on the outer periphery of the inner rotor 4, the leading end side of the rack member 74 serving as the lock releasing portion of the rack member 71 rides on the leading end 36b of the lock releasing arm 36a of the lock member 36, to depress the lock releasing arm 36a again in the direction "c".

Accordingly, as described above, the lock arm 36c of the lock member 36 is rotated in the direction "c", that is, the lock releasing direction against the spring force of the mold spring 36d, whereby the lock member 36 becomes a lock releasing state. After that, the lock member 36 is kept in the lock releasing state until the inner rotor 4 is rotated intermediately before a shutter opening/closing ending position.

Figure 38:
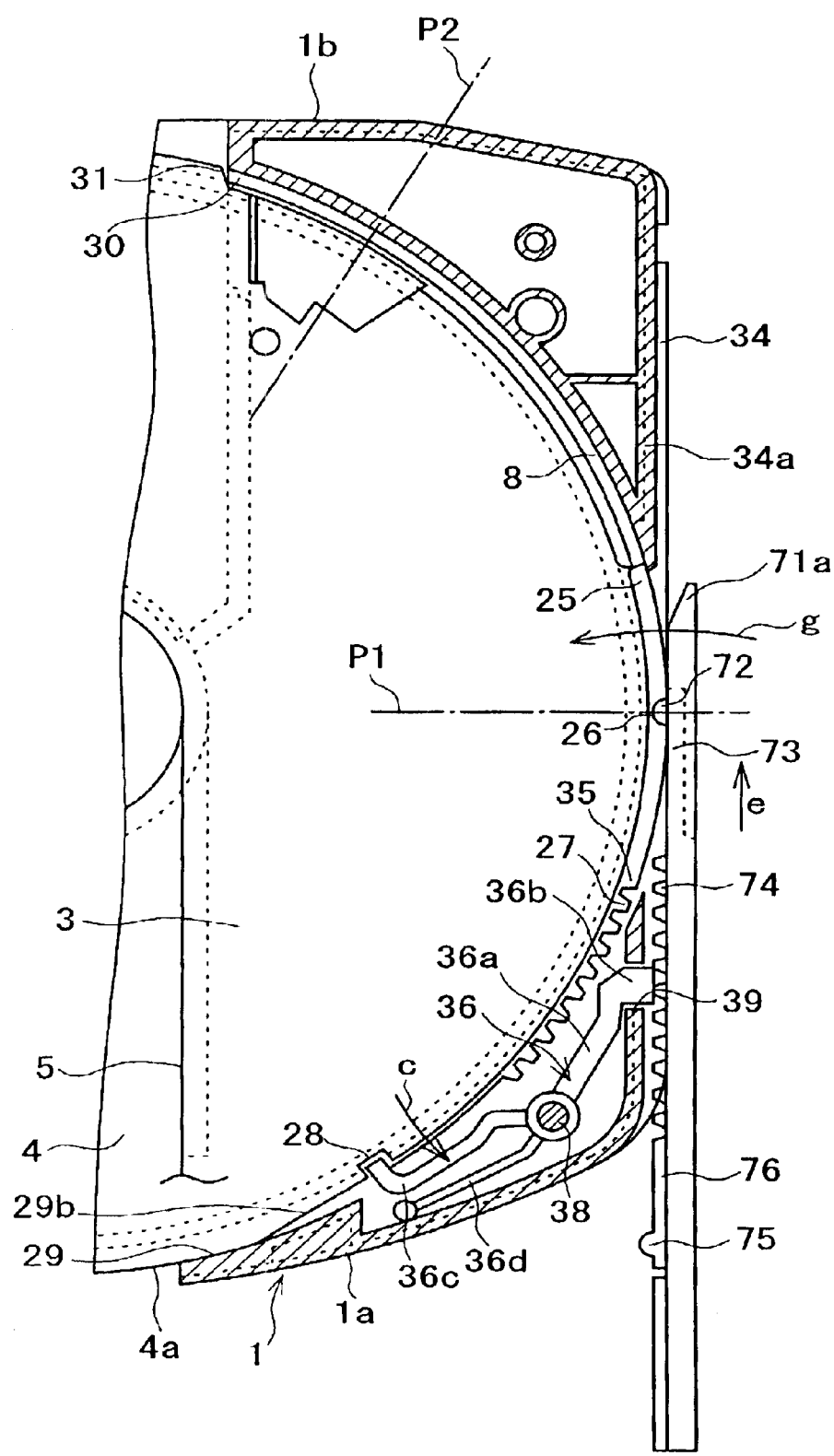
FIG. 38 is a bottom view with parts partially cutaway, showing a rotational state of the inner rotor by the rack member, which state is continued from the state shown in FIG. 37.

As shown in FIG. 38, when the rack member 71 is further slid in the direction "e", the shutter opening/closing starting projection 72 at the leading end of the rack member 71 is engaged in the shutter opening/closing starting recess 26 of the inner rotor 4 in the direction "g" by the spring force of a mold spring 73.

After that, as the rack member 71 is further slid in the direction "e", the shutter opening/closing starting recess 26 is rotated in the direction "a" by the shutter opening/closing starting projection 72, with a result that the inner rotor 4 is thus started to be rotated from the shutter opening/closing starting position in the direction "a".

Figure 39:
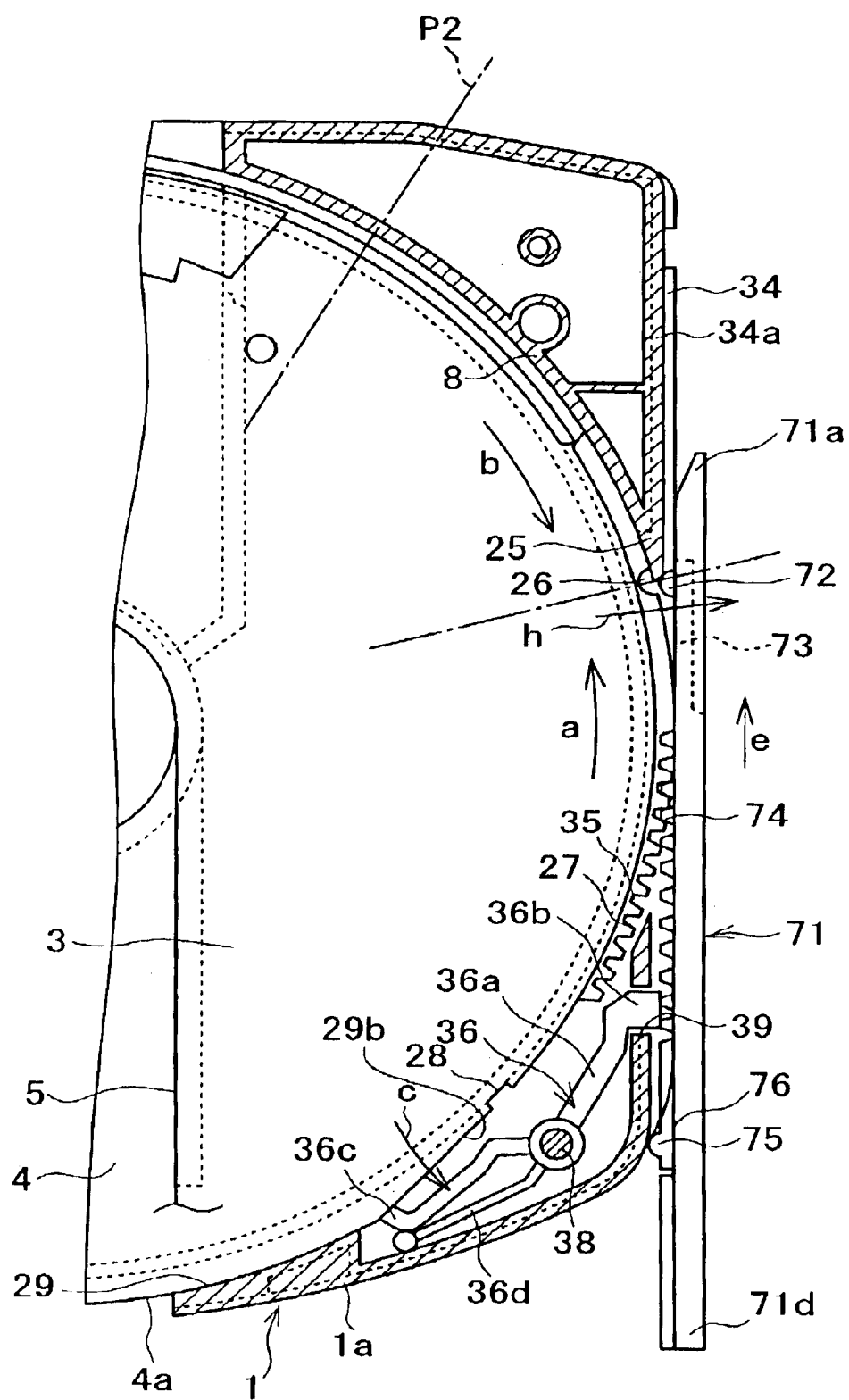
FIG. 39 is a bottom view with parts partially cutaway, showing a rotational state of the inner rotor by the rack member, which state is continued from the state shown in FIG. 38.
Figure 40:
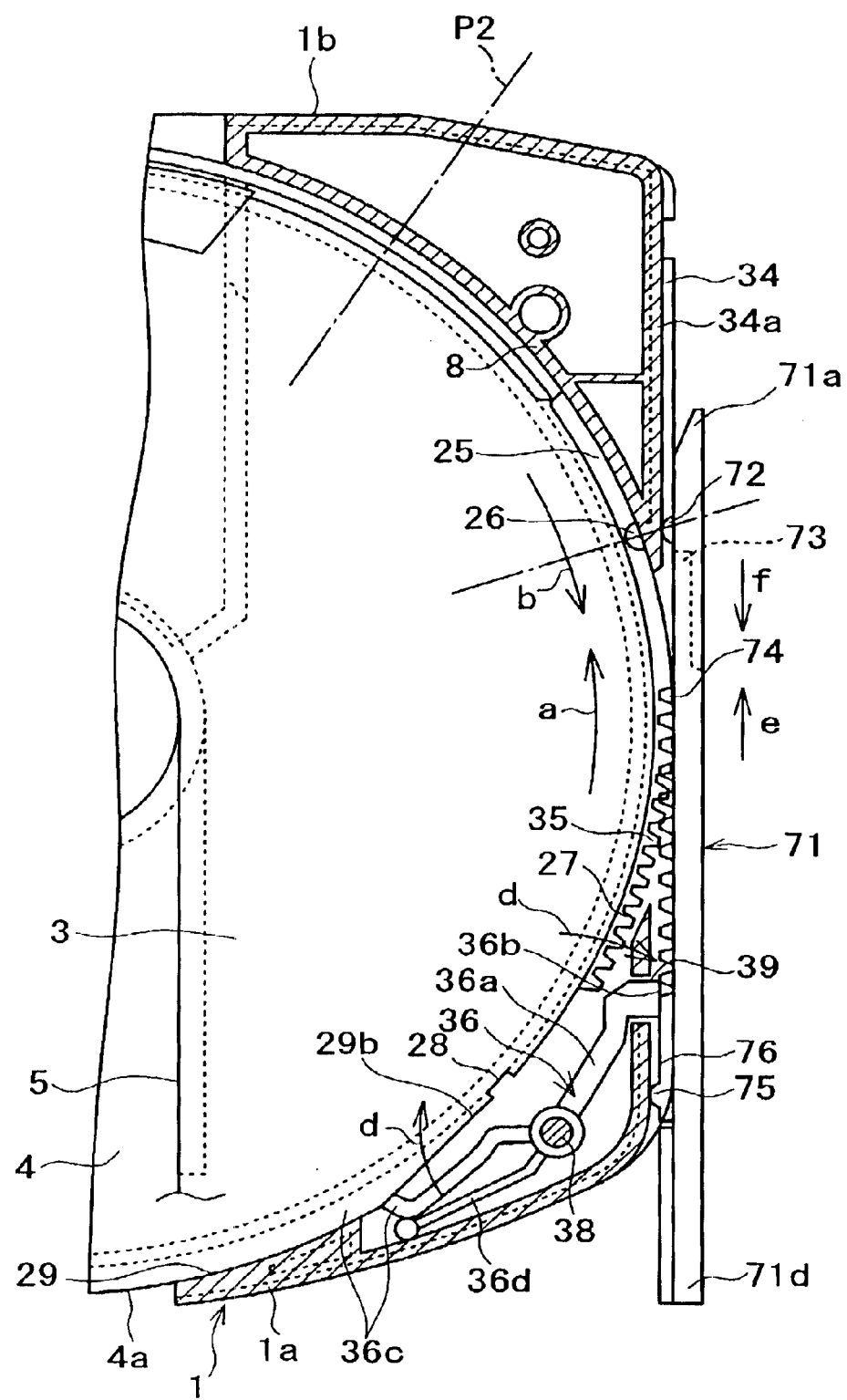
FIG. 40 is a bottom view with parts partially cutaway, showing a rotational state of the inner rotor by the rack member, which state is continued from the state shown in FIG. 39.
Figure 41:
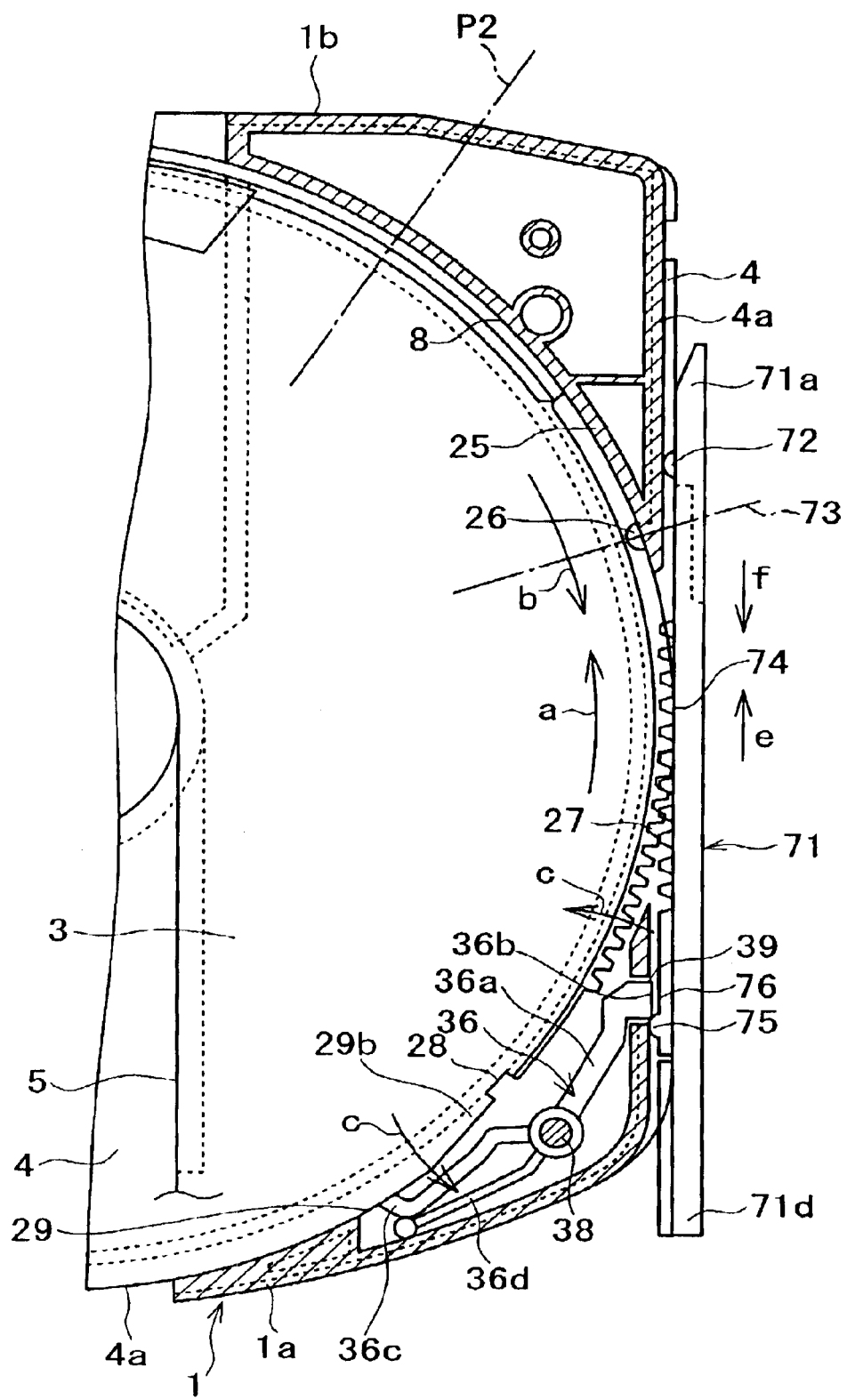
FIG. 41 is a bottom view with parts partially cutaway, showing a rotational state of the inner rotor by the rack member, which state is continued from the state shown in FIG. 40.

As shown in FIG. 39, when the rack member 71 is further sliding the direction "e", a rack 74 of the rack member 71 is meshed with the partial gear 27 on the outer periphery of the inner rotor 4 in the direction "e", and immediately the shutter opening/closing starting projection 72 of the rack member 71 is relatively separated from the shutter opening/closing starting recess 26 formed in the outer periphery of the inner rotor 4 in the direction "h".

After that, as shown in FIGS. 39 to 43, the partial gear 27 is rotated in a non-slip manner by the rack 74 of the rack member 71 being further slid in the direction "e", whereby the inner rotor 4 is forcibly rotated in the direction "a" against a rotational slide friction in the disk cartridge 1.

As shown in FIGS. 39 to 42, during rotation of the partial gear 27 of the inner rotor 4 in the direction "a" by the rack 74 of the rack member 71, the leading end of the lock arm 36c, which has been separated from the shutter opening/closing ending recess 28, rides on a circular-arc shutter opening/closing ending projection 29 integrally molded on the outer peripheral surface 4a of the inner rotor 4 while being guided by a gentle tilt plane 29b. The leading end 36b of the lock releasing arm 36a of the lock member 36 is withdrawn to a position being nearly at the same level as that of the bottom portion 34a of the recessed groove 34 of the disk cartridge 1. Accordingly, during the operation shown in FIG. 41 and the operation shown in FIG. 42, the rack member 71 does not receive a load generated by depressing the leading end 36b of the lock releasing arm 36a of the lock member 36, and therefore, the rack member 71 can be smoothly moved in the direction "e".

Figure 42:
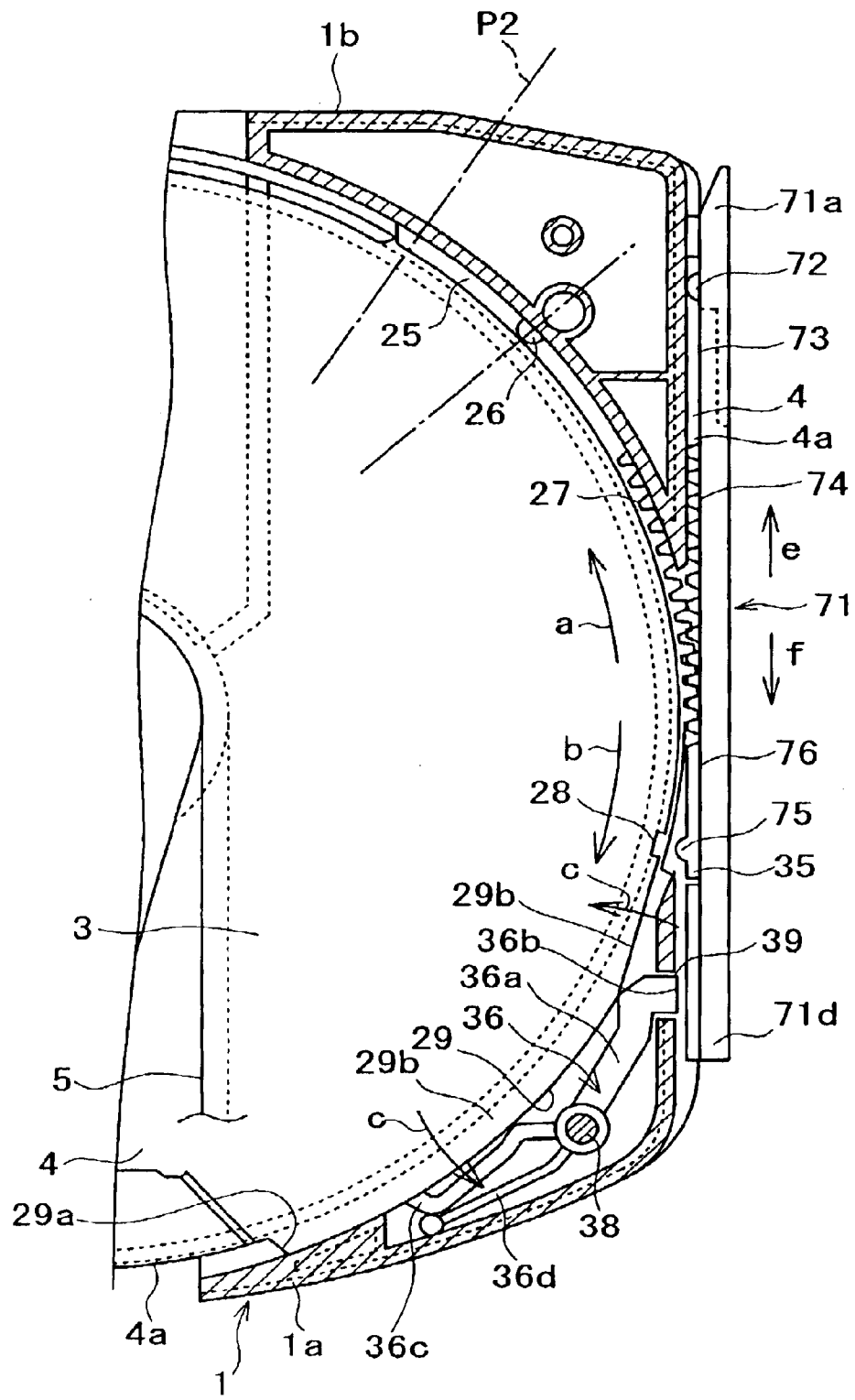
FIG. 42 is a bottom view with parts partially cutaway, showing a rotational state of the inner rotor by the rack member, which state is continued from the state shown in FIG. 41.
Figure 43:
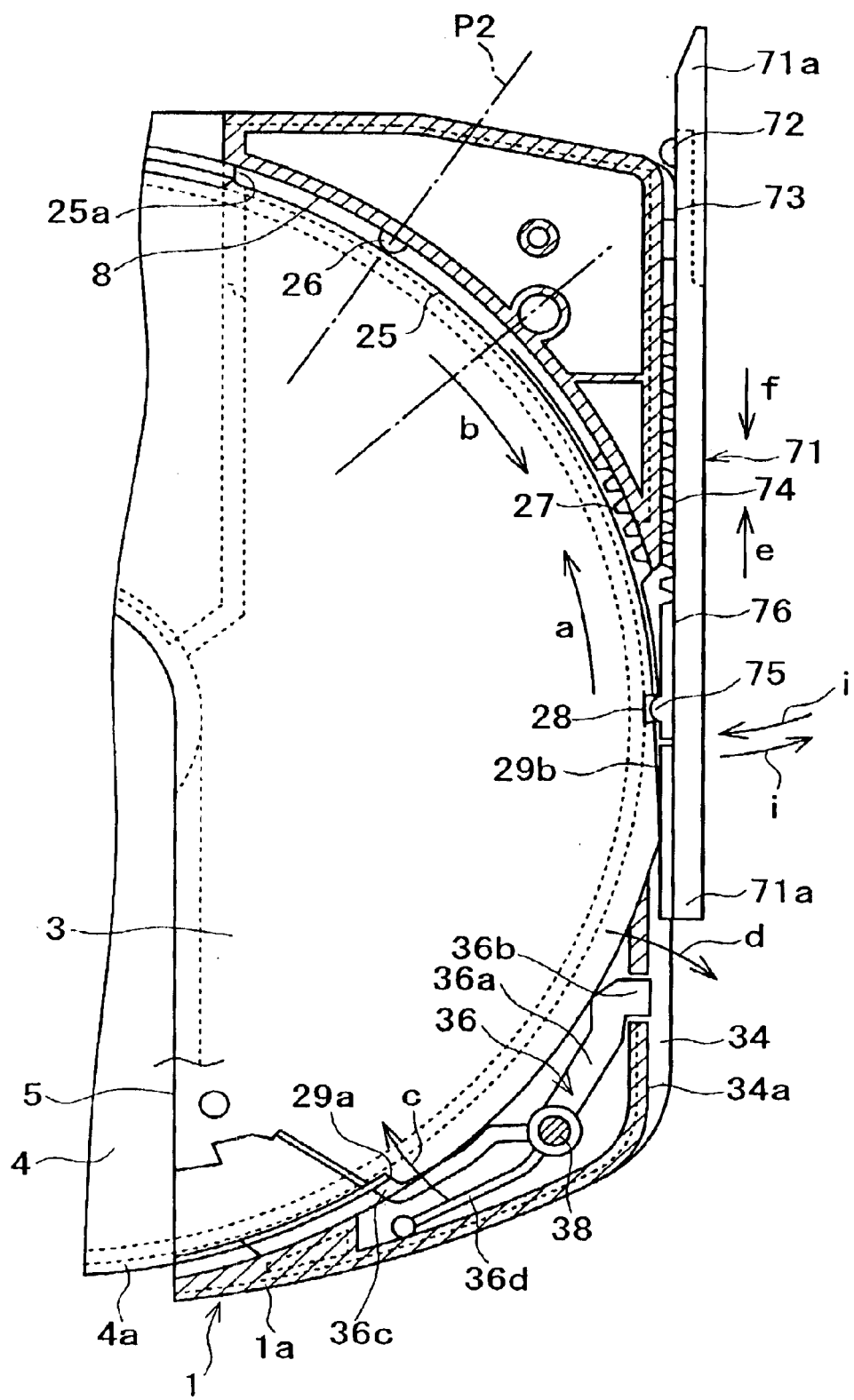
FIG. 43 is a bottom view with parts partially cutaway, showing a rotational state of the inner rotor by the rack member, which state is continued from the state shown in FIG. 42.

FIG. 43 shows a shutter opening/closing ending position (opening portion opening position) P2 of the inner rotor 4. Immediately before the rack member 71 is moved from the position shown in FIG. 42 to a position shown in FIG. 43, the shutter opening/closing ending projection 75 of the rack member 71 is engaged in the shutter opening/closing ending recess 28 in the outer periphery of the inner rotor 4 in the direction "i" by the spring force of a mold spring 76, and immediately the rack 74 of the rack member 71 is separated from the partial gear 27 on the outer periphery of the inner rotor 4.

When the rack member 71 is further slid in the direction "e" to a sliding motion ending position shown in FIG. 43, the shutter opening/closing ending recess 28 is rotated in the direction "a" by the shutter opening/closing ending projection 75, whereby the inner rotor 4 is rotated to the shutter opening/closing ending position shown in FIG. 9 in the direction "a".

An end plane 25a, on the direction "a" side, of the shutter opening/closing starting recess 25 in the outer periphery of the inner rotor 4 is brought into contact with an inner rotor stopper 30 in the direction "a" in the disk cartridge 1, to stop the inner rotor 4 at the shutter opening/closing ending position. Nearly at the same time, the leading end of the lock arm 36c of the lock member 36 is dropped, in the direction "c", in a locking stepped portion 29a formed at an end portion on the direction "b" side of the shutter opening/closing ending projection 29 on the outer periphery of the inner rotor 4 by the spring force of the mold spring 36d, so that the inner rotor 4 is locked between the inner rotor stopper 30 and the rock arm 36c at the shutter opening/closing ending position.

At this time, as described above, the pair of shutters 9 and 10 is completely opened to the shutter opening/closing ending position (opening portion opening position) P2, and the pickup insertion hole 5b of the disk cartridge 1 is completely opened.

The operations for rotating the inner rotor 4 from the shutter opening/closing ending position (opening portion opening position) P2 shown in FIG. 43 to the shutter opening/closing starting position (opening portion closing position) P1 by the slide motion of the rack member 71 relative to the disk cartridge 1 in the direction "f", to close the pair of shutters 9 and 10 to the shutter opening/closing starting position (to be described in detail later) may be reversed to those described above.

Specifically, when the rack member 71 is slid in the direction "f" from the shutter opening/closing ending position shown in FIG. 43, the shutter opening/closing ending recess 28 of the rack member 71 is rotated in the direction "b". At this time, as shown in FIG. 42, the lock arm 36c of the lock member 36 rides on the shutter opening/closing ending projection 29 of the inner rotor 4 against the spring force of the mold spring 36d.

As shown in FIGS. 42 to 39, the rack 74 of the rack member 71 is meshed with the partial gear 27 on the outer periphery of the inner rotor 4, and thereby the inner rotor 4 is rotated in a non-slip manner in the direction "b". After that, as shown in FIG. 38, the shutter opening/closing starting recess 26 in the outer periphery of the inner rotor 4 is rotated in the direction "b" by the shutter opening/closing starting projection 72 of the rack member 71, so that the inner rotor 4 is returned in the direction "b" to the shutter opening/closing starting position. A stopper projection 31 integrally molded on the outer periphery of the inner rotor 4 comes in the direction "b" into contact with the inner stopper 30 of the disk cartridge 1, to stop the inner rotor 4 at the shutter opening/closing starting position. Nearly at the same time, the lock arm 36c of the lock member 36 is engaged in the shutter opening/closing ending recess 28 serving as the locking recess of the inner rotor 4, to lock again the inner rotor 4 at the shutter opening/closing starting position.

As shown in FIGS. 37 to 35, when the rack member 71 is further slid in the direction "f", the shutter opening/closing starting projection 72 is separated from the shutter opening/closing starting recess 26 of the inner rotor 4 against the spring force of the mold spring 73, so that the rack member 71 is separated from the disk cartridge 1 in the direction "f".

The opening/closing operation of the shutter opening/closing mechanism 16 opened/closed by rotation of the inner rotor 4 will be described with reference to FIGS. 44 to 50.

Figure 44:
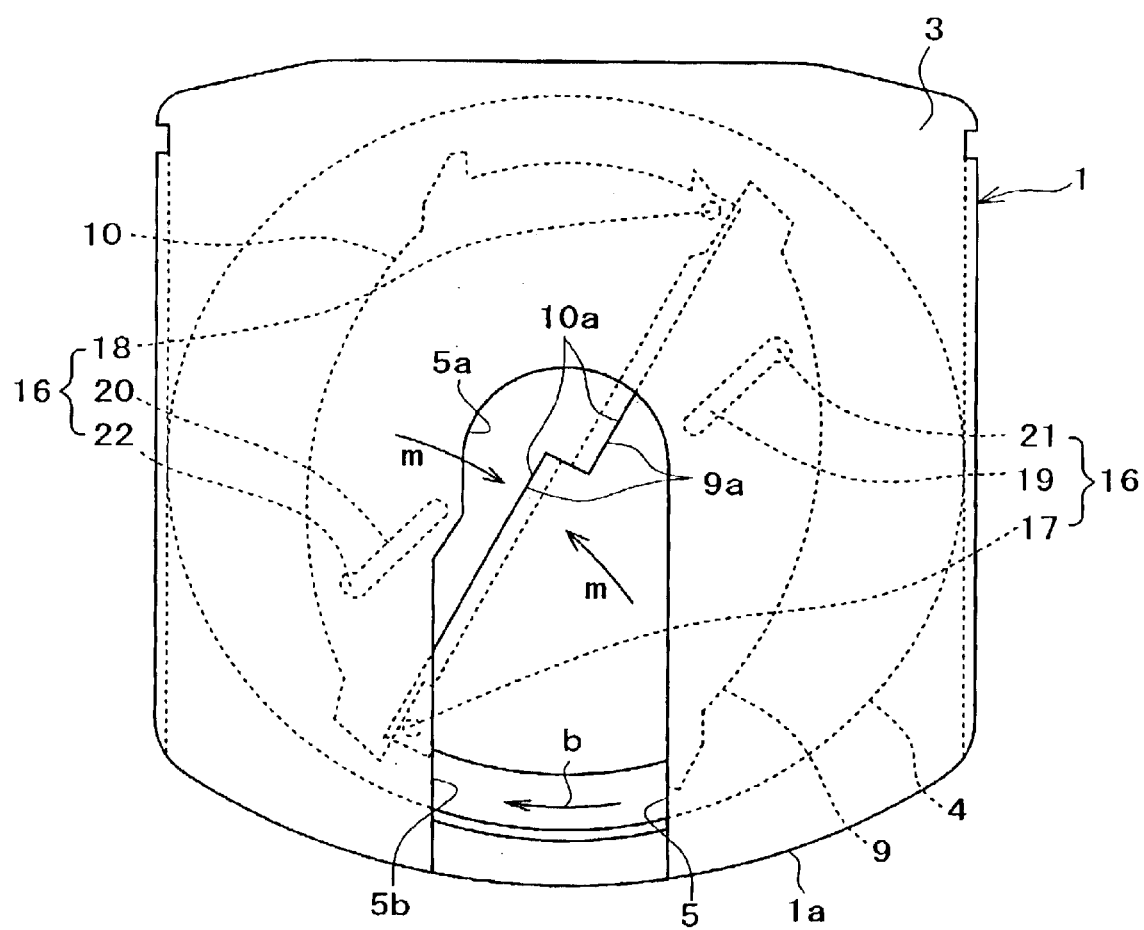
FIG. 44 is a bottom view showing a state that the opening portion of the lower shell is closed by the pair of shutters and the inner rotor in the disk cartridge using the inner rotor.

As shown in FIG. 44, when the inner rotor 4 is returned, by rotation in the direction "b", to the shutter opening/closing starting position (opening portion closing position) P1, the shutter opening/closing mechanism 16 is operated so as to close the pair of shutters 9 and 10. To be more specific, the pair of shutters 9 and 10 are turned in the directions "m" around the pair of turning fulcrum pins 17 and 18 and are thereby moved close to each other by a nearly parallel motion at the shutter closing position where the pair of shutters 9 and 10 cross a portion near the center of the opening portion 5. Subsequently, the pair of tilt planes 9a and 10a for overlap, which are disposed along the edges of the pair of the shutters 9 and 10 and which have a Z-shape and are symmetric with each other, are vertically overlapped to each other. As a result, the central opened portion, overlapped to the opening portion 4d of the inner rotor 4, of the opening portion 5 of the lower shell 3, is closed with the pair of shutters 9 and 10.

Accordingly, in the shutter closed state, the entire opening portion 5 of the lower shell 3 is completely closed by the bottom portion 4b of the inner rotor 4 and the pair of the shutters 9 and 10.

Figure 45:
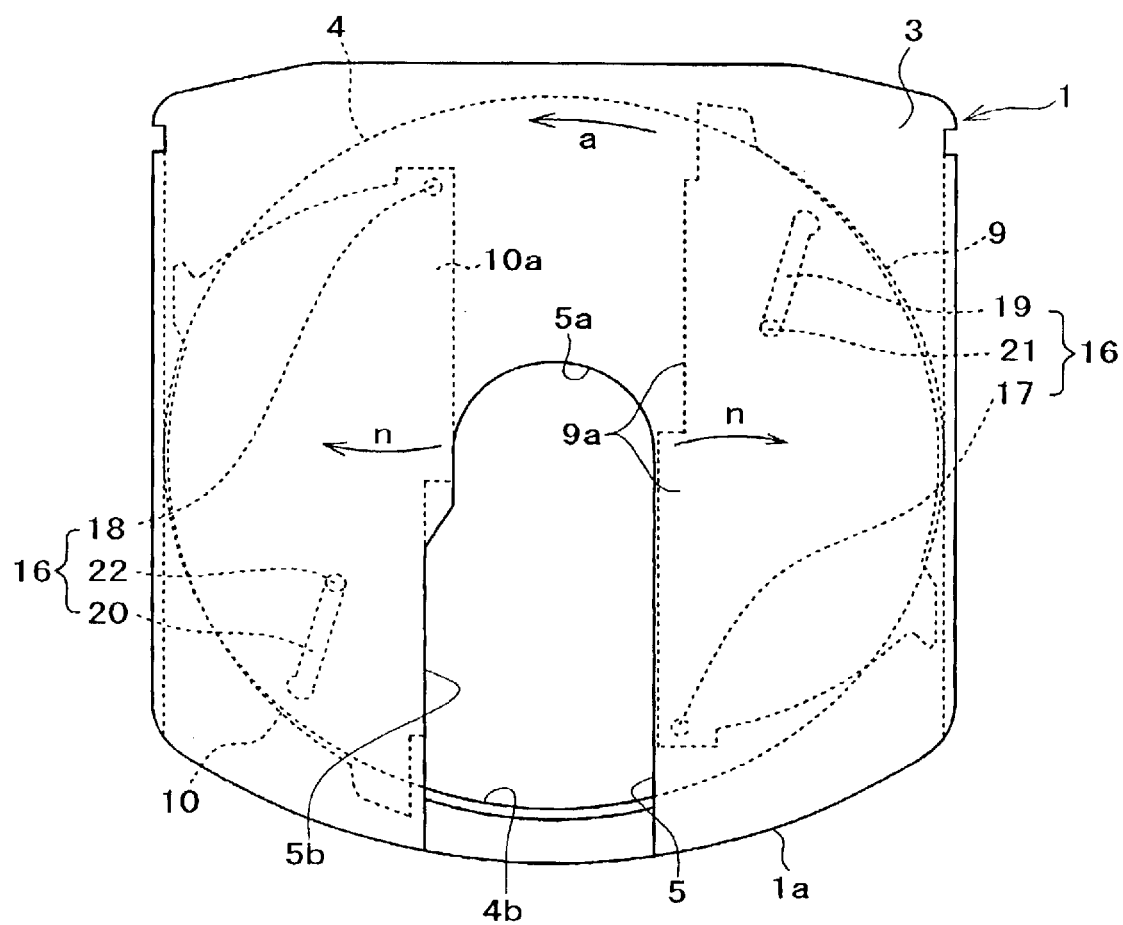
FIG. 45 is a bottom view showing a state that the opening portion of the lower shell in the state shown in FIG. 44 is opened.

On the other hand, as shown in FIGS. 45 and 50, when the inner rotor 4 is rotated in the direction "a" to the shutter opening/closing ending position (opening portion opening position) P2, the shutter opening/closing mechanism 16 is operated so as to open the pair of shutters 9 and 10. To be more specific, the pair of shutters 9 and 10 are turned around the pair of turning fulcrum pins 17 and 18 in the directions "n" where they are separated from each other by the so-called cam action of the pair of the cam grooves 19 and 20 and the cam pins 21 and 22 in synchronization with the turning motion of the pair of turning fulcrum pins 17 and 18 in the direction "a", so that the pair of the shutters 9 and 10 are opened in parallel to each other to both edges of the opening portion 5.

At this time, the opening portion 4d of the inner rotor 4 is completely overlapped to the opening portion 5, to completely open the entire opening portion 5.

Figure 51:
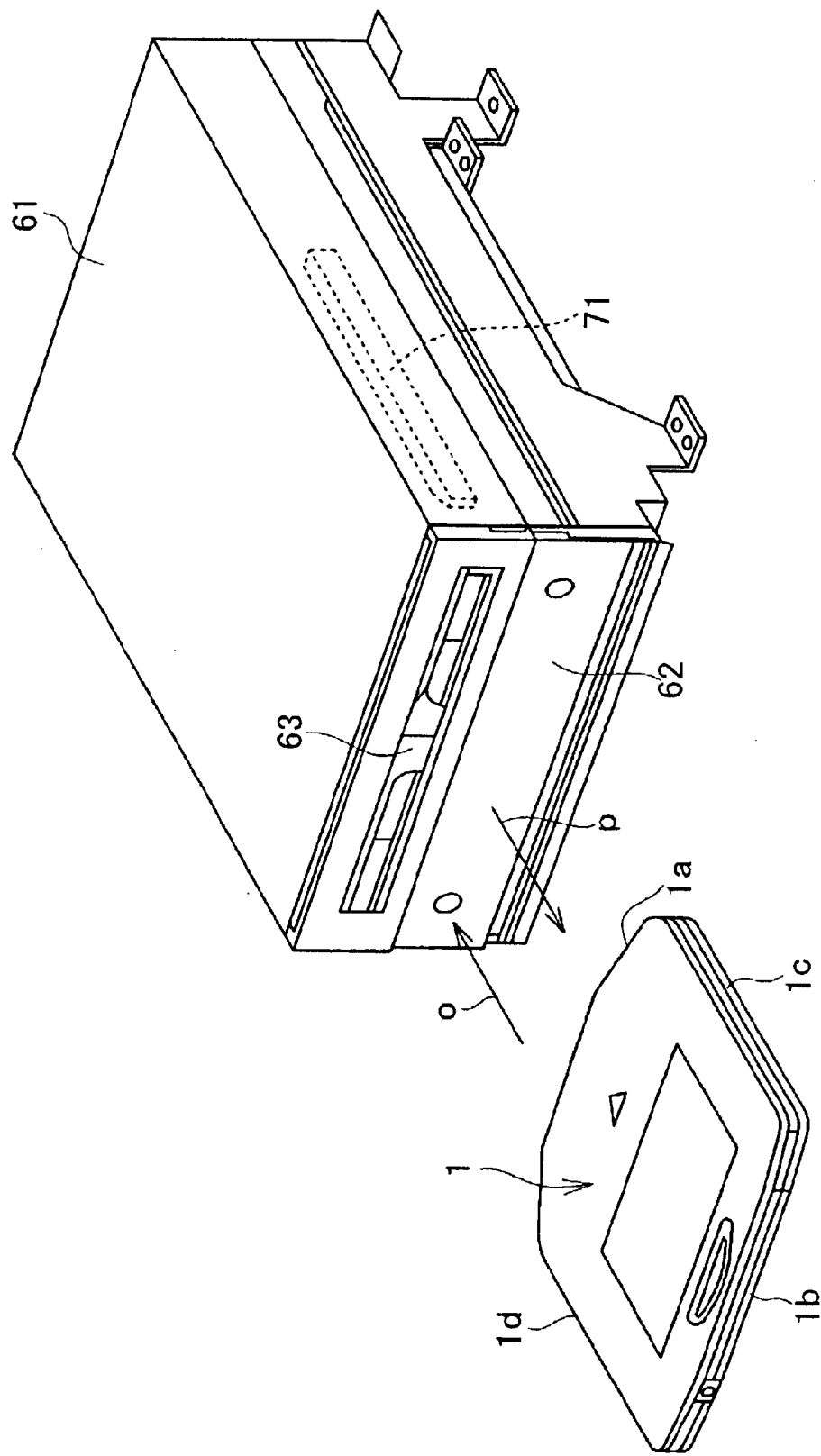
FIG. 51 is a perspective view of the disk cartridge using the inner rotor and a disk drive unit.

FIG. 51 shows a disk drive unit 61 including a front panel 62 having, on its upper side, a slit-shaped cartridge insertion port 63.

The disk cartridge 1 is inserted along the direction "o" in a cartridge holder (not shown) through the cartridge insertion port 63, and a lock arm (not shown) as a locking means mounted in the cartridge holder is engaged in the locking recess 13 formed in the side surface 1d of the disk cartridge 1, to lock (hold) the disk cartridge 1 in the cartridge holder.

The inner rotor 4 is then rotated by the rack member 71 as described above, to open the shutters 9 and 10 in the directions "m".

The cartridge holder is then descended in the horizontal posture, or withdrawn once to the rear side in the horizontal posture and then moved down in the horizontal posture, to be positioned at an appropriate location, and thereafter, a disk table of a spindle motor and an optical pickup (both not shown) are relatively inserted from below in the opening portion 5 of the disk cartridge 1.

The disk D is floated to a vertical intermediate position of the disk housing portion 6 in the inner rotor 4 by the disk table, and is centered on and chucked to the disk table by the disk clamper 11.

The disk D is rotated at a specific speed by the spindle motor, and data is recorded or reproduced on or from the disk D by the optical pickup.

(8) Description of First Dustproof Structure of Disk Cartridge Using Slide Shutter A first dustproof structure of a disk cartridge using a slide shutter will be described with reference to FIGS. 52 to 54.

Figure 52:
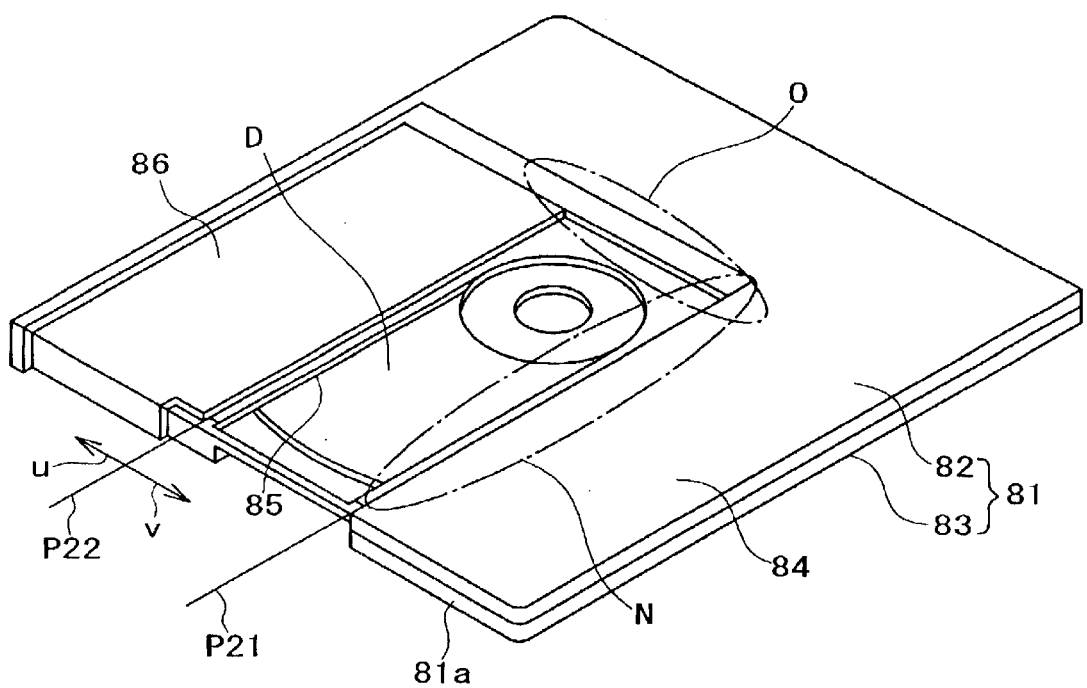
FIG. 52 is a perspective view of a disk cartridge using a slide shutter to which the present invention is applied.

FIG. 52 shows a disk cartridge using a slide shutter 81 (hereinafter, referred to simply as "disk cartridge") as one example of recording medium housing cartridges incorporating recording medium housing portions. The disk cartridge 81 is formed into a flat shape by connecting an upper shell 82 and a lower shell 83, each of which is formed of a molded product of a synthetic resin or the like, to each other in the vertical direction.

The disk cartridge 81 internally includes a flat, circular disk housing portion 84. A disk D as a disk-like recording medium, for example, a DVD is horizontally housed in the disk housing portion 84 in such a manner as to be rotatable and to vertically movable by a specific amount.

An opening portion 85 for insertion of a pickup and a disk table is formed along a central portion of the lower shell 83 and along central portions of the upper and lower shells 83 and 84. A shutter 86 having a nearly L-shape or U-shape for opening/closing the opening portion 85 is mounted to the outside of the lower shell 83 and the upper and lower shells 82 and 83. The opening portion 5 is opened by sliding the shutter 86 in the directions "u" and "v" along a front end surface or a lateral side surface, for example, along a side surface 81a. The shutter 86 is formed of a molded member of a synthetic resin or the like, or a metal thin plate made of stainless steel or the like.

The first dustproof structure is composed of elastic members 88 made from a rubber or a soft synthetic resin.

When the shutter 86 is returned, by sliding motion in the direction "v", to an opening portion closing position P21, air AR containing dust DT is liable to permeate in the disk cartridge 81 through gap portions 87 (N portions in FIG. 52) at both ends of the opening portion 85.

To cope with such an inconvenience, the elastic members 88 are provided in the gap portions 87. The gap portions 87 are formed at portions (N portions in FIG. 52) where both ends 86a of the shutter 86 in the slide direction, that is, the directions "u" and "v" are vertically overlapped to both side edges 81b of the opening portion 85 of the lower shell 83 or the upper and lower shells 82 and 83 of the disk cartridge 81. This is effective to completely seal the gap portions 87 and hence to prevent the permeation of the air AR containing the dust DT in the disk cartridge 81 through the gap portions 87, that is, through the opening portion 85.

The configuration of the first dustproof structure will be more fully described with reference to FIG. 53.

As shown in the figure, a pair of ribs 81c are formed at both side edges 81b of the opening portion 85 of the disk cartridge 81 in such a manner as to project upwardly therefrom, and a pair of ribs 86b are formed at both ends 86a of the shutter 86 in such a manner as to project downwardly therefrom. At both the side edges 81b of the opening portion 85 of the disk cartridge 81, a pair of strip-shaped the elastic members 88 are attached to portions adjacent to the pair of ribs 81c in the shutter opening direction, that is, the direction "u" in such a manner as to be in parallel to each other. The attachment of the pair of elastic members 88 may be performed by adhesive bonding, fitting, or fusion.

The function of the first dustproof structure will be described below. When the shutter 86 is returned, by sliding motion in the direction "v", to the opening portion closing position P21, both the ends 86a of the shutter 86 are brought into close-contact with the pair of elastic members 88 against the elastic forces of the elastic members 88, to completely seal the opening portion 85. As a result, it is possible to positively prevent the permeation of the air AR containing the dust DT in the disk cartridge 1 through the opening portion 85.

FIG. 54A shows a modification of the first dustproof structure, wherein the elastic member 88 has a tube-like cross-sectional shape, and FIG. 54B shows another modification of the first dustproof structure, wherein the elastic member 88 has a loop-like cross-sectional shape. Such a modified elastic member 88 formed into the deformable tube-like or loop-like shape is effective to improve the adhesiveness of each end 86a of the shutter 86 on the elastic member 88 by the close-contact, and hence to more positively prevent the permeation of the air AR containing the dust DT in the disk cartridge 1 through the opening portion 85.

FIG. 54C shows a further modification of the first dustproof structure, wherein the pair of ribs 86b formed at both the ends 86a of the shutter 86 are brought into close-contact with the tops of a pair of elastic members 88 having deformable shapes such as tube-like shapes formed on the side edges 81b of the opening portion 5 of the disk cartridge 81.

With these configurations, the shutter 86 can be slid either in the direction "u" or in the direction "v" with respect to the center of the opening portion 5.

Figure 55:
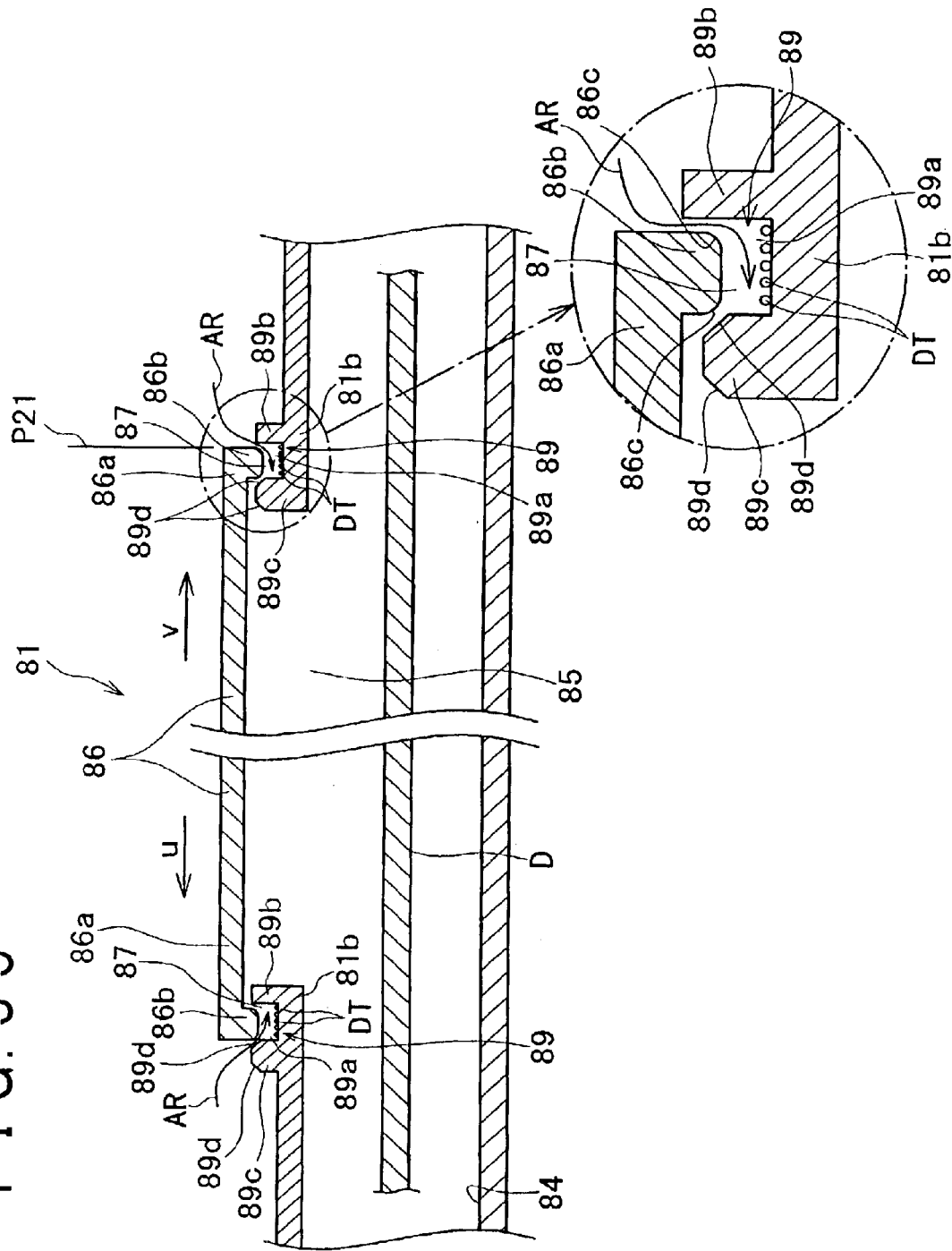
FIG. 55 is an enlarged sectional view of the N portion shown in FIG. 52 for explaining a second dustproof structure including a labyrinth shape portion in the disk cartridge using the slide shutter.

(9) Description of Second Dustproof Structure of Disk Cartridge Using Slide Shutter A second dustproof structure of the disk cartridge using the slide shutter will be described with reference to FIGS. 55 to 57.

The second dustproof structure is composed of labyrinth shape portions 89 having recessed dust deposition portions 89a.

When the shutter 86 is returned, by the sliding motion in the direction "v", to the opening portion closing position P21, the air AR containing the dust DT is liable to permeate in the disk cartridge 81 through gap portions 87 (N portions in FIG. 52) at both ends of the opening portion 85.

To cope with such an inconvenience, the labyrinth shape portions 89 having the recessed dust deposition portions 89a are provided in the gap portions 87. The gap portions 87 are formed at portions (N portions in FIG. 52) where both ends 86a of the shutter 86 in the slide direction, that is, the directions "u" and "v" are vertically overlapped to both side edges 81b of the opening portion 85 of the lower shell 83 or the upper and lower shells 82 and 83 of the disk cartridge 81. This is effective to completely seal the gap portions 87 and hence to prevent the permeation of the air AR containing the dust DT in the disk cartridge 81 through the gap portions 87, that is, through the opening portion 5.

The configuration of the second dustproof structure will be more fully described with reference to FIG. 55.

As shown in the figure, a pair of ribs 89b and a pair of ribs 89c are formed at both the side edges 81b of the opening portion 85 of the disk cartridge 81 in such a manner as to project upwardly therefrom, and a pair of ribs 86b are formed at both the ends 86a of the shutter 86. The labyrinth shape portion 89 having the recessed dust deposition portion 89a formed into a nearly U-shape is provided between the ribs 89b and 89c and the rib 86b on each side of the opening portion 86 of the disk cartridge 81.

In addition, of the ribs 89b and 89c, the rib 89b on the shutter closing direction, that is, the direction "v" is higher than the rib 89c. Such a rib 89b serves as a stopper against the shutter 86 at the opening portion closing position P21.

The rib 89c on the shutter opening direction, that is, the direction "u", which has a low height, is configured such that the leading end facing to the rib 86b has an escape plane 89d such as a C-plane or an R-plane. The rib 86b is also configured such that the leading end facing to the rib 89c has an escape plane 86d such as a C-plane or an R-plane.

When the shutter 86 is returned, by the sliding motion in the direction "v", to the opening portion closing position P21, each of the ribs 86b of the shutter 86 and the corresponding rib 89c of the disk cartridge 81 can be escaped from each other by means of the escape planes 86c and 89d, with a result that the rib 86b of the shutter 86 rides over the rib 89c of the disk cartridge 81 against the elastic force of the disk cartridge 81 in the direction "v", to be fitted between the ribs 89b and 89c, to form the recessed dust deposition portion 89a.

The function of the second dustproof structure will be described below. When the air AR containing the dust DT passes through each labyrinth shape portion 89 along a path bent in a nearly U-shape and permeates in the disk cartridge 81 from the opening portion 85, the flow rate of the air AR is rapidly weakened in the labyrinth shape portion 89, so that the dust DT is separated from the air AR and is deposited in the recessed dust deposition portion 89a. As a result, it is possible to effectively prevent the permeation of the dust DT in the disk cartridge 81 from the opening portion 85.

Figure 56:
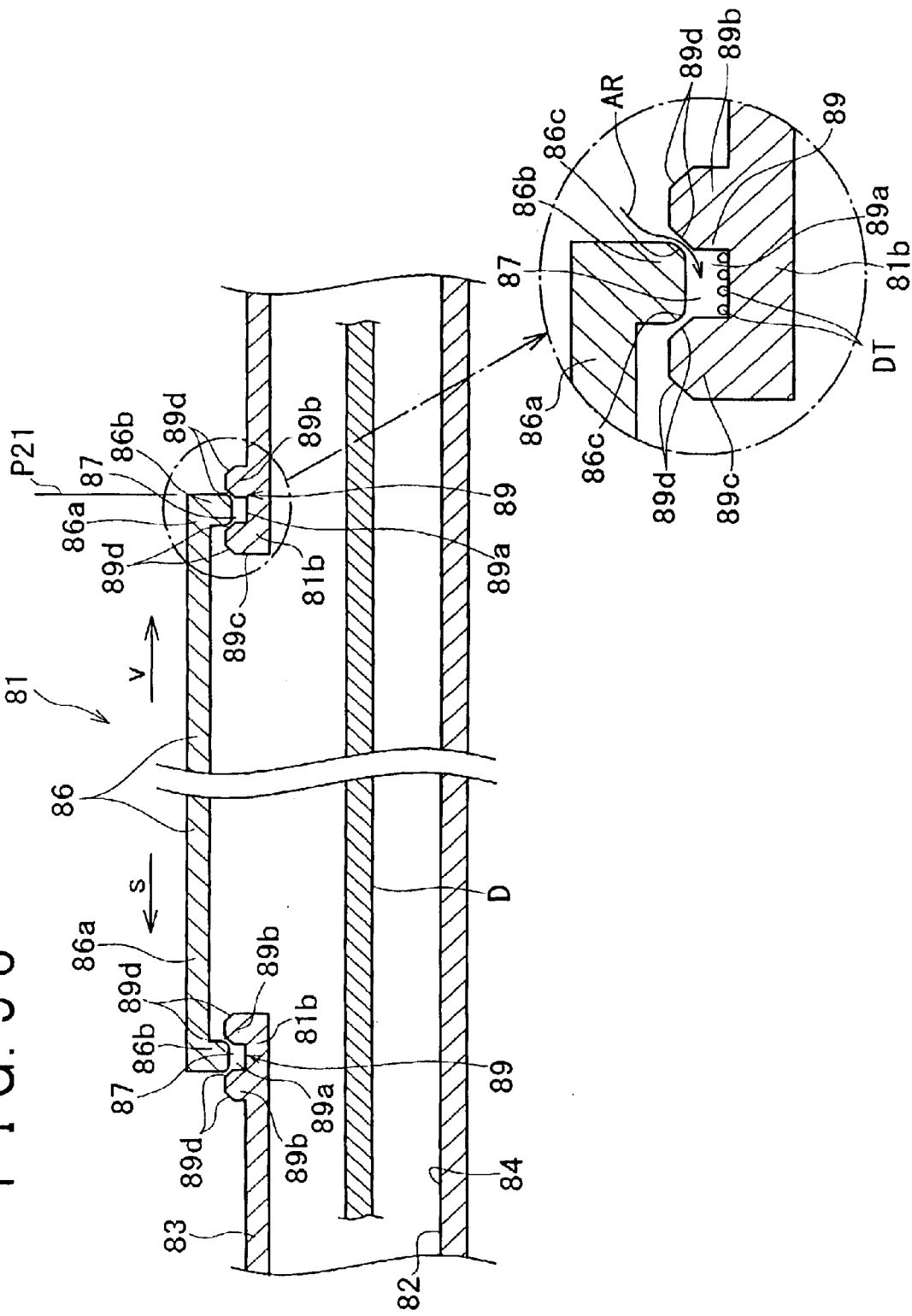
FIG. 56 is an enlarged sectional view of a modification of the labyrinth shape portion in the second dustproof structure.

FIG. 56 shows a modification of the second dustproof structure, wherein the heights of the set of the ribs 89b and 89c at each side edge of the opening portion 85 of the disk cartridge 81 are made equal to each other, and escape planes 89d, for example, C-planes or R-planes are formed at the leading end of each of the ribs 89b and 89c.

With this configuration, the shutter 89 can be slid either in the direction "u" or the direction "v" with respect to the center of the opening portion 85. To be more specific, when the shutter 89 is slid in the direction "u", as described above, each of the ribs 86b of the shutter 86 and the corresponding rib 89c of the disk cartridge 81 can be escaped from each other by means of the escape planes 86c and 89d, with a result that the rib 86b of the shutter 86 rides over the rib 89c of the disk cartridge 81 against the elastic forces of the shutter 86 and the disk cartridge 81 in the direction "u", and similarly, when the shutter 89 is slid in the direction "v", each of the ribs 86b of the shutter 86 and the corresponding rib 89c of the disk cartridge 81 can be escaped from each other by means of the escape planes 86c and 89d, with a result that the rib 86b of the shutter 86 rides over the rib 89c of the disk cartridge 81 against the elastic forces of the shutter 86 and the disk cartridge 81 in the direction "v".

Figure 57:
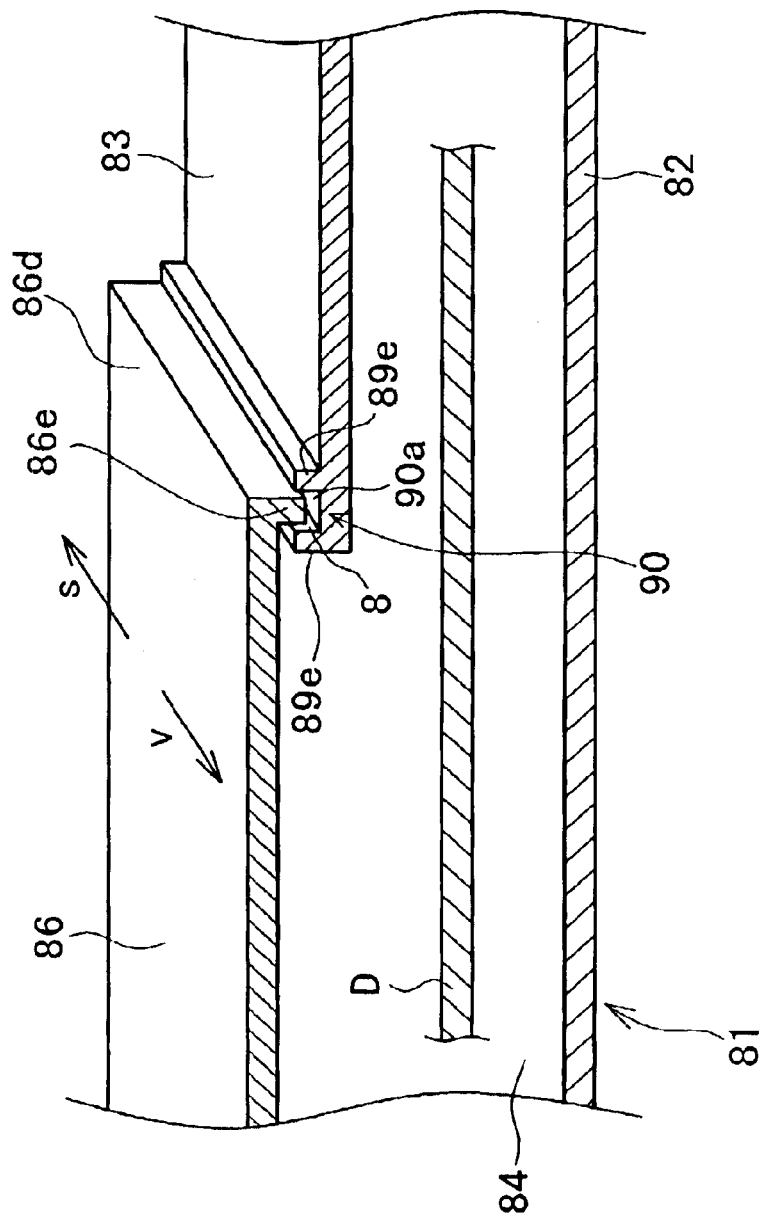
FIG. 57 is an enlarged sectional view of an O portion shown in FIG. 52 in the second dustproof structure including the labyrinth shape portion.

FIG. 57 shows the second dustproof structure provided in an O-portion shown in FIG. 52. To be more specific, a labyrinth shape portion 90 (as the second dustproof structure) extending along the direction parallel to the sliding direction of the shutter 86, that is, the directions "u" and "v" is formed at one end or each of both ends of the shutter 86 in the direction perpendicular to the sliding direction of the shutter 86, that is, the directions "u" and "v". In this case, a rib 86d formed at the end of the shutter 86 is inserted between a pair of ribs 89e formed at the end of the disk cartridge 81, to form the labyrinth shape portion 90 having a nearly U-shape. The rib 86d of the shutter 86 is slid in the directions "u" and "v" parallel to the pair of the ribs 89e in the labyrinth shape portion 90.

Figure 58:
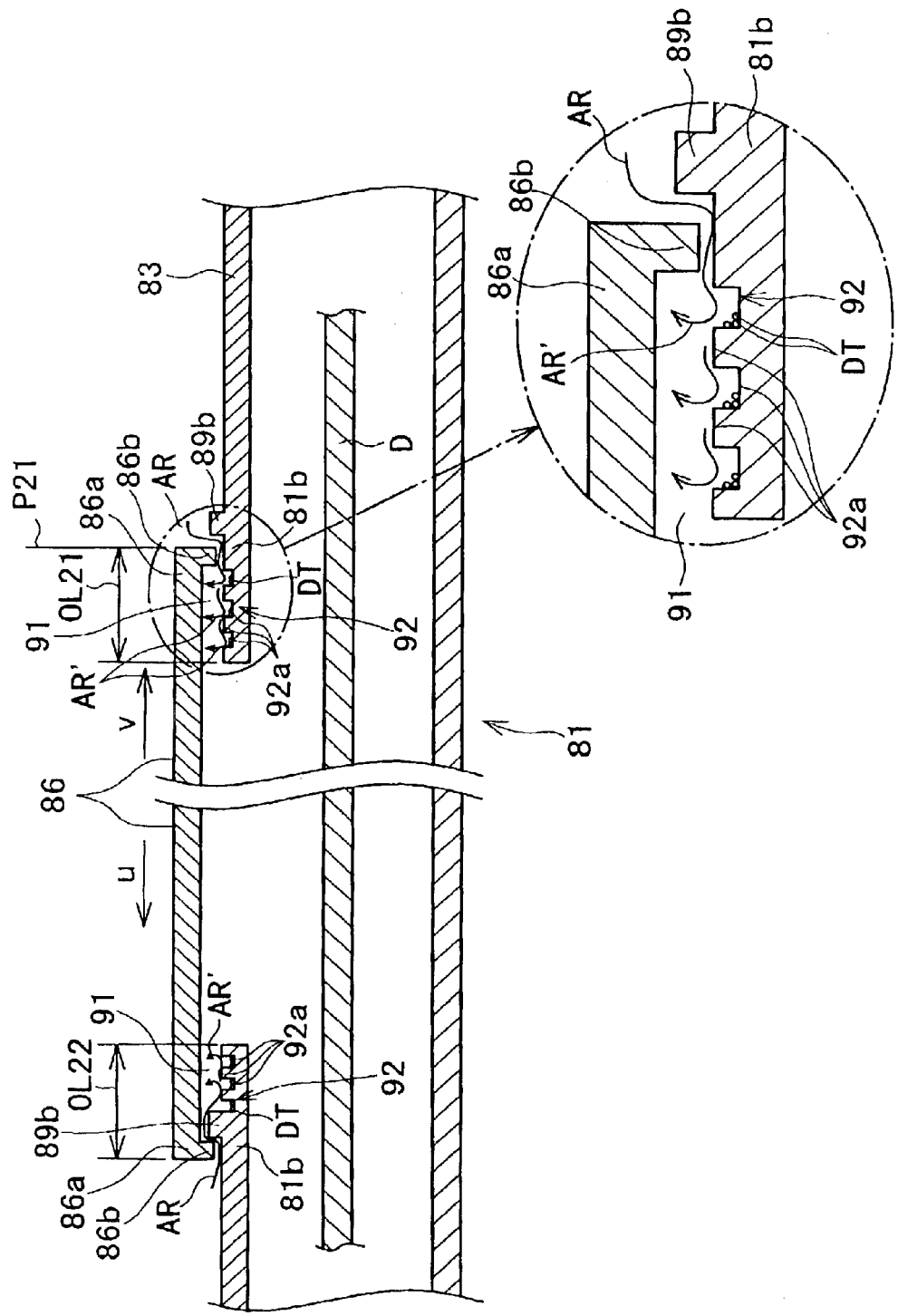
FIG. 58 is an enlarged sectional view of the N portion shown in FIG. 52 for explaining a third dustproof structure including a turbulence generating structure portion in the disk cartridge using the slide shutter.

(10) Description of Third Dustproof Structure of Disk Cartridge Using Slide Shutter A third dustproof structure of the disk cartridge using the slide shutter will be described with reference to FIGS. 58 and 59.

The third dustproof structure is composed of a turbulence generating structure portion 92 having a plurality of turbulence generating recesses-and-projections 92a.

When the shutter 86 is returned, by the sliding motion in the direction "v", to the opening portion closing position P21, the air AR containing the dust DT is liable to permeate in the disk cartridge 81 through gap portions 91 (N portions in FIG. 52) at both ends of the opening portion 85.

To cope with such an inconvenience, the turbulence generating structure portion 92 having a plurality of turbulence generating recesses-and-projections 92a are provided in the gap portions 91. The gap portions 91 are formed at portions (N portions in FIG. 52) where both ends 86a of the shutter 86 in the slide direction, that is, the directions "u" and "v" are vertically overlapped to both side edges 81b of the opening portion 85 of the lower shell 83 or the upper and lower shells 82 and 83 of the disk cartridge 81. This is effective to completely seal the gap portions 91 and hence to prevent the permeation of the dust DT, together with the air AR, in the disk cartridge 81 through the gap portions 87, that is, through the opening portion 5.

The configuration of the third dustproof structure will be described below. As shown in FIG. 58, both the side edges 81b of the opening portion 85 of the lower shell 83 or the upper and lower shells 82 and 83 of the disk cartridge 81 are extended for specific dimensions OL21 and OL22, respectively in order that when the shutter 86 is returned, by the sliding motion in the direction "v", to the opening portion closing position P21, the side edges 81b of the opening portion 85 are vertically overlapped to the both the ends 86a of the shutter 86 by the distances OL21 and OL22, respectively.

A plurality of the turbulence generating recesses-and-projections 92a (constituting the turbulence generating structure portion 92) are formed, on the disk cartridge 81 side or the shutter 86 side, in each of the gap portions 91 between both the extended side edges 81b and the both the ends 86a of the shutter 86.

The function of the third dustproof structure will be described below.

When the air AR containing the dust DT flows in the pair of turbulence generating structure portion 92, passing through the turbulence generating structure portion 92, and permeates in the disk cartridge 81 from the opening portion 5, the air AR is repeatedly impinged on the plurality of turbulence generating recess-and-projections 92a to be repeatedly redirected, to generate the turbulence of the air AR. As a result, the dust DT is swirled in the turbulence generating structure portion 92 by the turbulence action of the air AR, and the swirled dust DT is sequentially caught by the recesses and edges of the turbulence generating recesses-and-projections 92a, to be gradually separated from the air AR and settled in the plurality of turbulence generating recesses-and-projections 92a.

As a result, it is possible to effectively prevent the permeation of the dust DT, together with the air AR, in the disk cartridge 81 from the opening portion 85.

Figure 59:
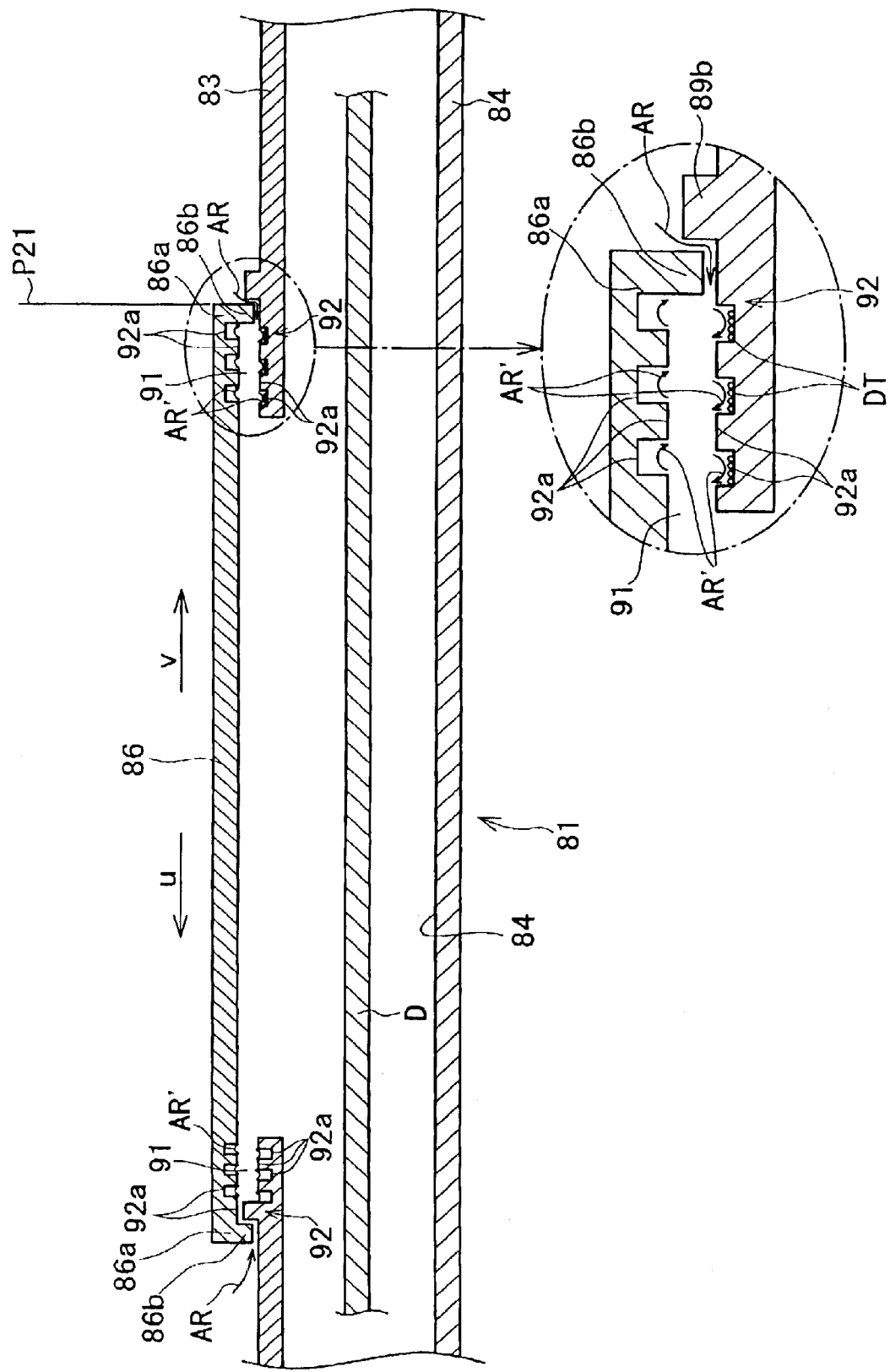
FIG. 59 is an enlarged sectional view of the N portion shown in FIG. 52 for explaining a modification of the turbulence generating structure portion of the third dustproof structure.
Figure 60:
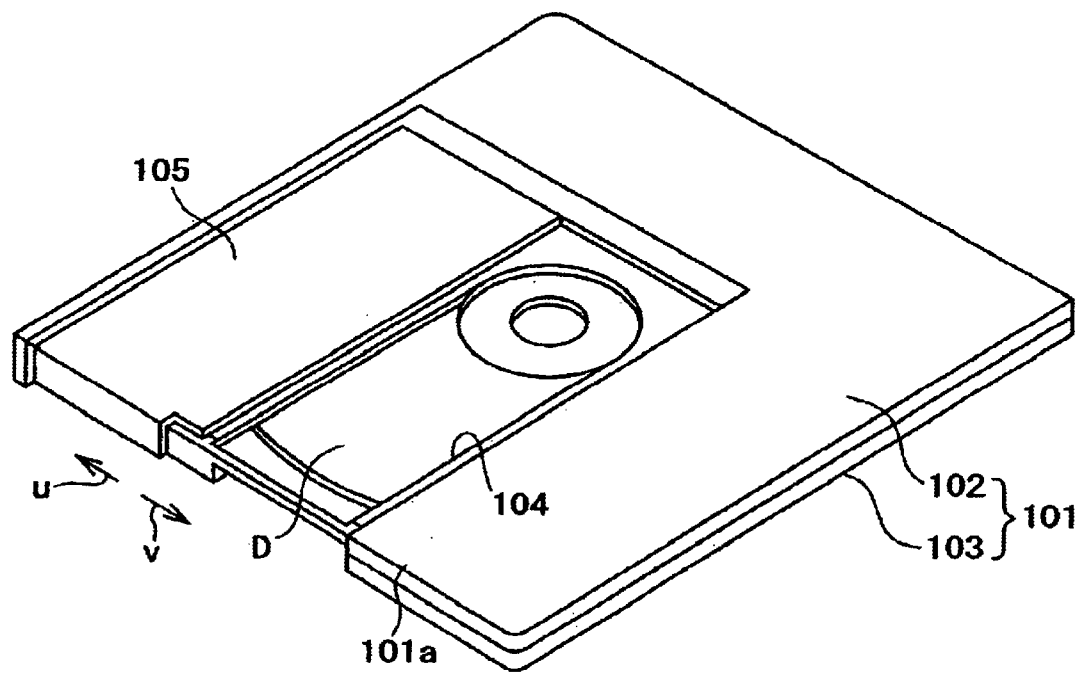
FIG. 60 is a perspective view of a related art disk cartridge using a slide shutter.
Figure 61:
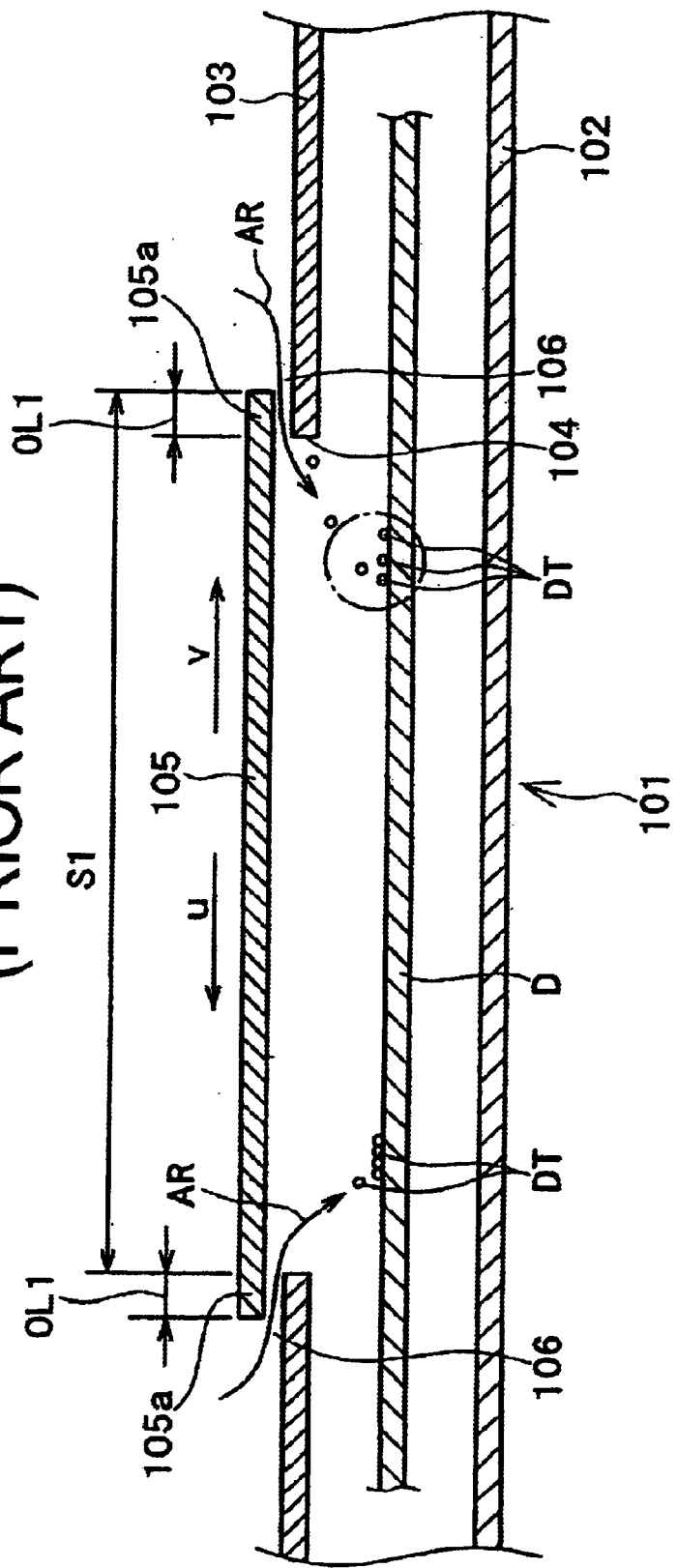
FIG. 61 is an enlarged sectional view for explaining a state that dust permeates in the related art cartridge using the slide shutter through an opening portion.
Figure 62:
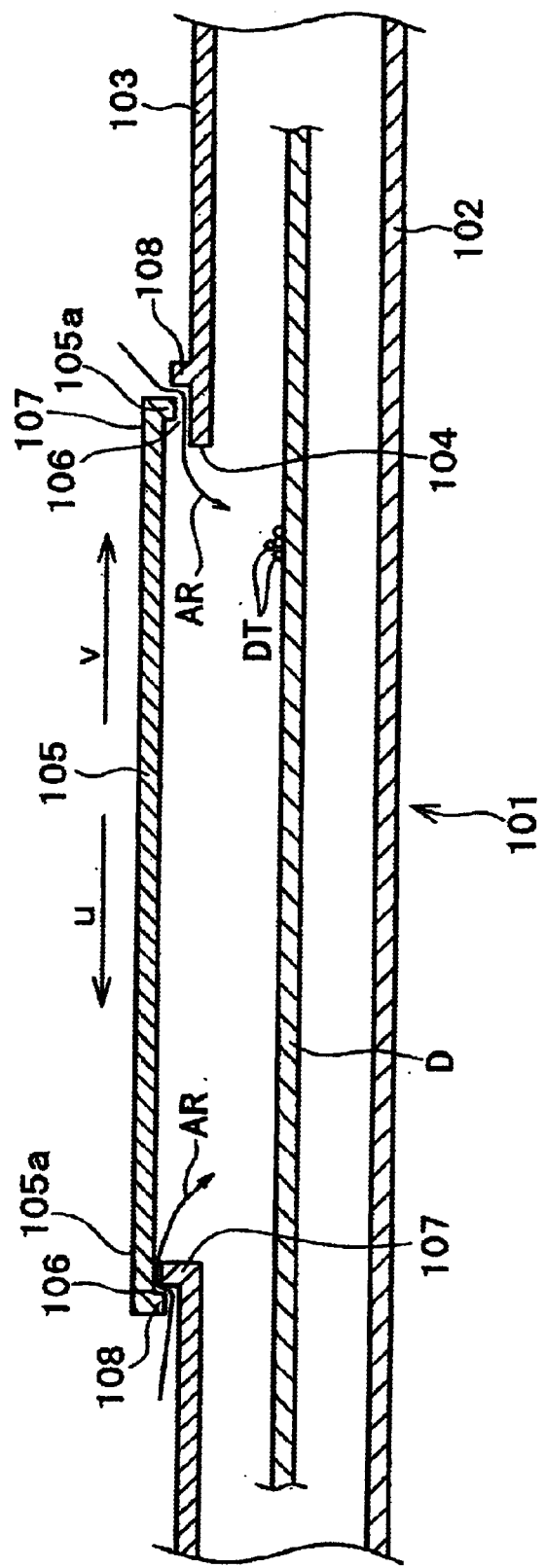
FIG. 62 is an enlarged sectional view, similar to FIG. 61, for examining the prevention of permeation of dust in the related art disk cartridge using the slide shutter through the opening portion.

FIG. 59 is a modification of the third dustproof structure, wherein two sets of turbulence generating recesses-and-projections 92a are formed on both the lower disk cartridge 81 side and the upper shutter 86 side of the pair of turbulence generating structure portions 92 in such a manner as to face to each other in the vertical direction.

With this configuration, when the air AR containing the dust DT passes through the turbulence generating structure portions 92 and permeates in the disk cartridge 81 from the opening portion 5, the turbulence of the air AR is increased by the turbulence generating recesses-and-projections 92a on both the sides, so that it is possible to easily separate the dust DT from the air AR and to easily deposit the separated dust DT in the turbulence generating recesses-and-projections 92a.

While the preferred embodiments of the present invention have been described, the present invention is not limited to the disk cartridge 1 using the inner rotor and the disk cartridge 81 using the slide shutter, but may be applied to various cartridges capable of housing disk-like recording media, card-like recording media, and members other than the recording media such as cleaning disks.

The present invention is also applicable to a cartridge, generally called "caddie", in which all or part of an upper shell is configured to be openable/closable with respect to a lower shell, wherein various members are removably housed in the cartridge.

Since the above description of the preferred embodiments is for illustrative purposes only, and it is to be understood that changes and variations may be made without departing from the spirit or scope of the following claims.

What is claimed is:

1. A cartridge including an opening portion and a shutter for opening/closing said opening portion, comprising:

a labyrinth shaped portion spaced to have a recessed dust deposition portion, said labyrinth shaped portion being disposed in a gap formed at a portion at which said shutter and said cartridge are overlapped to each other in a closed state such that said shutter closes said opening portion.

2. A cartridge including an opening portion and a plurality of shutters for opening/closing said opening portion, comprising:

a labyrinth shaped portion spaced to have a recessed dust deposition portion, said labyrinth shaped portion being disposed in a gap formed at a portion where said plurality of shutters are overlapped to each other in a closed state such that said plurality of shutters are overlapped to each other to close said opening portion.

3. A cartridge including an opening portion, a rotatable inner rotor, a shutter for opening/closing said opening portion from inside by rotation of said inner rotor, comprising:

a labyrinth shaped portion spaced to have a recessed dust disposition portion, said labyrinth shaped portion being disposed in a gap formed at a portion where said shutter and said cartridge portion are overlapped to each other in a closed state that said shutter closes said opening portion from inside.

4. A cartridge including an opening portion, a rotatable inner rotor, and a plurality of shutters for opening/closing said opening portion by rotation of said inner rotor, comprising:

a labyrinth shaped portion spaced to have a recessed dust deposition portion in a gap formed at a portion where said plurality of shutters are overlapped to each other in a closed state such that such plurality of shutters are overlapped to each other to close said opening portion from inside.

* * * * *

UNITED STATES PATENT AND TRADEMARK OFFICE
CERTIFICATE OF CORRECTION

PATENT NO.   : 6,944,875 B2  
DATED        : September 13, 2005  
INVENTOR(S)  : Kawaguchi et al.

Page 1 of 1

It is certified that error appears in the above-identified patent and that said Letters Patent is hereby corrected as shown below:

Column 3,  
Line 5, change "disposition" to -- deposition --.

Column 7,  
Line 50, change "damper" to -- clamper --.

Signed and Sealed this

Thirteenth Day of December, 2005

JON W. DUDAS  
*Director of the United States Patent and Trademark Office*